United States Patent
Wiser et al.

(10) Patent No.: US 8,544,048 B2
(45) Date of Patent: Sep. 24, 2013

(54) SYSTEM FOR CONTENT DELIVERY

(75) Inventors: Philip R. Wiser, Nevada City, CA (US);
Yagyensh C. Pati, Woodside, CA (US);
Garry M. Paxinos, Pompano Beach, FL
(US); Michael Youssefmir, Portola
Valley, CA (US); **James Vincent
Burmeister**, Tamarac, FL (US);
Anderson Hoyt Jackson, Seneca, SC
(US); Richard Blair Leavell, Weston,
FL (US)

(73) Assignee: Kustin Corp., Panama City (PA)

( * ) Notice: Subject to any disclaimer, the term of this patent is extended or adjusted under 35 U.S.C. 154(b) by 187 days.

(21) Appl. No.: 12/819,001

(22) Filed: Jun. 18, 2010

(65) Prior Publication Data

US 2010/0325666 A1  Dec. 23, 2010

Related U.S. Application Data

(63) Continuation of application No. PCT/US2008/014014, filed on Dec. 23, 2008.

(60) Provisional application No. 61/016,412, filed on Dec. 21, 2007, provisional application No. 61/016,906, filed on Dec. 27, 2007.

(51) Int. Cl.
*G06F 3/00* (2006.01)
*H04N 7/20* (2006.01)
*H04N 7/173* (2011.01)
*H04N 7/16* (2011.01)

(52) U.S. Cl.
USPC ............ 725/97; 725/71; 725/44; 725/8

(58) Field of Classification Search
None
See application file for complete search history.

(56) References Cited

U.S. PATENT DOCUMENTS

| 5,933,605 A | 8/1999 | Kawano et al. |
| 6,040,829 A | 3/2000 | Croy et al. |

(Continued)

FOREIGN PATENT DOCUMENTS

| EP | 0804012 | 10/1997 |
| EP | 1041824 | 10/2000 |

(Continued)

OTHER PUBLICATIONS

International Search Report for PCT/US2008/014041.

(Continued)

*Primary Examiner* — Brian Pendleton
*Assistant Examiner* — Jean D Saint Cyr
(74) *Attorney, Agent, or Firm* — Notaro, Michalos & Zaccaria P.C.

(57) ABSTRACT

A system for and method of transmitting audio and visual programming content, by identifying an amount of broadcast transmission capacity available for transmitting the content to one or more users. The content is separated into at least first and second portions based on user demand for the content and/or the identified available broadcast transmission capacity. The first portion of the content is transmitted, to a receiver/STB associated with at least one of the users, using the identified broadcast transmission capacity; and the second portion of the content is transmitted to the receiver using transmission other than broadcast transmission. The content can include nonlinear content. Transmission other than broadcast transmission can include unicast transmission, which can be in response to a user request and/or an initiation by a server. The received nonlinear content can be stored at the receiver for play back at a time different from the time of transmission.

28 Claims, 29 Drawing Sheets

(56) References Cited

U.S. PATENT DOCUMENTS

| | | |
|---|---|---|
| 6,216,141 B1 | 4/2001 | Straub |
| 6,637,029 B1 | 10/2003 | Maissel et al. |
| 6,698,020 B1 | 2/2004 | Zigmond et al. |
| 6,774,864 B2 | 8/2004 | Evans et al. |
| 6,868,452 B1 * | 3/2005 | Eager et al. ............ 709/231 |
| 6,975,301 B2 | 12/2005 | Fan |
| 7,024,156 B2 | 4/2006 | Kawamata et al. |
| 7,036,139 B2 | 4/2006 | Aras |
| 7,170,420 B2 | 1/2007 | Phifer |
| 7,295,253 B1 | 11/2007 | Gerstman |
| 7,352,414 B2 | 4/2008 | Lee |
| 7,363,569 B2 | 4/2008 | Pendakur et al. |
| 7,423,662 B2 | 9/2008 | Unger |
| 7,432,990 B2 | 10/2008 | Borden, IV et al. |
| 7,567,565 B2 | 7/2009 | La Joie |
| 7,869,783 B2 | 1/2011 | Morton |
| 7,917,925 B2 | 3/2011 | Eigeldinger |
| 7,992,185 B2 | 8/2011 | Kanda |
| 8,281,352 B2 | 10/2012 | Brooks et al. |
| 2002/0059588 A1 | 5/2002 | Huber et al. |
| 2002/0144262 A1 | 10/2002 | Plotnick et al. |
| 2002/0184626 A1 | 12/2002 | Darbee et al. |
| 2004/0003400 A1 | 1/2004 | Carney et al. |
| 2004/0172650 A1 | 9/2004 | Hawkins et al. |
| 2004/0250273 A1 | 12/2004 | Swix et al. |
| 2005/0002352 A1 * | 1/2005 | Bao et al. ................ 370/328 |
| 2005/0026690 A1 | 2/2005 | Silver |
| 2005/0114794 A1 | 5/2005 | Grimes et al. |
| 2005/0235307 A1 | 10/2005 | Relan et al. |
| 2005/0246738 A1 | 11/2005 | Lockett |
| 2006/0026302 A1 | 2/2006 | Bennett et al. |
| 2006/0031880 A1 | 2/2006 | Stark et al. |
| 2006/0150120 A1 | 7/2006 | Dresti et al. |
| 2007/0266414 A1 | 11/2007 | Kahn et al. |
| 2007/0294717 A1 | 12/2007 | Hill et al. |
| 2008/0066106 A1 * | 3/2008 | Ellis et al. ............... 725/40 |
| 2008/0127277 A1 | 5/2008 | Kuschak |
| 2008/0235746 A1 * | 9/2008 | Peters et al. ............. 725/111 |
| 2009/0183212 A1 * | 7/2009 | Sincaglia et al. ......... 725/92 |

FOREIGN PATENT DOCUMENTS

| | | |
|---|---|---|
| WO | WO01/52537 | 7/2001 |
| WO | WO02/097611 | 12/2002 |
| WO | WO2004/057874 | 7/2004 |
| WO | WO2007/068290 | 6/2007 |
| WO | WO2008/011796 | 1/2008 |
| WO | WO2008/127737 | 10/2008 |
| WO | WO2009/038829 | 3/2009 |

OTHER PUBLICATIONS

International Search Report for PCT/US2008/004922.
International Search Report for PCT/US2008/012418.
Appeal Decision of EP08865944.6.
European Search Report EP 12 159 533.4.
Opinion of EP 08865944.6.
Rejection of EP 08 831 750.8.
U.S. Appl. No. 13/163,512 Office Action.
U.S. Appl. No. 12/819,001Office Action.
International Search Report Opinion PCT/US2008/004922.
International Search Report Opinion PCT/US2008/014014.
International Search Report Opinion PCT/US2008/014041.
International Search Report Opinion PCT/US2008/065429.
International Preliminary Report PCT/2008/014014.
International Preliminary Report PCT/US2008/004922.
International Preliminary Report PCT/US2008/012418.
International Preliminary Report PCT/US2008/014041.
International Preliminary Report PCT/US2008/065429.
International Search Report PCT/US2008/065429.

* cited by examiner

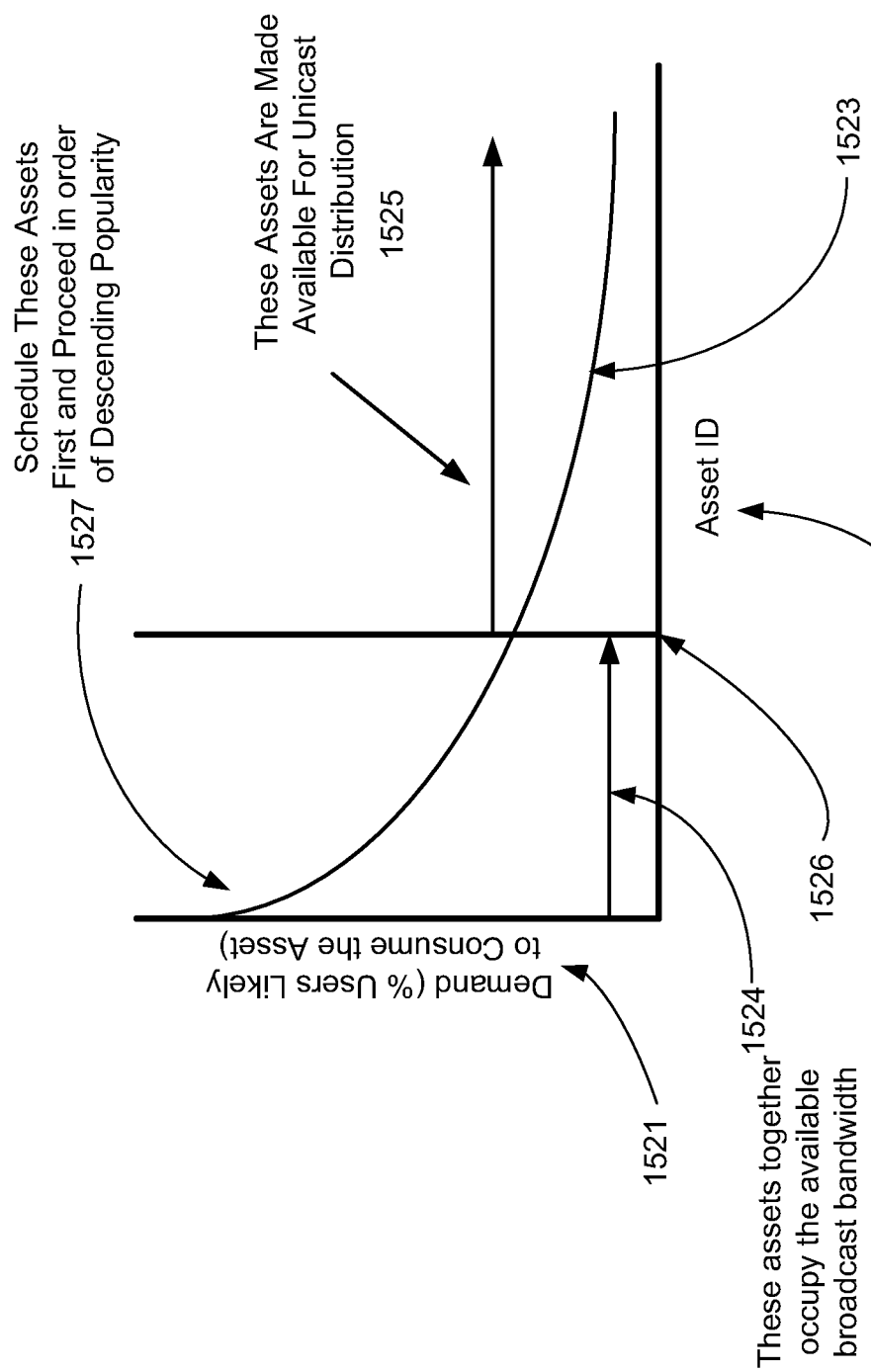

Client
2400

Receive a plurality of audio and visual programming content in a form of discrete files or linear streams, each of the plurality of audio and visual programming content containing original advertising content — 2401

Selectively extract original advertising content embedded within the plurality of audio and visual content from each of the plurality of audio and visual programming content — 2402

Store each of the plurality of the audio and visual programming content without the corresponding original advertising content as modified discrete files in the receiver controller — 2403

Fig. 24

SYSTEM FOR CONTENT DELIVERY

STATEMENT OF RELATED CASES

This application is a continuation of PCT application PCT/US 2008/014014, filed Dec. 22, 2008, which claims priority from provisional applications 61/016,412, filed Dec. 21, 2007 and 61/016,906, filed Dec. 27, 2007.

This application is related to U.S. application Ser. No. 12/082,954, filed Apr. 13, 2008 which claims priority from provisional application 61/010,170, filed Jan. 4, 2008 and provisional application 61/016,412, filed Dec. 21, 2007 and provisional application 60/923,472, filed Apr. 13, 2007.

This application is also related to U.S. application Ser. No. 12/082,955, filed Apr. 14, 2008 which claim priority from provisional application 61/010,110, filed Jan. 4, 2008; provisional application 61/016,416, filed Dec. 21, 2007; and provisional application 60/923,371, filed Apr. 13, 2007.

This application is also related to U.S. application Ser. No. 12/131,009, filed May 30, 2008, which claims priority from provisional application 61/016,422, filed Dec. 21, 2007 and from provisional application 60/940,957, filed May 30, 2007.

This application is further related to U.S. application Ser. No. 12/290,583, filed Nov. 2, 2008 which claims priority from provisional application 60/985,173, filed Nov. 2, 2007.

TECHNICAL FIELD

The disclosed embodiments generally related to the field of audio and visual content delivery, in particular, about a system and method to deliver audio and visual content in a hybrid delivery system.

BRIEF DESCRIPTION OF THE DRAWINGS

In the following drawings like reference numbers refer to corresponding parts throughout the figures.

FIG. 15B is a schematic diagram illustrating a relationship between user demands and programming content identification of content which are to be broadcasted and content which are to be unicast, in accordance with some embodiments.

FIG. 24 is a flow diagram illustrating removal of original advertising content from programming content at the receiver/STB, in accordance to some embodiments.

DETAILED DESCRIPTION

Introduction

Figure 1:
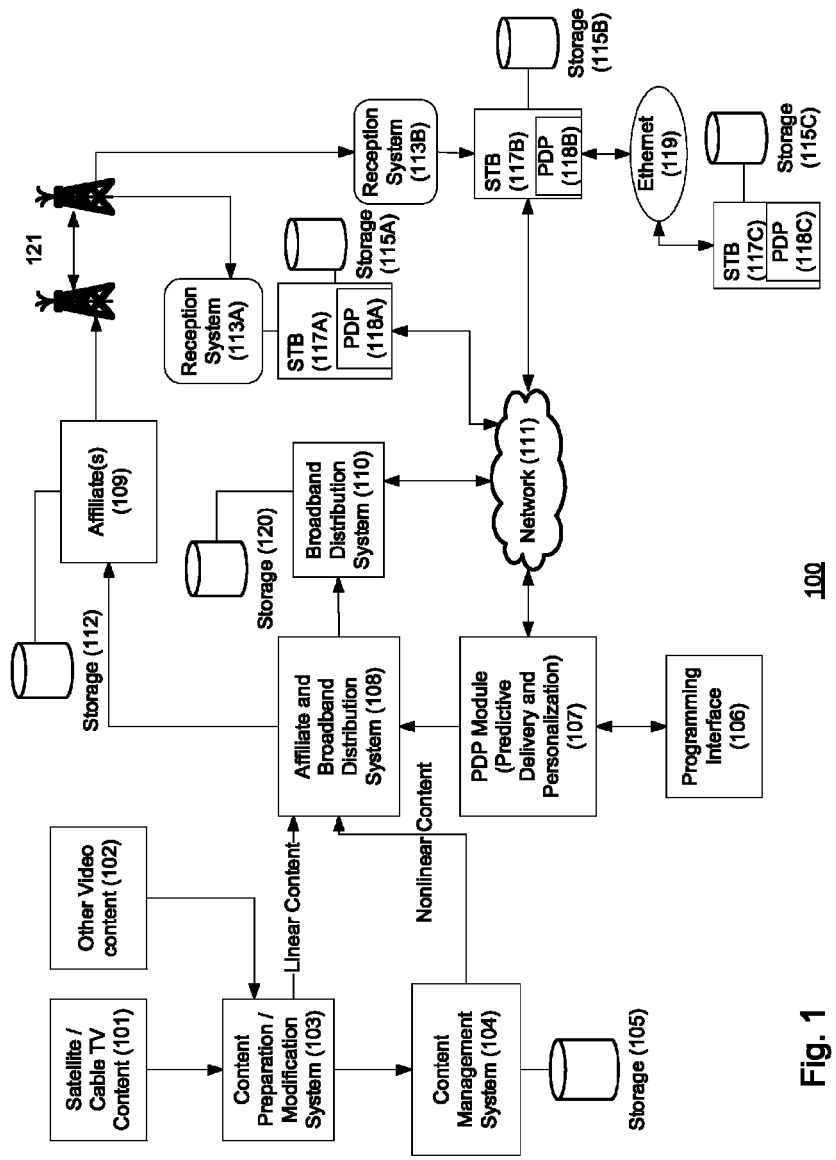
FIG. 1 schematically illustrates a content delivery system that delivers personalized content to individual households using a hybrid mode of data transmission, in accordance with some embodiments.

The general model of delivering of television programming content to viewers is based on a temporal schedule and channels for distributing television programming. Generally, to view a particular television programming content, a viewer finder the channel where the particular television programming content is offered and the time at which the television programming content is available for viewing. Viewers receive television programming broadcast through different tiers of services offered by cable television providers and satellite television providers. For example, without subscribing to a cable or satellite provider, a viewer is limited to receiving only local network broadcasts available in a particular region. The viewer is offered different levels of programming services when subscribing to a cable or satellite provider. The more the viewer pays, the more the number of channels of programming content is available to the user. In addition, the subscriber to the cable or satellite services is often offered a pay per view or on-demand service where movies or special features such as certain live events can be transmitted to the user for viewing at a one-time fee. However, the delivery of content to a subscriber of these cable and satellite service providers is done by one mode of transmission by each provider, such as cable or satellite or wireless broadcast, rather than a hybrid mode of transmission.

Other non-television based programming providers, such as movies or video-on-demand providers, use the Internet as a mode of delivering content. Such providers do not deliver any live television programming content. They only deliver videos and movies for play back at a viewer's home. In other words, such providers do not deliver live television programming or any sort of linear programming. They deliver only non-linear programming. Non-linear programming includes programs that cannot be viewed in real-time, and may be viewable only once after the programming content is downloaded. Such providers are limited to transmitting their programming content, such as movies, via the Internet.

In addition to television programming content and on-demand movie content, viewers are also increasingly interested in viewing audio and visual data such as video clips posted by others for sharing on the Internet. There is currently not one service provider available in the market to allow a viewer to view live television, on-demand movie content, and internet video clips. Many of the current modes of content delivery such as cable provider, satellite provider, and Internet movie-on-demand provider are expensive. Often, the offerings available to viewers are limited by the mode of delivery for which they are set up to receive. Most importantly, with the increasingly dynamic schedules in television viewers' lives, even with the availability of recording devices like digital video recorders (DVRs), video cassette recorders (VCRs), the current modes of television viewing still do not adequately adapt to the viewing behavior of viewers. Further, what viewers pay do not correlate to the amount of programming content they actually view.

This disclosure describes a method and system of delivering audio visual programming data including linear content that can be viewed in real-time as the content is received, non-linear content such as television programs, movies, etc. that are intended for time-delayed viewing, and video clips shared by others on the Internet. The system described herein uses a hybrid mode of delivery including at least broadcast transmission and broadband transmission. Broadcast transmission delivers content to a broad base of viewers compared to satellite or cable and can send a same or larger amount of data at a lower cost per bit of data transferred. Broadband transmission delivers content directly from the provider to a specific user for a particular program requested by a user.

The system broadcasts content digitally using available bandwidth on transmission streams carrying real time content from broadcasting networks of existing broadcast systems, including but not limited to, satellite, terrestrial broadcast, local cellular broadcasts, etc. In some instances, the audio-visual programming content is broadcasted to the viewers on the basis of general demand by viewers in a region, so they are not constrained to the availability by a network channel and the schedule in which the programming content is available. In this system, while linear content is still delivered live for viewing in real-time as the content is received by the viewers, most content such as television shows, movies etc., are delivered as nonlinear content which are not suitable for real-time viewing like in the traditional format. Instead, they are stored in form of files in a receiver/STB at viewers' households for a time-delayed viewing at anytime after they are received. Programming content that are not widely in demand are sent to viewers requesting such content by, for example, unicast transmission. The system also has a personalization and intelligent component that adapts to each viewer's viewing behavior and can automatically capture programming content preferred by each respective viewer from a broadcast transmission. The system is therefore aimed at personalizing a television viewing experience customized to a particular viewer's preference rather than having a viewer adhering to a schedule dictated by programming content providers.

Content Delivery System Configuration

The transmission capacity for delivering personalized content to individual households using a hybrid mode of data transmission includes, but is not limited to: 1) leftover or remaining bandwidth in broadcast networks, which is the bandwidth owned and controlled by affiliate broadcast networks and that is not already occupied with content transmitted by the affiliate broadcast networks, 2) leftover or remaining bandwidth in unicast networks, which is the bandwidth that is not already occupied by existing unicast transmission streams in the respective unicast networks, and 3) opportunistic bandwidth, which is bandwidths that may have become available in a manner that was unanticipated. Further, the following non-limiting factors may have an impact on transmission capacity: a) number and types of viewers that are accessible by different networks, b) cost per data byte transmitted, and c) regional viewer demand for a particular programming content.

FIG. 1 schematically illustrates a content delivery system that delivers personalized content to individual households using a hybrid mode of data transmission, in accordance with some embodiments. In some embodiments, a content delivery system intakes or ingests audio and visual programming content from one or more original content sources, processes the ingested content, and transmits the processed content to viewers at households in one or more ways. For example, some processed content may be broadcasted to multiple households or viewers simultaneously, and some other processed content may be unicast to viewers at households using broadband transmission. In this scheme, every household has one or more unique systems that are configured to receive the processed content by at least broadcast transmission and unicast transmission. Specifically, in some embodiments, the processed content is broadcasted to multiple households using an existing broadcast transmission stream in an affiliate broadcast network. In particular, the content delivery system has an ability to detect the amount of bandwidth available in an existing broadcast transmission stream of an affiliate network and is configured to insert at least a portion of the processed content into the available bandwidth of the existing broadcast transmission stream so that the processed content is broadcasted simultaneously with the network content being transmitted in the existing broadcast transmission stream.

Schematic diagram 100 in FIG. 1 illustrates in a broad overview the implementation of some embodiments of a content delivery system described in this disclosure. The content transmission source of the audio and visual programming content data includes at least satellite/cable television programming content 101 and other video content 102. The satellite/cable television programming content 101 may be linear streams of content, for example, content available on existing satellite cable feeds or file based assets, such as programming content available on physical media. Certain parts of the linear streams are passed directly through for broadcasting to ensure real time delivery and availability to the receiver/STB/set-top-boxes (STB). However, if the content is processed and stored before re-transmission, the content is part of nonlinear content. Nonlinear content is content that is intended for time-delayed transmission, non-real time viewing by viewers, and is transmitted over broadcast or unicast at throughputs that are independent of the rates otherwise required for real time viewing. In some embodiments, satellite/cable television content 101 may be received from at least a programming network that produces the programming content, a fiber source such as a cable feed, a satellite feed, or any linear feed etc. Other video content 102 may originate from physical storage media such as optical disks, magnetic disks, flash memory and any other storage devices.

The content preparation and modification system 103 is responsible for ingesting and processing the content prior to transmission. In some embodiments, this may include decoding content from linear feeds, transcoding content data, encrypting content, removing advertising promotions, inserting advertising promotions, and other content processing, etc. In some embodiments, content may be delivered for real-time viewing or time-delayed viewing. Content for real-time viewing are processed on-the-fly by this system and sent to the affiliate and broadband distribution system 108 directly for broadcast at a transmission rate viewable by viewers as they receive the content in real-time. Content for time-delayed viewing are processed, modified, or prepared. The processed content is sent to the content management system 104 as part of nonlinear content where it is redirected to storage. As necessary, such nonlinear content is then distributed to affiliate and broadband distribution system 108 and from there to the affiliates 109 and/or broadband distribution system 110 for a time-delayed transmission at a transmission rate that is independent of that required for real-time viewing.

The content management system 104 manages the processed content. The content management system 104 is responsible for storing and maintaining the content assets and metadata associated with the content. In some embodiments, the content management system is also responsible for maintaining compliance and digital rights management.

The storage 105 is a depository for the nonlinear content. In some embodiments, storage 105 stores the nonlinear content in a form of files. Alternatively, storage 105 may be viewed as an asset manager with a database storing individual programming content or assets for retrieval. For example, each television program, movie, any viewable audio visual program is stored as an individual file. The stored nonlinear content is generally scheduled for a time delayed transmission to viewers in at least one transmission mode, at a transmission rate independent of a real-time viewing rate, according to the demand for the particular nonlinear content.

The programming interface 106 is an interface, available to content system administrators or program planning personnel, to allow manual tuning of how certain content is distributed, captured by receiver/STBs, or presented to viewers. For purposes of illustration, assume that a newly acquired show has been acquired by the content delivery system and is ready for distribution to receiver/STBs. Program planning personnel may instruct the system to accommodate and highlight this newly acquired show to viewers via the programming interface 106, according to certain embodiments. In other embodiments, certain special events such as the Superbowl may receive a "boost" from programming interface 106 to ensure a large majority of households automatically acquire this content for time delayed viewing without any intervention by the end viewers. In some embodiments, this programming interface 106 may allow manual entry of data concerning programming content such as an overall popularity or general demand by viewers.

The predictive delivery and personalization (PDP) system 107 includes at least a scheduler and a recommendation engine. In some embodiments, the PDP system's scheduler creates a schedule of when nonlinear and linear content are to be transmitted to the viewers and in what mode of transmission the respective content is to be delivered. This schedule is created for the purposes of communication with the receiver/STBs 117 and is not generally visible to viewers. In some embodiments, the scheduler is designed to use available transmission bandwidth efficiently while maximizing user experience. In such embodiments, the output of the scheduler determines which content is to be broadcasted by which affiliate and partner network and which other content is to be unicast by a broadband network. To accomplish this, the scheduler has access to information or the available bandwidth and cost of the broadcast and unicast networks and about the behavior of the subscriber base. This behavioral information includes interaction events on the receiver/STB where subscribers watch television content, where subscribers are presented with the opportunity to watch specific television content but choose not to do so, where subscribers explicitly rate television content, where subscribers request television content for future delivery and where subscribers record television content.

In some embodiments, the PDP system 107 also functions as a recommendation engine, wherein the system analyses information sent via the network 111 from a set-top-box 117. The information includes but is not limited to content viewing patterns of individual subscribers. In some embodiments, the system uses the information to correlate the viewing pattern against types and availability of content and determine which content is likely to be preferred by different viewers, therefore creating a personalized list of recommended shows for each viewer.

Once a schedule for delivering content is created and upon availability of content assets, the affiliate and broadband distribution system 108 push the content assets out to the various affiliates 109 or to the broadband distribution system 10 for storage at storage 120 and for distribution. In some embodiments, the affiliate and broadband distribution system 108 further processes the content for delivery by broadcast or unicast transmission.

Affiliates 109 are independent networks that own or control broadcast systems. In some embodiments, broadcast systems include wireless broadcasts such as digital television that distribute television programming content to a wide audience. For example, an affiliate may be a local broadcast network belonging to a nation-wide broadcast network (e.g., ABC, CBS, NBC, etc.) that broadcasts television programming content to a region wide population. In some embodiments, these affiliates broadcast programming content using an ATSC digital television standard. The embodiments are not restricted to using the ATSC standard. Different television standards may be used and may vary from implementation to implementation. Examples of television standards that may be used include, but are not limited to, DVB, DVB-T, ISBD-T, SBTVD-T, ADTB, DMB-T/H, DVB-T COFDM, NTSC, PAL, and SECAM. The storage 112 associated with the affiliates 109 is for storing any scheduled nonlinear content for delivery. At the affiliates 109, the nonlinear content is broadcasted to the subscriber base over the networks and in accordance with a schedule that may be static or dynamic. In some embodiments, the schedule may be dynamically modified by factors including but not limited to viewers' demand for a particular content and emphasis of specific programming content by programming planning personnel. Also, at the affiliates 109, linear feeds and nonlinear content may also be integrated together for delivery. For example, a number of files representing nonlinear content may be encoded, interleaved or combined with the linear content before being sent out.

In some embodiments, the affiliates 109 broadcast content using, for example, transmission towers 121. In other embodiments, the content may not be broadcasted via affiliates 109, but instead may be broadcasted via satellite broadcast systems. Still in some other embodiments, the content may be broadcasted by a local cellular network in broadcast mode. In some embodiments, the broadcast system is not only used for video and audio content transmission but also for other data transmissions including, but not limited to, other types of control information, content schedules, and software updates that need to reach multiple receiver/STBs at the same time.

The broadband distribution system (110) is a series of servers and storage elements deployed across the Internet to optimize delivery of content to receiver/STBs that serve viewers in different households. The delivery of content is accomplished by high-speed broadband Internet.

While not explicitly stated, the content preparation/modification system 103, content management system 104, storage 105, affiliate and broadband distribution system 108, programming interface 106, PDP system 107, and the broadband distribution system 110 may collectively act as components of a content operation center, which is merely a part of the content delivery system. In some embodiments, viewing the content delivery system in its simplest terms, the entire content delivery system may be seen as having multiple parts, each part serving one or more functions. For example, there is the content operation center where data is processed before they are sent to the affiliates for broadcasting or to a broadband network for unicast transmission. Affiliates provide a mode of broadcast transmission via broadcast networks. Broadcast networks and broadband network(s) are at least some of the media in which content is transmitted. Lastly, the receiver/STB/STBs form equipment in each household or at each customer premise for receiving content and controlling the display of the content received.

The network 111 represents, in some embodiments, the Internet and the broadband network in which content is delivered by the broadband distribution system 110 to receiver/STBs 117 located in different households. In other embodiments, the network 111 also represents the medium in which receiver/STBs 117 communicate with the PDP system 107 as well as with each other. Accordingly, a network coupling one or more content transmission sources and a plurality of receiver/STB that enables the receiver/STBs to receive content from the content transmission source(s) or to allow two or more receiver/STB to communicate with each other, may be referred to as a content delivery network. In some embodiments, the receiver/STBs 117 send information about viewers' respective viewing behavior to the PDP system 107, which in turn, can data mine such information and make recommendations about novel programming content that can be introduced to the viewers according to their individual preferences. In other embodiments, the broadband distribution system 110 may be used to send other types of control information, content schedules, and software updates to individual receiver/STBs. In still some embodiments, the receiver/STBs 117 is configured to communicate with each other so that if one receiver/STB (e.g., 117A) received a corrupted version of a program file, the one receiver/STB (e.g. 117A) can obtain an uncorrupted version or a portion of the uncorrupted program to replace or repair the corrupted version by communicating with another receiver/STB (e.g., 117B).

Each receiver/STB 117 is equipped with a reception system 113, storage 115, and a PDP unit 118. The reception system 113 is configured to receive content by at least one of broadcast and unicast transmissions under instructions of the receiver/STB 117. Therefore, the reception system 113 includes at least an antenna to receive broadcast signals and at least one of a wired and wireless communication interface for receiving instructions via a local network, which may be further coupled to the Internet. In one embodiment, the reception system is a networked antenna transport system unit (NATSU) that is physically separated from the receiver/STB 117 but is coupled to the latter via the local network. According to one embodiment, the NATSU is a broadcast receiver for the receiver/STB 117 while the receiver/STB 117 directly receives unicast transmissions via the local network. In another embodiment, the NATSU receives both broadcast and unicast transmissions for the receiver/STB 117. According to one embodiment, the communication interface is configured to receive unicast transmissions at a high speed transfer of information from the Internet. Some content available as linear feeds are presented for real time viewing and for recording to storage 115 for non-real time viewing. Other content available in nonlinear feeds are selectively captured from broadcast transmission at times, and on networks, specified by the schedule which are then stored as files in storage 115. In some embodiments, the receiver/STB 117 is configured to capture or to receive internet content including audio and video information directly from the internet, including but not limited to websites, such as YouTube™ and Google Video, etc. Once the internet content from the websites are captured and received, they are downloaded by the STB 117 and displayed for viewing. In some other embodiments, the downloaded internet content may be stored in the storage 115 of the receiver/STB 117 for time-delayed viewing. The receiver/STB 117 is part of a system for enabling a content viewing experience personalized to a viewer. The storage 115 is intended to store programming content that is personalized to the viewers associated with each particular receiver/STB 117. Since the content is automatically captured from a broadcast or downloaded by unicast and stored on the receiver/STB 117, the viewer is not constrained to a traditional manner of television viewing by adhering to a fixed schedule of linear content transmitted at a particular time and limited by offerings of particular channel(s), in order to view or record the program. This system allows each viewer to directly obtain relevant content preferred by the viewer without adhering to a fixed schedule dictated by, for example, a cable or satellite television service provider and can view the personalized and preferred content in accordance with the viewer's demand.

The PDP unit 118 in each of the receivers/STBs 117 contributes to the personalized viewing experience of the viewer. The PDP unit 118 is an intelligent and adaptive unit that can learn about the viewing behavior of each viewer associated with the receiver/STB 117. In some embodiments, the receiver/STB 117, with the aid of a remote control (not shown), can identify each individual viewer, and learns about the viewer's viewing behavior and thus preferences of programming content. The information learned about the viewer is also shared with the PDP system 107 to recommend novel content to the viewer. In addition, the information learned also helps the PDP unit 118 in capturing the programming content that is known to be of interest to the viewer, transmitted by broadcast system, as described earlier. In other embodiments, as the PDP unit 118 learns each viewer's preference, it will automatically capture programming content of interest to each viewer without the viewer's deliberate request or command to do so.

In some embodiments, there may be more than one receiver/STB 117 per household. For example, separate and independent receivers/STBs 117B and 117C can be linked or connected by a local area network (LAN) such as Ethernet, where they can communicate with each other for programming capture and sharing of storage space, etc., within one household.

Form of Content Transmission

Figure 2:
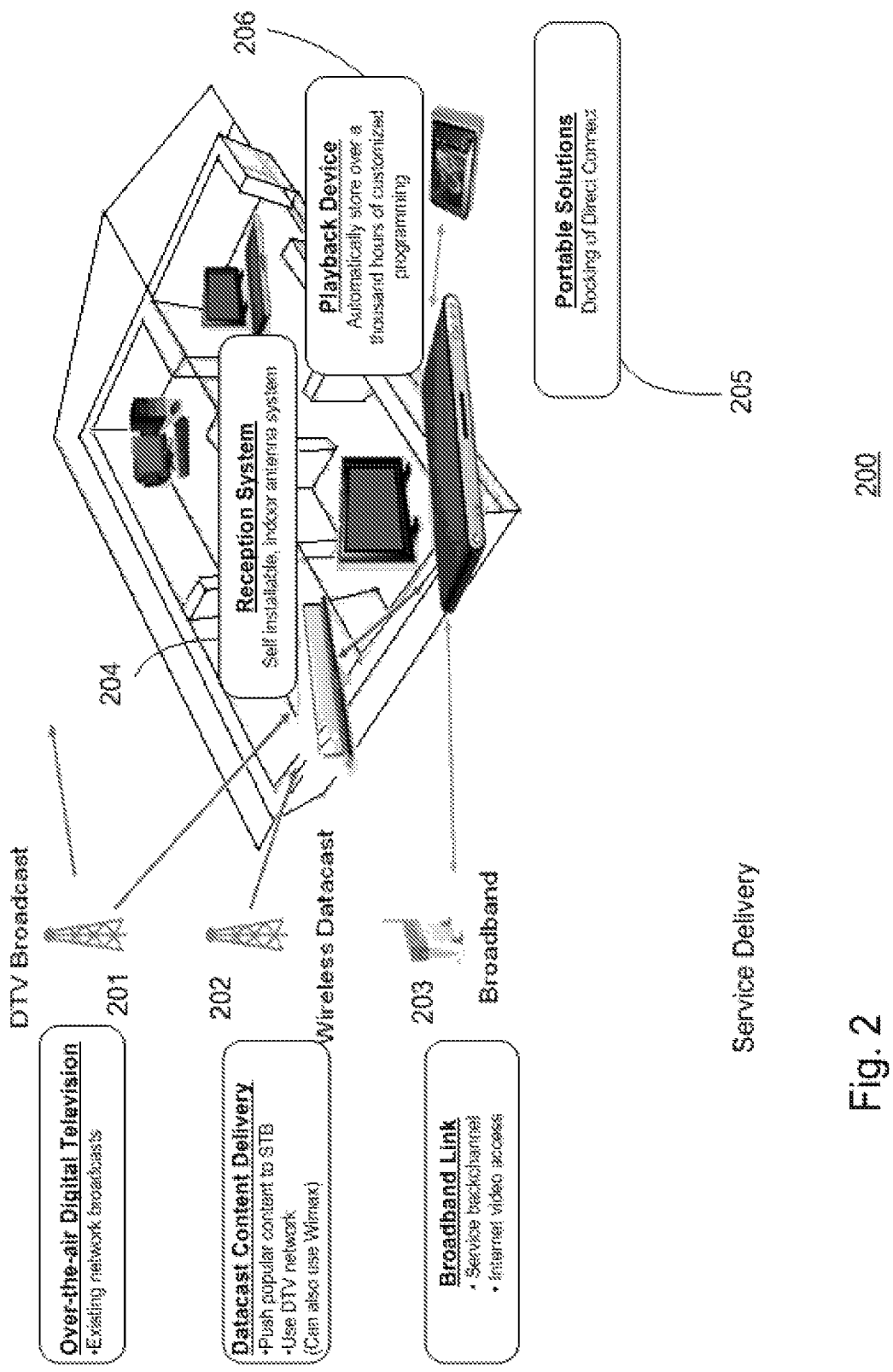
FIG. 2 schematically illustrates different modes of data transmission for delivering content to a household, in accordance with some embodiments.

FIG. 2 schematically illustrates different modes of data transmission for delivering content to a household in accordance with some embodiments. A differentiating aspect of the content delivery system, when compared to other content delivery systems, is this system's ability to deliver content in more than one mode of transmission. Unlike cable television or satellite television programming providers that transmit content using a single mode of transmission, this content delivery system uses at least two modes of transmission. Schematic diagram 200 shows the different modes of transmissions that some embodiments can employ for the system. In some embodiments, the receiver/STBs may receive content using pre-existing digital television (DTV) broadcast 201. In other embodiments, the system may transmit, and the receiver/STBs may receive, additional content using a wireless datacast 202, and broadband unicast 203. According to certain embodiments, regardless of the mode of transmission, the different content that are, for example, broadcasted or unicast, originate from a single content transmission source, before they are split and selectively distributed by different modes of transmissions. Each reception system 204 residing in a household is configured to receive content transmitted by any one of the different modes of transmissions. Therefore, in this system, all content sent to different households originates from one or more content transmission source, but the path in which different content arriving at same or different households can be different. The path and timing at which content is transmitted by broadcast or unicast transmission is dictated at least by a schedule originating in the PDP.

The schematic diagram 200 shows two different modes of transmission. For example, both DTV broadcast 201 and wireless datacast 202 uses a broadcast system, while a unicast delivery employs a broadband network 203. Further distinctions from traditional satellite or cable service providers include at least the format in which content is sent and the rate in which content is sent. Besides using a single mode of transmission, such as fiber (cable) or satellite for sending content, cable or satellite provider also transmits content only as linear streams, meaning that content sent from each provider is only transmitted at a rate for real time viewing, and if a viewer chooses to view a program at a later time, the program has to first be recorded in real time as it is being transmitted. In other words, cable or satellite providers transmit their content at a single fixed rate suitable for real time viewing.

In contrast, in some embodiments, the present system transmits linear streams of content at a rate suitable for real time viewing using a DTV broadcast, but transmits nonlinear content at a much faster rate using a similar broadcast system aimed for a time delayed or non-real time viewing. In other embodiments, the content is delivered using available bandwidth of an existing broadcast by, for example, a local television network utilizing the ATSC digital television standard. The same linear streams and nonlinear content are both delivered using the same available bandwidth in the broadcast. However, the rates of transmission of linear content and nonlinear content varies greatly, with linear content being transmitted at a rate suitable for real time viewing as the content is being received, whereas the nonlinear content being transmitted either at a faster or slower rate compared to the transmission rate of linear content, and is therefore not for real-time viewing. Nonlinear content is not only sent at a different transmission rate as compared to linear content designed for real time viewing, they are also received as individual files. Still in other embodiments, nonlinear content is intended for non-real time viewing, meaning that nonlinear content is meant for viewing after it has been downloaded and cannot be viewed as the file(s) are in the process of being downloaded. In other embodiments, a viewer may begin to view the nonlinear content as soon as a portion of the files being received as part of a transmission have been buffered to the disk.

As shown in schematic diagram 200, the reception system 204 serves to receive at least the broadcast content with an antenna system. In some embodiments, the reception system 204 incorporates a communication interface configured to receive content unicast from a broadband network 203, in addition to the antenna system. In other embodiments, a portable component 205 may download and store a portion of content from the STB for portable viewing away from the home. The playback device 206, is the part of the reception system responsible for storing and playing back nonlinear content. This is where the nonlinear content is received and stored, and also where the STB centric PDP unit resides to learn about each viewer's viewing behavior and their viewing preferences, according to certain embodiments.

Figure 3:
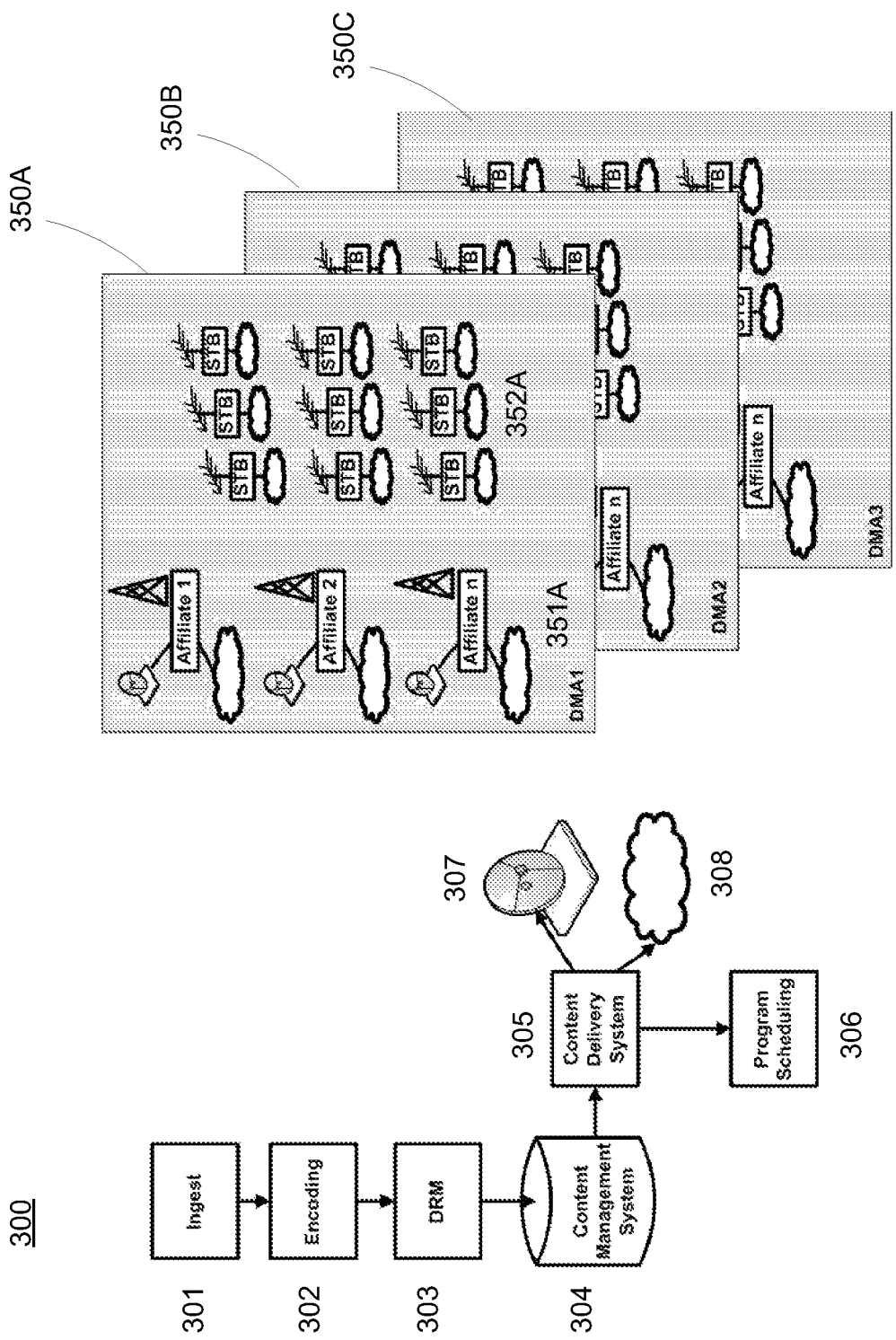
FIG. 3 schematically illustrates the use of different broadcast transmissions by different networks for delivering content to different households, in accordance with some embodiments.

FIG. 3 schematically illustrates the use of different broadcast transmissions by different networks for delivering content to different households in accordance with some embodiments. Schematic diagram 300 in FIG. 3 shows an example of how content received is broadcasted by different networks. As content is ingested 301 by either linear feeds or from a physical media, they are transcoded. In some embodiments, programming content is received in MPEG or MPEG2 or similar video standard and transcoded into H.264 standard. The content may also be encrypted and further processed, as part of the encoding process 302. In some embodiments, advertising and promotional content may be stripped or removed from the ingested content as part of the processing. In some embodiments, linear content is encrypted on-the-fly in real time and immediately sent for broadcasting to the customer. In other embodiments, nonlinear content, if coming from a linear feed is parsed into individual programming content, transcoded and encrypted. If the nonlinear content is coming from a physical media, it is also transcoded and encrypted. In both cases, nonlinear content is packaged into encrypted files for storage, each encrypted file corresponding to a program. Nonlinear content is stored at the content operation center. However, in some other embodiments, when certain nonlinear content is programmed for transmission in accordance with a schedule, specific nonlinear programming content may be distributed from storage in the content operation center to a storage either at the affiliate or within the broadband distribution system as required. Additionally, expiration time may be set and added to certain nonlinear or linear content such that the linear content if saved by a user, or any nonlinear saved in storage at a household, will automatically be deleted after a certain amount of time has elapsed. This operation is carried out as part of the digital rights management (DRM) 303, processing of the content.

The content is generally maintained by the content management system 304 which also organizes and stores the content and the metadata associated with the content. The content management system 304 maintains the data and interacts with the content delivery system 305 (also known as the affiliate and broadband distribution system (108)) which pushes or sends out content by some distribution mechanism 307 (e.g. satellite or fiber feeds) to the affiliates or partners 351 for broadcasting to receiver/STBs, or to a broadband distribution network 308 for unicast distribution in accordance with a program schedule 306. As described earlier, in some embodiments, this schedule is not visible to the viewers and is solely for the purpose of synchronizing content transmission from the content operation center and content capture or content reception at the receiver/STBs at individual households. In some embodiments, the content delivery system 305 can send the content to multiple forms of broadcasts. For example, multiple forms of broadcast may include satellite broadcast, terrestrial broadcasts, and local cellular network broadcast. The different broadcasts 350A-350C are shown in the schematic diagram and each form of broadcast may have multiple affiliates 351A-351C reaching different audiences having different receiver/STBs 352A-352C in different regions that are reached by the different affiliates 351A-351C having the different forms of broadcasts 350A-350C. As an example, in the schematic diagram 300, a form of broadcast (e.g. 350A) may be a terrestrial broadcast. The terrestrial broadcast is used by multiple affiliates (e.g., 351A) to broadcast within a specific geographical region. Therefore, every household or receiver/STB (e.g., 352A) within the specific geographical region can be reached via the terrestrial broadcast. Similarly, a unicast delivery of content is available to those who have access to a high speed broadband network. In some embodiments, this can be any broadband network regardless of the provider. In other embodiments, this may be a dedicated broadband network that is specific for content transfer and communication among receiver/STBs and the content delivery system.

System Infrastructure at Affiliate Location

Figure 4:
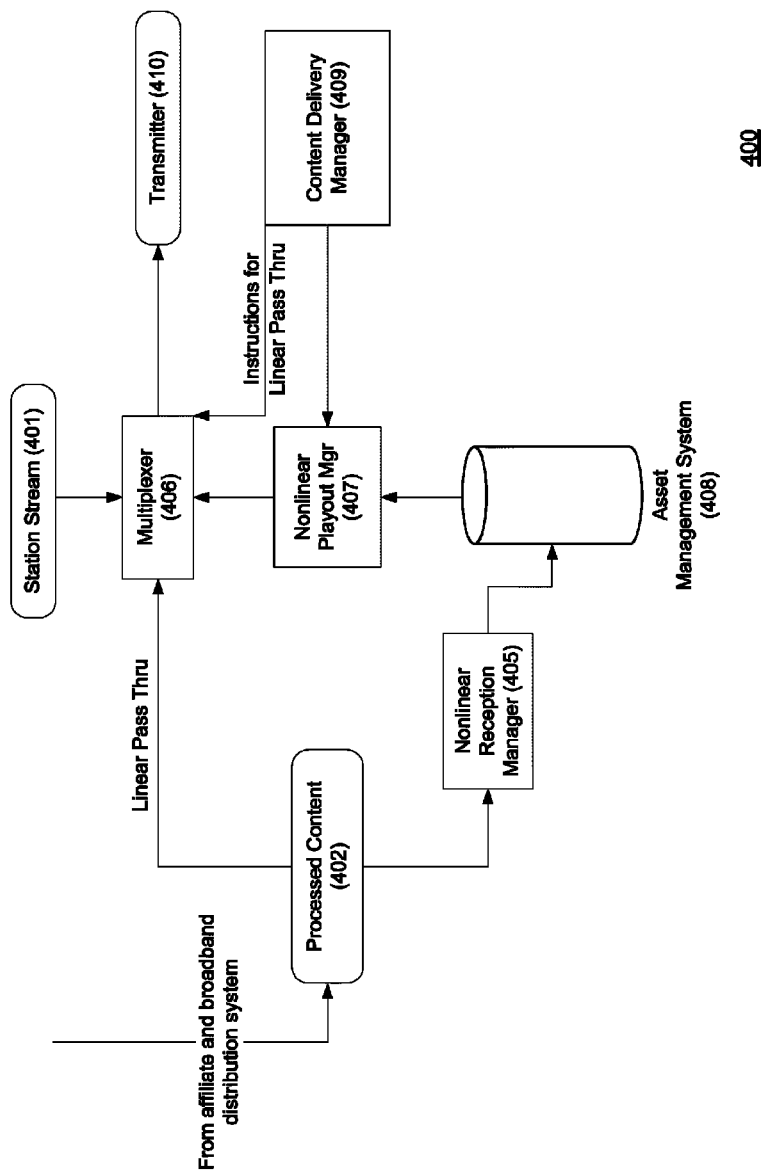
FIG. 4 schematically illustrates the processing and integration of programming content into an available bandwidth of a broadcast stream prior to transmission, in accordance with some embodiments.

FIG. 4 schematically illustrates the processing and integration of programming content into an available bandwidth of a broadcast stream at an affiliate prior to transmission in accordance with some embodiments. Schematic diagram 400 represents a portion of the content operation center illustrating where content, both linear and nonlinear, are combined together, and where the resulting combination is inserted into an available bandwidth of an existing broadcast stream and broadcasted with content on the existing broadcast stream. The processed content 402 represents both processed linear and nonlinear content from the affiliate and broadband distribution system 108. The nonlinear content portion of the processed content 402 is sent to the nonlinear reception manager (405) that is responsible for organizing the nonlinear content for storage at a local asset management 408 at the content operation center.

The content delivery manager 409 uses a schedule, as described earlier, to determine when the content, including the nonlinear content, is to be delivered, and by which mode of transmission. In some embodiments, as illustrated in schematic diagram 400, the content delivery manager 409 controls when and how a nonlinear playout manager 407 retrieves nonlinear content from the asset management 408 or storage, and transmit the nonlinear content to a multiplexer 406 for broadcast transmission Finally in some embodiments, using the schedule, the content delivery manager 409 indicates to the multiplexer 406 at what points in time and on which streams to directly multiplex "linear pass through" streams onto the broadcast transmission.

The multiplexer 406 may, in some embodiments, be able to combine nonlinear content from storage with processed linear content into a combined linear and nonlinear processed content, before the combined content is to be combined with a live stream 401 of data from a network. In other embodiments, the multiplexer 406 may be able to combine nonlinear content from storage with processed linear content data and a live stream 401 of linear content from a network directly. Therefore in some embodiments, the multiplexer 406 has the function to combine at least processed nonlinear content with processed linear content; and in other embodiments, the multiplexer 406 can combine nonlinear processed content with linear processed content and live stream 401 of linear content from a network. Still, in some other embodiments, the nonlinear playout manager 407 may combine nonlinear content, which are in form of discrete files stored in asset management 408 before being fed to the multiplexer 406 for transmission. This means discrete files are combined or interleaved into one or more files and transmitted. Therefore, while nonlinear content are stored in the form of discrete files before transmission and after being received, multiple discrete files may be combined or mixed together at the time of transmission. The combined product of nonlinear processed content, linear processed content, and live stream 401 content from a network are put on a single broadcast stream and broadcasted by the transmitter 410.

Asset management system 408, in some embodiments, collectively describes a storage system and a database containing logic that controls retrieval and storage of programming content stored in the storage system. Generally, nonlinear content is stored in the asset management system 408 as discrete files until the nonlinear content is retrieved by the nonlinear playout manager 407. In other words, each nonlinear program is stored as a separate and independent file and retrieved by the nonlinear play out manager 407 as such before being multiplexed and combined into an available bandwidth of an existing broadcasting or unicast transmission stream.

Content Operation Center and Components

Figure 5:
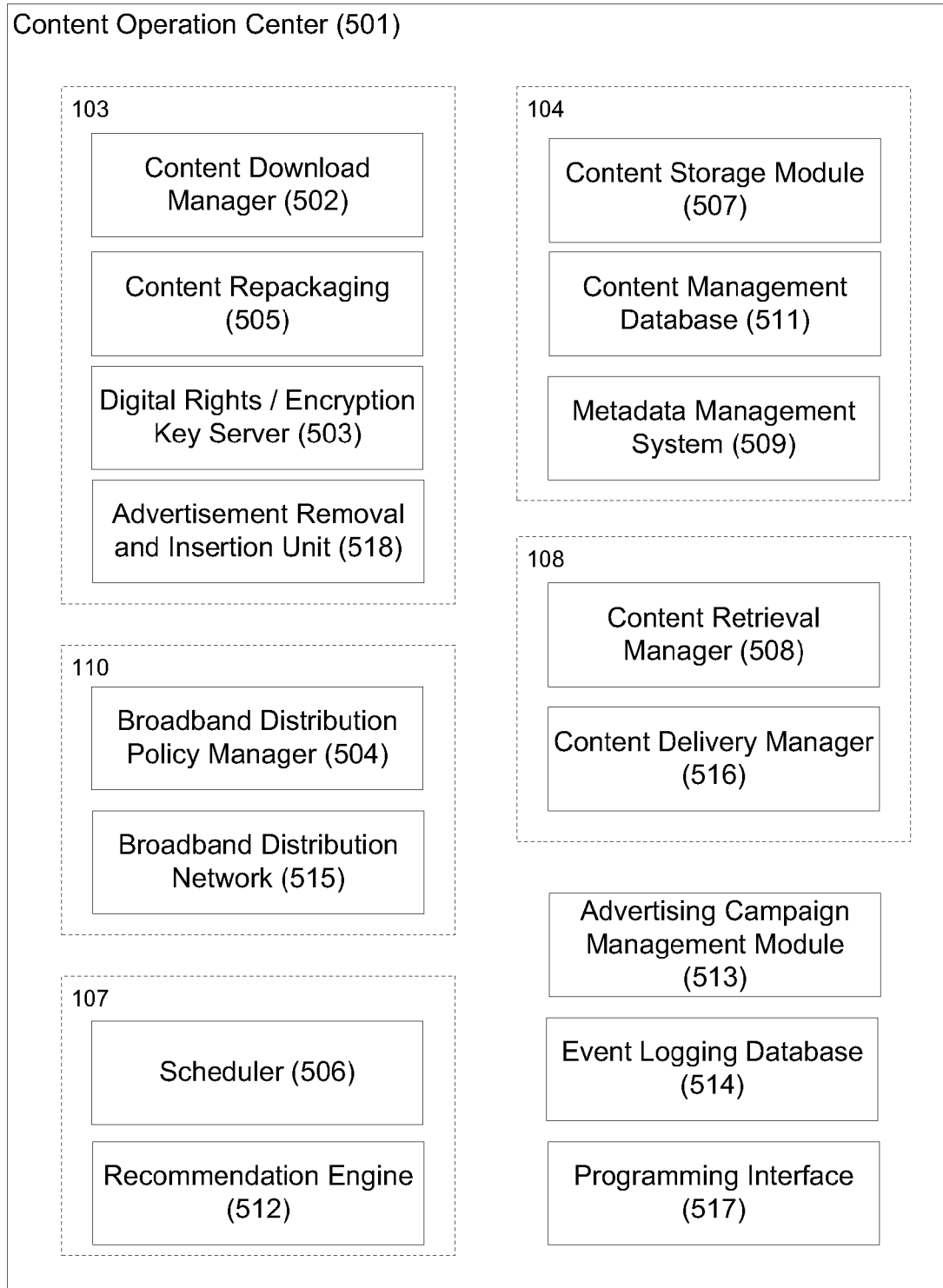
FIG. 5 is a block diagram of a content operation center where content is at least processed and managed before transmission, in accordance with some embodiments.

FIG. 5 is a block diagram of a content operation center where content is at least processed and managed before transmission in accordance with some embodiments. Block diagram 500 describes a content operation center 501 in some forms of implementation. In some embodiments, the content operation center 501 may include, but is not limited to having at least one of: a content download manager 502, a content repackaging unit 505, a digital rights/encryption key server 503, a broadband distribution policy manager 504, a broadband distribution network 515, a scheduler 506, a recommendation engine 512, a content retrieval manager 508, a content storage module 507, a content management database 511, a metadata management system 509 (e.g., the last three may collectively be components of the content management system 104), an advertising campaign management module 513, an event logging database 514, advertisement removal and insertion unit 518, content delivering manager 516, and a programming interface 517.

The content download manager 502 controls downloading of content from physical media or from a satellite or fiber feed. The content download manager 502 is a controller for ingestion of data, regardless of the original content source of the content. For example, the content download manager 502 will have information about which content is to be ingested from a fiber or cable feed, which other content is to be ingested from a physical medium, and where/when this content may become available for ingestion. The content download manager 502, in some embodiments, may have at least one of the following information about the content to be ingested by the system: where the content is available, when the content is available, and from which mode of transmission the content is ingested.

The content repackaging unit 505 is responsible for processing the content. In some embodiments, it processes content from all original content sources, including but not limited to satellite feed, fiber feed, and physical media. The content repackaging unit 505 may perform at least one of: encoding or transcoding content, for example, in some cases, transcoding from a MPEG2 standard into a H.264 standard; encrypting content (so that content is not viewable until after a decryption key is received at a household); and separating content for storage as individual files.

The digital rights/encryption key server 503 is responsible for managing digital rights of linear and nonlinear content. Linear and nonlinear content may have digital rights which are managed through associated decryption keys. The digital rights/encryption key sever 503 issues encryption keys and manages the distribution of associated decryption keys. While both linear and nonlinear content are transmitted in encrypted form from the content operation center 501, decryption keys at the receiver/STBs are required to decrypt the content before it can be viewed. The digital rights/encryption key server 503 is responsible for generating the encryption and decryption keys, cooperating with the content repackaging unit 505 to encrypt the content, and distributing the decryption keys to viewers.

The advertisement removal and insertion unit 518 removes and/or inserts advertising promotional content into linear or nonlinear audio and visual programming content and is part of the processing of content that takes place at the content operation center 501. In some embodiments, the advertisement removal and insertion unit 518 is also responsible for at least one of removal of original advertising and promotion content in the programming content received, and insertion of targeted advertising and promotion content into the programming content where the original advertising and promotion content is removed or is absent. In some embodiments, the content received from cable/fiber feeds, may contain original advertising and promotion content if the content is broadcasted from a network. However, in other embodiments such as content received from a physical media directly from an original content source, there may not be any original advertising or promotion content associated with the programming content. In some embodiments, one aspect of this content delivery system is that content may be customized or personalized to viewers' preference and advertising content can be targeted to specific viewers. In some embodiments, both removal and insertion of targeted advertising and promotion content are performed at the advertisement removal and insertion unit 518 in the content operation center 501. In other embodiments, the advertisement removal and insertion unit 518 is responsible for removal of the original advertising and promotion content, and the insertion of the targeted advertising may be performed at the receiver/STB. Still, there are other embodiments in which both removal of original advertising content associated from a respective programming content and insertion of targeted advertising content are performed entirely at the receiver/STB. Operations of the advertisement removal and insertion unit 518 to remove and/or insert advertising content are part of the content preparation in the content operation center 501. In some embodiments, the advertisement removal and insertion unit 518 may insert advertising content based on rules provided by the advertising campaign management module 513. In other embodiments, the advertisement removal and insertion unit 518 is an independent functioning unit in the content operation center 501.

In some embodiments, the content download manager 502, the content repackaging unit 505, the digital rights/encryption key server 503, and the advertisement removal and insertion unit 518 are components of the Content Preparation/Modification System 103 which was shown in FIG. 1. In other embodiments, the Content Preparation/Modification System 103 in FIG. 1 may include more or less components than described.

The content storage module 507 is the storage component for storing nonlinear content at the content operation center 501 generally. The nonlinear content stored within may include, but is not limited to, at least one of TV and movie video programming content, advertising, internet video content, and other programming content in the form of discrete files. In some embodiments, the content storage module 507 is similar to the Storage 105 in FIG. 1.

The content management database 511 stores information about content such as type of content, encoding format, file size, content playback length, etc. In some embodiments, the content management database 511 stores the metadata associated with content. In some embodiments where the content is stored in one of multiple possible locations, the content management database 511 stores the locations of where different content may be retrieved. In other embodiments, the content management database 511 may store information about where processed nonlinear content is stored in the content storage module 507 so that particular nonlinear can be retrieved for the time-delayed transmission. In some embodiments, the content management database 511 may be a part of the Content Management System 104.

The metadata management system 509 is responsible for input and editing of metadata for content and maintaining such correspondences between the metadata and the content over time. In some embodiments, metadata is associated with both linear and nonlinear content. For example, the metadata may include tags corresponding to respective content that lists applicable content attributes such as content identification (ID), show/movie/episode titles, channel, cast members, genres, program description and plot. In some embodiments, such metadata is used to aid the receiver/STB in correctly categorizing and describing the content to the viewer. In other embodiments, such metadata is used by the receiver/STB in enabling content search functionality on the receiver/STB. In other embodiments, such metadata is used by the recommendation engine 512 along with other behavioral data to recommend novel content to viewers. In some embodiments, the metadata management system 509 includes capabilities for assigning content IDs. However, other embodiments of the metadata management system 509 may include capabilities for importing external metadata feeds from multiple providers in multiple formats. Once imported, the metadata management system 509 consolidates these formats and publishes the result into one uniform format. Still, other embodiments of the metadata management system 509 allow manual editing and authoring of metadata.

In some embodiments, the content storage module 507 and the content management database content management database 511, and the metadata management system 509 are components of the content management system 104. In other embodiments, the content management system 104 may include more or less components than described.

The scheduler 506 is responsible for creating and maintaining a schedule for content delivery by broadcast transmission and unicast transmission to viewers. The scheduler 506 schedules delivery of both linear content and nonlinear content to viewers. A schedule is created based on evaluation of at least one of several factors including, but is not limited to: demand of a particular content by all viewers, the available bandwidth on each broadcast transmission stream of each affiliate network, the cost of data transmission in the available bandwidth for each transmission stream, the number of viewers accessible by each broadcast transmission stream, and the availability of receiver/STBs to receive the content at different times in different households. The schedule is created with an objective to deliver content so as to maximize the user experience given the available resources. In some embodiments, maximizing the user experience means ensuring a maximum number of viewers can capture their preferred content. In some embodiments, the schedule is created with an objective that the nonlinear content is delivered not long after a target time as determined by external program planning input or not long after a target time period after initial airing of the corresponding program on alternative linear systems.

The various criteria in determining the schedule are factored into a cost function which is then minimized either approximately or optimally to determine a final schedule. The scheduler 506 acts as the "brains" of a content delivery and distribution system. In some embodiments, the scheduler 506 determines the routes in which content is to be transmitted. For example, the scheduler 506 determines the modes of content transmission for both linear and nonlinear content. In one instance, the scheduler 506 may determine that a widely demanded nonlinear content is to be broadcasted via wireless networks at a specific time, while another less popular nonlinear content demanded only by a few viewers are to be unicast via broadband networks. In embodiments with multiple broadcast networks, scheduler 506 is responsible for determining which of a number of different broadcasting networks' broadcast transmission stream is used for delivering different content In other words, different content chosen for broadcasting may be routed to different networks, depending on different factors. Such factors may include, but is not limited to, for example, viewers accessible by different networks, cost per data byte transmitted, and regional viewer demand for a particular programming content. The scheduler thus tells the content delivery manager 516 which content is to be routed where, including whether a particular content is to be broadcasted or unicast, and by which network.

The recommendation engine 512 is responsible for making recommendations about novel content to viewers. In some embodiments, the recommendation engine 512 gathers viewers' viewing behavior and preferences for content from the receiver/STB or STB in each household and determine, based on the viewing behavior and preferences, new content to recommend for viewers. In some embodiments, recommendations in the form of at least one of: numerical content identification (ID), title, descriptions, and snippets or clips of content are sent to the receiver/STB or STB associated with viewers in each household. In some embodiments, the viewers, if interested in the recommended novel content, can request the entire program be captured by the receiver/STB or STB for viewing. In other embodiments, recommendations in the form of entire programs are automatically captured by the receiver/STB associated with viewers in each household from the broadcast network or are sent directly to the receiver/STB via unicast.

In some embodiments, the scheduler 506 and the recommendation engine 512 are components of the PDP (Predictive Delivery and Personalization) System 107 as described in FIG. 1. In other embodiments, the PDP system 107 may include more or less components than described.

The content delivery manager 516 determines which content is to be forwarded to which network for transmission or delivery to viewers and at what time based on the schedule provided by the scheduler 506. For nonlinear programming, content delivery manager 516 retrieves programming content indicated by the schedule from the content management system 104. In some embodiments, if so indicated by the schedule, the content delivery manager 516 will push a specific nonlinear programming content to the appropriate affiliate at a scheduled time for required broadcasting by the affiliate as indicated by the schedule. In other embodiments, if so indicated by the schedule, the content delivery manager 516 will push a specific nonlinear programming content to a particular receiver/STB via unicast transmission through the broadband distribution system 110. Still, in some other embodiments, if so indicated by the schedule, the content delivery manager 516 will make available a specific nonlinear programming content on the broadband distribution system 110 for subsequent unicast download by receiver/STBs. In other embodiments concerning linear programming, the content delivery manager 516 accepts linear feeds and, if so indicated by the schedule, forwards such feeds to the appropriate broadcast affiliate for linear broadcasting. In some embodiments, the linear pass through content is often not stored, so the content delivery manager 516 simply accepts the linear content without needing to perform any active retrieving.

The content retrieval manager 508 processes requests for content retrieval and retrieves the content for the requesting source making the request. In particular, a read out of the scheduled requests for content is passed from the content delivery manager 516 to the content retrieval manager 508 which then retrieves the desired content from the content storage module 507 and passes it to the content delivery manager 516. In some embodiments, the content retrieval manager 508 interacts with the content management database 511 to determine where content is located. In other embodiments, the content retrieval manager 508 may retrieve as well as passively accept content and pass the content onto the content routing manager for determining how the content should be delivered. For example, the content retrieval manager 508 may actively retrieve nonlinear video content and advertising from the content storage module 507 while accepting linear pass through feeds of content for broadcasting. The linear pass through content is often not stored, so the content retrieval manager 508 simply accepts the linear content without needing to perform any active retrieving. The content actively retrieved from the content storage module 507 may include at least one of nonlinear video content and advertising promotional content. The content retrieval manager 508 cooperates with the content delivery manager 516 to deliver content, linear or nonlinear, to viewers.

The content delivery manager 516 routes content from the content retrieval manager 508 based on the schedule from the scheduler 506. Thus, in some embodiments, content designated for broadcast distribution by the schedule is pushed to the appropriate affiliates while content designated for unicast distribution is likewise made available to the broadband distribution network. In some embodiments, content designated for unicast distribution is automatically pushed to the corresponding STBs or are indicated as ready for download by the STBs which then download the content over the broadband network. In other embodiments, content may be designated for unicast distribution but are downloaded only upon explicit feedback by the end user to do so. In some embodiments, the content delivery manager 516 may form different components of an affiliate and broadband distribution system 108 as shown in FIG. 1. In other embodiments, the affiliate and broadband distribution system 108 as shown in FIG. 1 may include more or less components than described.

The broadband distribution policy manager 504 provides functions to manage the broadband distribution network 515. For example, the broadband distribution policy manager 504 regulates broadband traffic throughputs to and from each receiver/STB to ensure that the broadband connection associated with the STB is not saturated. In some embodiments, the broadband distribution policy manager 504 provides functions to control the availability or non-availability of programming content on the broadband distribution network 515. For example, broadband distribution policy manager 504 may direct the broadband distribution network 515 to remove from distribution a specific programming content whose digital rights window for viewing has expired. In some embodiments the broadband distribution network 515 functions to unicast content that was not broadcasted or to unicast content whose broadcast transmission was otherwise not captured by the STB. During unicast transmission, content is delivered to a specific viewer at a time (e.g. point to point data transmission). This is different from broadcasting content where content is delivered to many viewers at a time (e.g., point-to-multiple-points data transmission).

Broadband distribution network 515 is a system of computers or servers, each referred to as a node or peer, networked together across the Internet that cooperates with each other transparently to deliver content. Each node contains storage, and such nodes are distributed across a network in multiple locations. These nodes transparently move content behind the scenes to optimize the fulfillment of requests for content by the receiver/STB and to optimize the push delivery of content to the receiver/STB. Optimization can take the form of reducing bandwidth costs, improving end-user performance, or both. In some embodiments, content to be unicast from the content operation center 501 is stored or cached at the nodes or peers to achieve cost and delivery efficiency. In some embodiments, the broadband distribution network 515 enables nodes and STBs to communicate directly with each other in a peer-to-peer manner in order to deliver a programming asset to a particular STB. In some embodiments, the broadband distribution network 515 enables users to communicate directly with each other in a peer-to-peer manner, where one user may obtain an uncorrupted version of data to repair errors incurred during reception of broadcast transmission.

In some embodiments the broadband distribution policy manager 504 and the broadband distribution network 515 are components of the broadband distribution system 110. For example, the broadband distribution policy manager 504 manages the broadband traffic in the broadband distribution network 515, while the broadband distribution network 515 stores the content across servers and receiver/STBs. The broadband distribution network 515 also makes the content available for unicast transmission to particular viewers, either from a central node or from other receiver/STBs, in a peer-to-peer fashion. In other embodiments, the broadband distribution system 110 may contain more or less components than described.

The advertising campaign management module 513 is responsible for at least one of entering and managing various advertising campaigns, pushing the campaign rules out to receiver/STBs, and then tracking the results in terms of ad impressions or other relevant metrics. Advertising campaigns include but are not limited to operations initiated by advertisers who are either interested in promoting a specific service or product and operations targeted according to preferences of viewers to deliver the most relevant advertising or promotion content of interest to the viewers. Different campaigns' rules are pushed out to receiver/STBs on a daily basis over the hybrid broadcast and broadband Internet delivery system and results are collected on a daily basis from controllers/STBs on a daily basis over the broadband Internet connection, according to certain embodiments. These results provide feedback on how the targeted advertising content is received by viewers thus acting as feedback to adjust campaign rules on the respective receiver/STB residing at each household. In some embodiments, the relevant metrics or ad impressions may be, in some embodiments, measured by viewers' response and interactions with the advertisements. For example, tracking of viewer's explicit reaction to ads such as in the form of user initiated click-through to explore or expand an ad or to learn more is considered a favorable impression whereas fast forwarding may be considered less favorable.

The event logging database 514 logs and mines data transmitted from the receiver/STB in respective individual household. In some embodiments, event logging database 514 contains a storage unit as well as a data mining unit. The event logging database 514 receives viewers' viewing data from the receiver/STB from respective households. The data includes at least one of: user ratings of viewed programming content, viewers' rankings of viewed content, records of programming content that is selected and watched by viewers, records of programming content that is ignored by viewers in the process of finding a programming content which is ultimately selected and viewed, records of programming content subscribed on a regular basis, and records of programming content requested for one time viewing. The event logging database 514 provides viewer viewing data for the recommendation engine 512 so that the recommendation engine 512 can match novel content to the viewers' individual interests and preferences. The event logging database 514 also provides viewer viewing data for scheduler 506. Therefore, in some embodiments, the event logging database 514 may be a part of the PDP, interacting with the recommendation engine 512 to recommend data to different viewers.

The programming interface 517 provides an interface for managing and manually making changes to the algorithms and rules established for components operating in the content operation center 501. In some embodiments, the programming interface 517 provides a means to identify the aggregate set of content that is to be programmed for a viewer base. In some embodiments, programming interface 517 also provides a means to re-prioritize this content prior to delivery to a viewer base. For example, there may be times when certain content may be deemed to be of higher priority than originally determined by the schedule. The programming interface 517 provides a means to manage and change the priority for delivery of the content. Therefore, programming interface 517 increases flexibility to the system where content may be manually managed.

The advertisement removal and insertion unit 518 works in cooperation with the advertising campaign management module 513 to carry out the advertising campaign. In some embodiments, the advertising removal and insertion unit 518 removes advertising and promotion content as part of nonlinear content processing by the content preparation and modification system 103 after the nonlinear content is ingested. In some embodiments, original advertising and promotional content associated with the content ingested is removed prior to storage. Advertising and promotional content targeted for certain campaigns, in some embodiments, is added to the ingested nonlinear content which has its original advertising and promotional content removed by the advertisement removal and insertion unit 518. However, in some other embodiments, the targeted advertising and promotional content that is tailored or customized according to viewers' preferences may be inserted after the content is received by the receiver/STB. Therefore, removal and insertion of advertising and promotional content from ingested nonlinear content may be performed directly at the content operation center or the receiver/STB depending on the types of advertising campaigns planned for different nonlinear content. Still in some embodiments, the original advertising and promotional content may not be removed from the ingested nonlinear content at the content operation center by the advertisement removal and insertion unit 518 but instead be removed after being received by a receiver/STB, with targeted advertisement and promotions inserted at the receiver/STB before it is viewed or displayed.

Receiver/STB and Components

Figure 6:
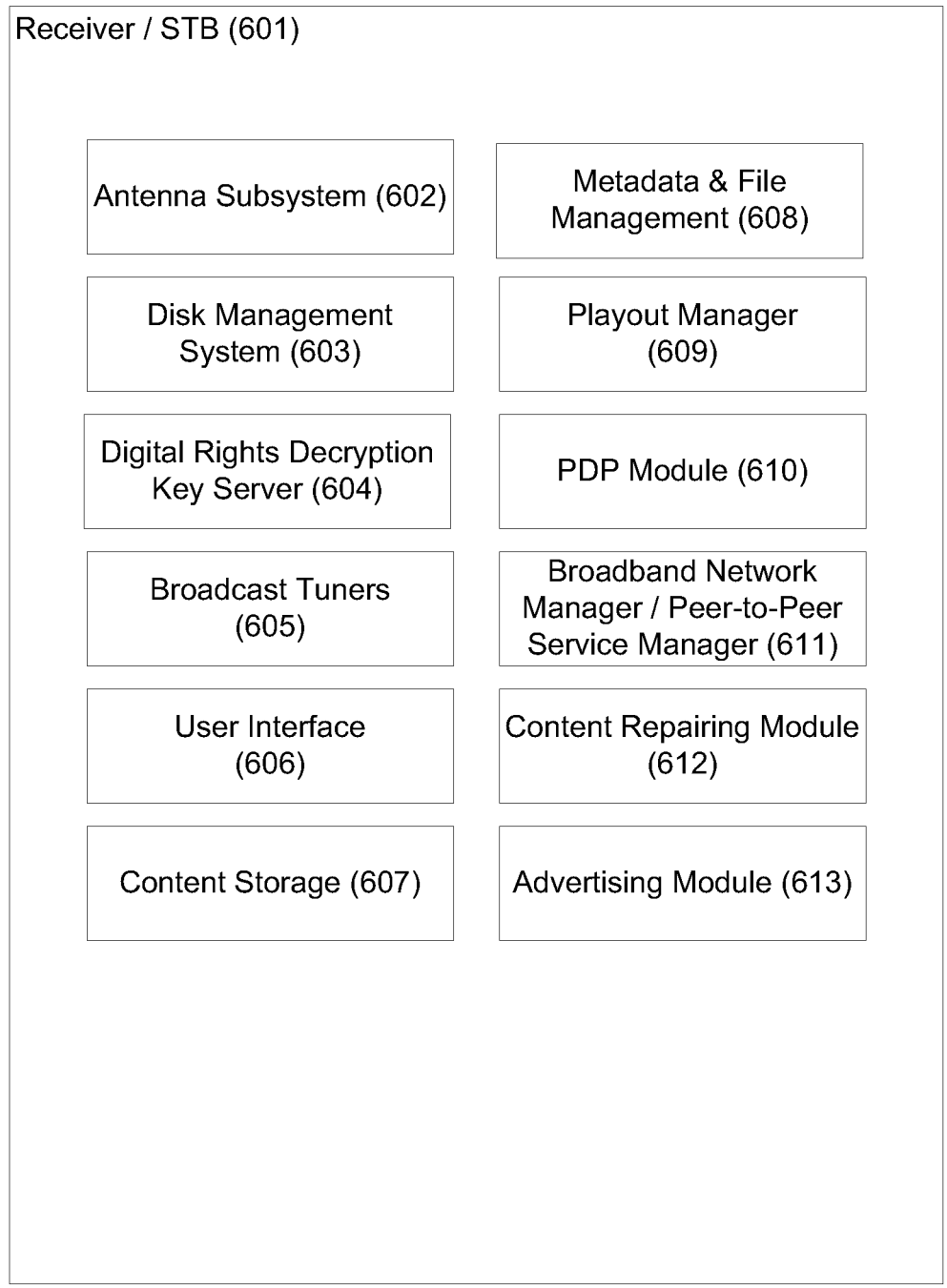
FIG. 6 is a block diagram illustrating some components in a receiver/STB in a household, in accordance with some embodiments.

FIG. 6 is a block diagram illustrating some components in a receiver/STB in a household, in accordance with some embodiments. Block diagram 600 describes a receiver/STB 601 in some forms of implementation. In some embodiments, the receiver/STB 601 may include, but is not limited to having at least one of: an antenna subsystem 602, a disk management system 603, a digital rights encryption key server 604, broadcast tuners 605, a user interface 606, a content storage 607, a metadata & file management 608, a playout manager 609, a PDP module 610, and a broadband network manager/peer-to-peer service manager 611/, a content repairing module 612, and an advertising module 613.

The antenna subsystem 602 is configured to receive broadcast transmissions from at least one of a number of networks having live broadcast streams. In some embodiments, the antenna subsystem 602 may be an antenna that is configured to facilitate indoor reception of digital television signals in the upper VHF and UHF bands. In some embodiments, the antenna subsystem 602 may include features to enable high quality reception on different channels without a need to re-position the antenna for different channels. According to other embodiments, antenna subsystem 602 may take the form of a networked antenna system transport unit (NATSU) that is physically separated from the receiver/STB but is coupled to the receiver/STB via a local network. Thus, any content received by the NATSU may be stored on the NATSU and then sent to the receiver/STB/STB via the local network or directly sent to the receiver/STB for storage.

The disk management system 603 manages the disk and storage space of the receiver/STB 601. In some embodiments, the disk management system 603 includes a content acquisition and deletion manager to control the acquisition and deletion of content. In some embodiments, content is captured from broadcast or unicast transmissions and stored. For example, nonlinear content is acquired by the disk management system 603 and stored in the content storage 607 of the system with the object of providing an on-demand viewing experience for respective viewers.

The digital rights decryption key server 604 is the counterpart of the digital rights/encryption key server 503 in FIG. 5. The digital rights decryption key server 604 receives the digital decryption keys transmitted from the digital rights encryption key server from the content operation center 501 for decrypting content that is received from broadcast and unicast transmissions. In some embodiments, the digital rights decryption key server 604 communicates closely with the counterpart server in the content operation center 501 for transmission of the decryption keys. In some embodiments, the encryption and decryption keys are closely associated with digital rights management. For example, digital viewing rights of certain content may be set for expiration for a particular period after the content is received from a transmission. Once the period expires, the content can no longer be decrypted with the decryption key that was transmitted to the digital right decryption key server 604. In some embodiments, the expired decryption keys and the associated content may be deleted automatically. In other embodiments, the expired decryption keys may either be automatically renewed or a viewer may request for the expired decryption keys to be renewed.

Each broadcast tuner 605, at the receiver/STB/STB 601 may be configured to perform at least one of receiving nonlinear content originating from the content operation center 501 via broadcast or unicast transmission, receiving linear content originating from the content operation center 501 via broadcast or unicast transmission, and receiving linear content from a preexisting content transmission source. Each broadcast tuner 605 at the receiver/STB/STB 601 may capture nonlinear and linear content as directed by the PDP module 610. In some embodiments, a schedule received from the content operation center 501 determines which channel and time at which the broadcast tuner 605 should tune into in order to capture a particular asset or programming content. In other embodiments, the tuners may be in a continuous reception mode in which broadcast content is opportunistically stored to disk and in which content meeting specific criteria is committed to long term storage as dictated by the PDP module 610. For linear content, the broadcast tuners 605 receive content at a rate suitable for real time viewing. For nonlinear content, the broadcast tuners 605 receive content at a rate independent of that required for real time viewing. The broadcast tuners 605 are also configured to interact with the user interface 606 to select linear content for display on a live basis. A receiver/STB 601 has at least one or more broadcast tuners 605. In some embodiments, a broadcast tuner 605 may tune directly to linear programming at the direction of the viewer via the user interface. In some embodiments, there are multiple broadcast tuners to enable a viewer, for example, to view a live linear programming content, record another live linear programming content, and to receive nonlinear content from a broadcast transmission simultaneously.

The user interface 606 interacts with a remote control operated respective by viewers to execute commands and requests of the respective viewers. In some embodiments, the user interface 606 can be uniquely targeted for a content delivery system delivering content personalized according to the viewer's preference. For example, user interface 606 may be designed to interact with a simple remote control having a minimalist design, such as one without any numerical input pad. A remote control unit, in some embodiments, is described in U.S. provisional application 60/985,173, titled "Remote Control Unit for Intelligent Video Programming System" filed on Nov. 2, 2007, which is hereby incorporated by reference in its entirety. In some embodiments, user interface 606 is not optimized for live television programming but is optimized for selecting content based on viewer preference and demand. For instance, user interface 606 is not designed for finding content based on a number of channels and time in which programming content is available at particular channels. Rather, user interface 606 is optimized to display content obtained from broadcast or unicast transmission according to preferences of the viewers associated with the receiver/STB 601. In some embodiments, the remote control and user interface 606 are configured to recognize the individual viewer that is using the receiver/STB 601 to view content. Further, novel features in user interface 606 further aid the PDP module 610 to continually learn about the respective viewer's viewing preferences and to modify, adjust and adapt user preferences in view of the user's viewing behavior.

The content storage 607 is a physical medium for storing content in the receiver/STB 601. In some embodiments, the content storage 607 is an integral component of the receiver/STB 601 including, but is not limited to, a hard drive, flash memory, or any physical storage component. In other embodiments, the content storage 607 may be an external storage device that is coupled to the receiver/STB 601 and serve as either a primary or secondary source of content storage. The content storage 607 stores nonlinear content captured by the receiver/STB 601 for non-real time viewing. In some embodiments, nonlinear content including but not limited to, television programming content, movies, Internet video clips etc., is stored in the content storage 607 as discrete files. Still in some embodiments, the content storage 607, in addition to storing nonlinear content, may also store targeted advertisements and promotions that are transmitted from the content operation center in advertising campaigns. In some embodiments, the content storage 607 may also store linear content transmitted and recorded by the receiver/STB 601 in real time at a transmission rate consistent for real-time viewing. On the contrary, the nonlinear content, unlike linear content, is often delivered to the receiver/STB 601 at a transmission rate independent of real-time viewing rate.

The metadata & file management system 608 manages metadata associated with programming content stored on disk including nonlinear content received by broadcast transmission, linear content received from broadcast transmission, and programming content received via unicast. The metadata may include tags corresponding to respective content that lists applicable content attributes such as content ID, show/movie/episode titles, channel, cast members, genres, program description and plot. In some embodiments, such metadata is used to aid the receiver/STB 601 in correctly categorizing and describing the content to the viewer. In other embodiments, such metadata is used by the receiver/STB 601 in enabling content search functionality on the receiver/STB 601.

The playout manager 609 controls the playout of content which includes but is not limited to television programming, Internet video clips and movies, etc. In some embodiments, the playout manager 609 is the engine that drives the playing of content on the receiver/STB 601 for display. The playout manager 609 operates closely with at least the user interface 606 in selecting the content to play. In some embodiments, the playout manager 609 supports MPEG2 and MPEG4 video encoding formats. In other embodiments, the playout manager 609 plays out linear content that are to be received by the receiver/STB 601 in real time, linear content that are to be received by the receiver/STB 601 that has been stored to disk, and nonlinear content stored in content storage 607. In other embodiments, the playout manager 609 also plays out internet video and audio clips stored in content storage module 607 and that have been suitably encoded or transcoded in a format supported by the playout manager 609.

The PDP module 610 is responsible for learning about the viewers' viewing behavior and patterns and determining the viewing preferences of viewers who use the receiver/STB 601 for viewing content. The PDP module 610 determines such preferences based on at least one of tracking viewing behavior, subscriptions for linear and nonlinear content, explicit requests by the user to record specific linear content, explicit requests by the user to capture specific nonlinear content, and explicit ratings for specific content. In some embodiments, the PDP module 610 tracks each viewer's viewing behavior, identifying programming content that is selected and viewed by the viewer as well as programming content that are presented to the viewer but ignored in the process of arriving at the selected programming content.

In some embodiments, the viewer may request subscriptions to linear and nonlinear content thus instructing the PDP module 610 to respectively record or capture the corresponding content on an ongoing basis. In some embodiments, the viewer may explicitly request recording of a specific linear content or may explicitly request capturing of a specific nonlinear content. In some embodiments, the system described also has the ability to rate the linear or nonlinear content viewed through the User Interface 606.

The PDP module 610, in some embodiments, uses the viewing preferences to determine the placement of content in the user interface 606 and to instruct the receiver/STB 601 to respectively record linear content and capture nonlinear content to disk. For example, a PDP module 610, after learning that a viewer has watched consecutive episodes of a particular programming content, will automatically instruct one of the broadcast tuners 605 to capture future episodes for the viewer and will instruct the user interface 606 to display such captured episodes to the viewer. Therefore, in some embodiments, the PDP module 610 operates closely with the broadcast tuners 605 in the receiver/STB 601 for capturing different content and with the user interface 606 for displaying content.

In some embodiments, the PDP module 610 also informs the recommendation engine 512 in the content operation center 501 of specific events with respect to the viewing behavior, subscriptions for linear and nonlinear content, explicit requests by the user to record specific linear content, explicit requests by the user to capture specific nonlinear content, and explicit ratings for specific content. These events are used by the recommendation engine 512 to determine novel content matching the viewers' preference to recommend to the viewers. The PDP module 610 receives these recommendations from the content operation center 501 and uses these recommendations to determine the placement of novel content in user interface 606 and to instruct the receiver/STB 601 to respectively record linear content and to capture nonlinear content into storage. In some embodiments, the PDP module 610 also informs the scheduler 506 in the content operation center 501 of specific events with respect to the viewing behavior, subscriptions for linear and nonlinear content, explicit requests by the user to record specific linear content, explicit requests by the user to capture specific nonlinear content, and explicit ratings for specific content events. These events are used by the scheduler 506 in determining or estimating demand for certain content.

The broadband network manager/peer-to-peer service manager 611 controls the communication interface with a broadband network. In some embodiments, it controls the interface for receiving information via the household's Internet connection. In some embodiments, this includes, but is not limited to, receiving unicast content through the broadband distribution network as made available from the content operation center 501, receiving content from other sources such as third party websites, and receiving system control messaging and software updates from the content operation center 501. In other embodiments, the broadband network manager 611 also controls communication that is sent from the receiver/STB 601 to the content operation center 501 or other STBs/receiver/STBs 601. For example, whenever the PDP module 610 sends viewers' information to the content management center for the recommendation engine, transmission of the viewers' information is controlled by the broadband network manager/peer-to-peer service manager 611. In other embodiments, the receiver/STB 601 has the ability to communicate directly with the content management center and other receiver/STBs 601 that are connected to the broadband network for obtaining uncorrupted version of program files or a portion of a program file for repairing one or more corrupted files received from transmission. The broadband network manager/peer-to-peer service manager 611 enables this peer-to-peer service by regulating communications such as requests and responses to other peers that are on a broadband network.

The content repairing module 612 repairs errors in content resulting from errors during reception of broadcast transmissions. In some embodiments, the detection and correction of errors is performed for nonlinear and linear programming content and other system communications such as schedule updates originating from the content operation center 501. In other embodiments, the detection and correction of errors is performed for linear programming content originating from local terrestrial digital television broadcasters. For example, assume that corrupted content received at a receiver/STB 601 is a result of broadcast transmission error. In some embodiments, the content repairing module 612 is able to detect and repair corrupted programming content received by the receiver/STB 601. After the corrupted content is detected, the content repairing module 612 sends a request to other peers connected to the broadband network, including other receiver/STB 601 and the content operation center 501, for an uncorrupted version of the corrupted content. In some embodiments, the content repairing module 612 is able to isolate a corrupted portion of the corrupted content and request an uncorrupted portion, corresponding to the corrupted portion of the corrupted content, from a peer to replace the corrupted portion of the corrupted content. In other embodiments, the content repairing module 612 detects a portion of the content as corrupted and requests for an uncorrupted version of the entire content as a replacement. In some embodiments, the content repairing module 612 is configured to detect and repair nonlinear content received at the receiver/STB 601 that are in form of files. The content repairing module 612 operates closely in conjunction with the broadband network manager/peer-to-peer service manager 611 to interact with peers who are also connected on the broadband network.

The advertising module 613 manages the advertisement and promotional content in the receiver/STB 601. In some embodiments, the advertising module 613 receives advertising promotional content from the content operation center 501 for the receiver/STB 601. The advertising promotional content received is either targeted to the content transmitted to the receiver/STB 601 or targeted to the viewers associated with the receiver/STB 601. The advertising promotional content received is, in some embodiments, stored in the content storage 607. In other embodiments, the advertising module 613 is responsible for removing and/or inserting advertising content. For example, nonlinear content received by the receiver/STB 601 may or may not have advertisement contained within. If the programming content does have original advertising content and the original advertising content is not targeted to the viewer of the content who is associated with the receiver/STB 601, the advertising module may remove the original advertising content, then retrieve selected downloaded advertising promotional content from the content storage 607 and insert advertising content targeted for the viewer into the programming content. If the programming content does not have original advertising content, appropriate advertising content targeted to the viewer will be selected from the downloaded programming content and inserted into the programming content. Removal of original advertising content may be performed before storage while insertion of targeted advertising content may be performed immediately before displaying of the programming content.

Hybrid Transmission of Content Delivery

Figure 7A:
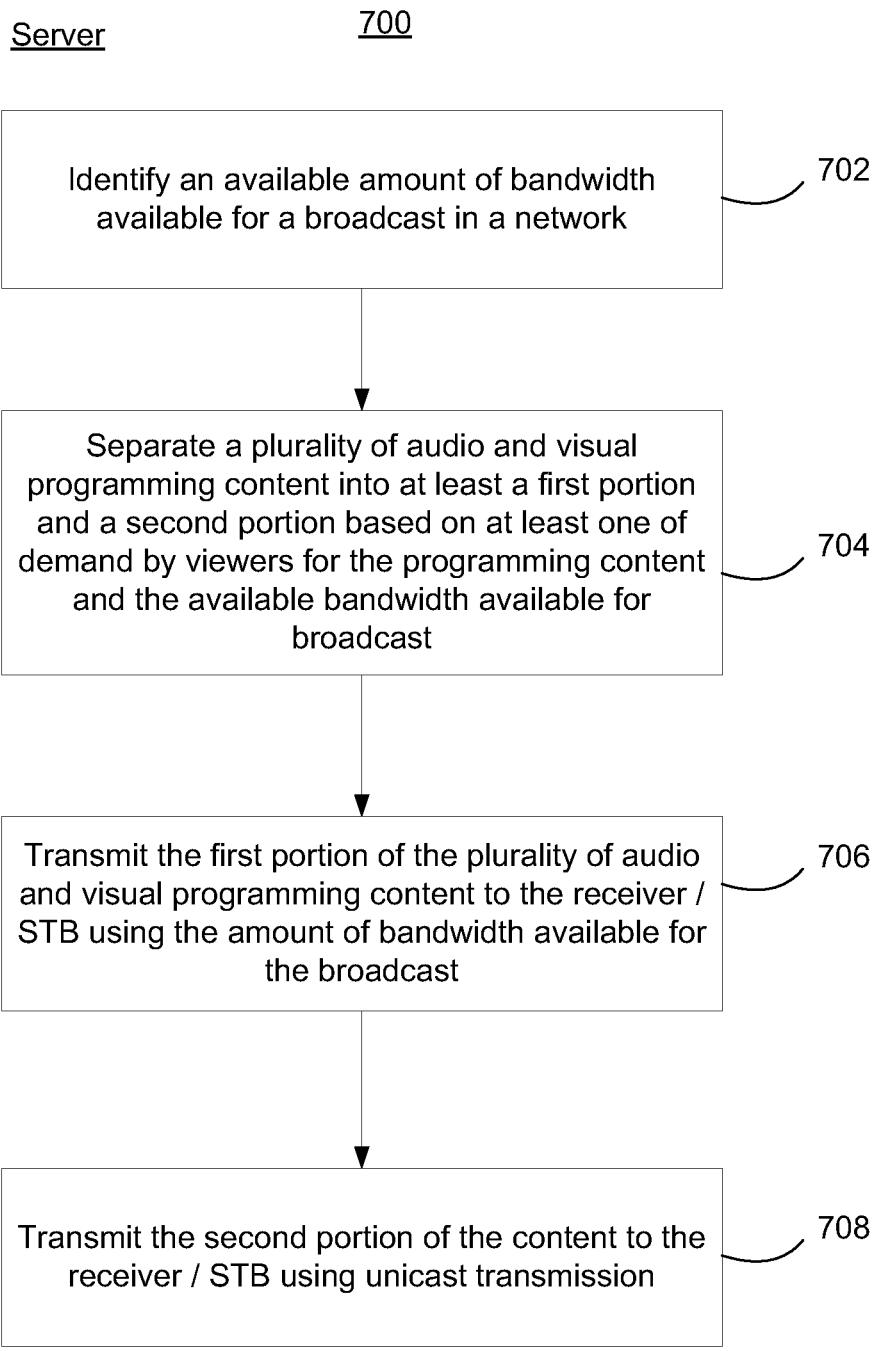
FIG. 7A is a flow diagram illustrating a delivery of content by hybrid modes of transmission, in accordance with some embodiments.

FIG. 7A is a flow diagram illustrating a method of delivering content by hybrid modes of transmission, in accordance with some embodiments. In some embodiments, as illustrated in such as flow diagram 700 in FIG. 7A, a hybrid delivery system, using at least a broadcast mode of transmission and a unicast mode of transmission, is used to deliver audio and visual programming content containing linear and nonlinear content.

A broadcast network used for broadcasting content in a hybrid delivery system may typically have a variable bandwidth. To deliver audio and visual programming content, an amount of available bandwidth available for broadcast in the network is to be identified, as shown in block 702. A plurality of audio and visual programming content for transmission to a receiver/STB is separated into at least a first and a second portion, based on at least one of demand by viewers for the plurality of audio and visual programming content and the amount of bandwidth available for the broadcast, as shown in block 704. Generally, any portion of content to be transmitted may include nonlinear content. The first and the second portions are generally prioritized where one of the portions, for example, the first portion, contains audio and visual programming content having a higher demand than other portions. It should further be understood that the content may be separated into more than two portions.

As shown in block 706, the first portion of the plurality of audio and visual programming content is transmitted to the receiver/STB using the amount of bandwidth available for the broadcast. The rate of transmission of the nonlinear content, if present, in the first portion, may be transmitted at a rate independent of a rate for real time viewing of the nonlinear content at the receiver/STB. Thus, the nonlinear content is typically not viewed in real time at the receiver/STB as the nonlinear content is being received by the receiver/STB. Instead, the nonlinear content is often stored for time-delayed viewing. The second portion of the plurality of audio and visual programming content may be transmitted to the receiver/STB using unicast transmission, as shown in block 708.

Figure 7B:
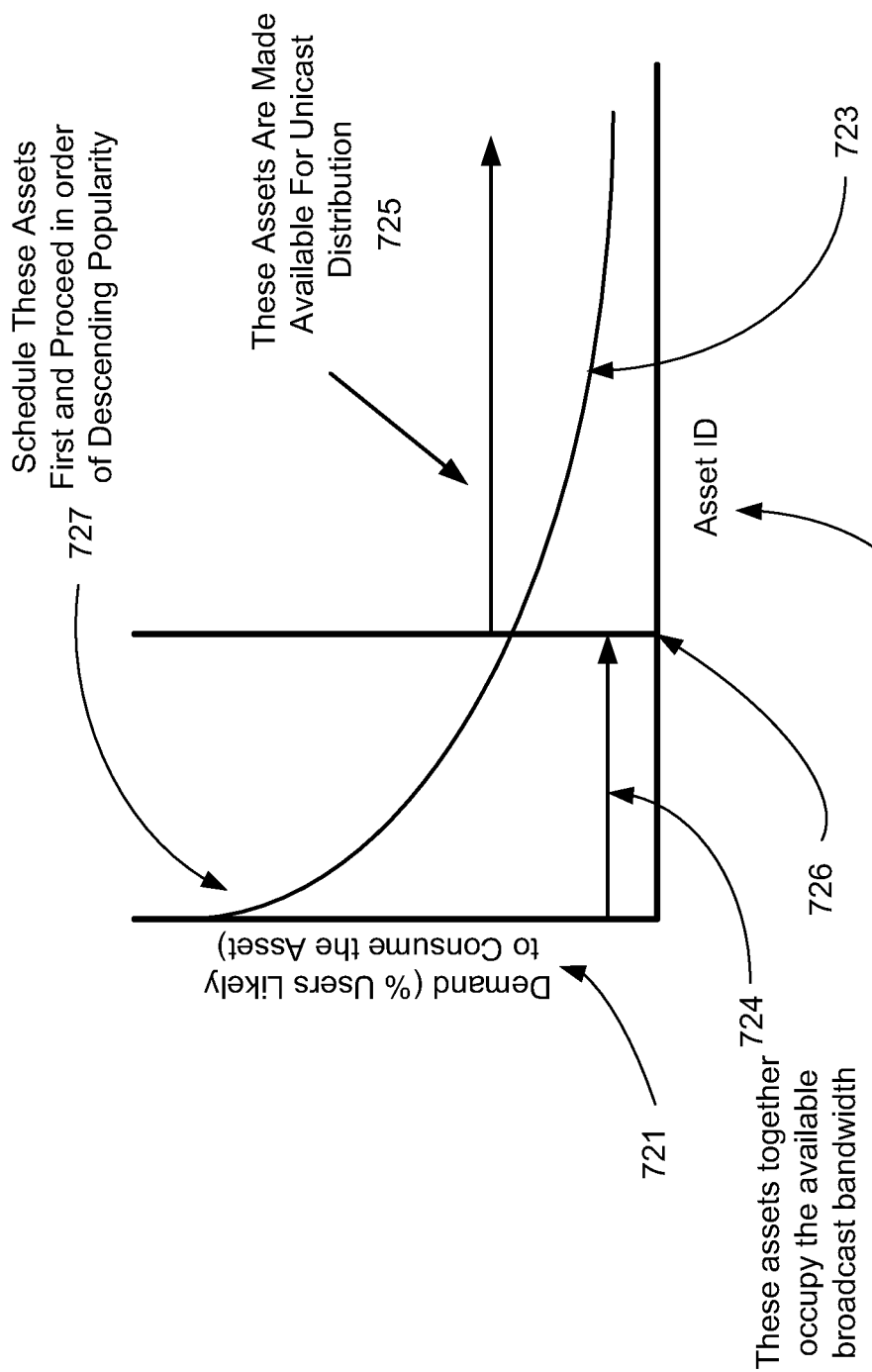
FIG. 7B is a schematic diagram illustrating a relationship between user demands and programming content identification of content which are to be broadcasted and content which are to be unicast, in accordance with some embodiments.

This procedure is further schematically illustrated in FIG. 7B. FIG. 7B is a schematic diagram illustrating a relationship between user demands and programming content identification of content which are to be broadcasted and content which are to be unicast in accordance with some embodiments. The y-axis 721 of the graph 720 represents a demand for certain programming content or the percent of viewers likely to consume the asset, and the x-axis 722 of the graph represents the identification of the programming content or asset identifications (IDs). The curve 723 is the demand by the identification of the programming content or asset IDs, where the asset IDs for various content are ordered by most popular on the left and least popular to the right. The threshold 726 represents a cutoff point where certain programming content or asset IDs, for example, those in a high demand region 724, are selected for broadcast, and where certain other programming content or asset ID, for example, those in a lower demand region 725, are made available for unicast transmission. This cutoff point is determined by the available broadcast bandwidth. In the high demand region 724, programming content or assets together occupy the available broadcast bandwidth. The programming content designated for broadcast is transmitted by the available bandwidths in broadcast networks, while the content designated for unicast transmission is made available to the broadband distribution network 515. In some embodiments, the content designated for unicast distribution is automatically pushed to the corresponding receiver/STBs or are indicated as ready for download by the receiver/STBs which then download the content over the broadband network. In other embodiments, content may be designated for unicast distribution but are downloaded only upon explicit feedback by the end user.

Audio and visual programming content includes linear content and nonlinear content. For instance, audio and visual programming content may include television programs, movies, and all video content having an audio component (e.g., video clips found on YouTube™). Linear content and nonlinear content differ in several ways. Linear content is content delivered to a receiver/STB at a fixed transmission rate that is possible for the viewer to view the linear content in real time as the linear content is being downloaded. Nonlinear content, in contrast, is delivered at a rate independent of the transmission rate of the linear content. Nonlinear content may be transmitted to a receiver/STB at a rate that varies from the rate at which linear content is being transmitted. Nonlinear content may be transmitted to a receiver/STB at much higher (or slower) speed than linear content. For example, a television program containing forty minutes of viewing content may be downloaded to a receiver/STB in less than ten minutes. In other words, nonlinear content is transmitted at a rate that independent of the rate of transmission suitable for real-time viewing by user as the content is being transmitted.

Nonlinear content is also not part of a concatenation of programming. While nonlinear content and linear content are delivered using the same available bandwidth in a broadcast stream, and the assets compromising linear streams are programmed to be viewed in a concatenated manner, the individual assets comprising nonlinear content are not concatenated and are not meant to be presented to the viewer in a preset order and are not meant to be viewed in a preset order. While nonlinear content is stored as discrete files at the content operation center 501, nonlinear content may be transmitted by at least one of several ways. In some embodiments, nonlinear content is transmitted in a form of discrete files that are not part of a concatenation of programming for receiving and storing at one or more receiver/STB.

In other embodiments, portions of nonlinear content, each in the form of discrete files, are encoded into an aggregate file for transmission. In some embodiments the encoding may include both interleaving the bits in each discrete file together with the application of forward error correction. After encoding, the aggregate file is delivered by broadcast transmission to the receiver/STBs. After the aggregate file is received at the receiver/STB, it is decoded back into individual discrete files of nonlinear content for storing and non-real time play back. The encoding process may be important in situations where further resiliency to broadcast reception errors is required or where a subset of receivers is only able to receive a subset of the encoded file. In such cases, the encoding still allows the recovery of each individual nonlinear asset in an error free manner. Linear content, by comparison, is transmitted in a form of linear streaming to the receiver/STB for viewing in real time and/or for recording in real time.

Nonlinear content is stored at a receiver/STB as discrete files for play back at a time different from the time of transmission. Each discrete file representing a complete programming content such as a movie or a television episode, etc. Therefore, in some embodiments, the nonlinear content generally cannot be viewed by the viewer as the nonlinear content is being transmitted, at least not until sufficient amount of the nonlinear content is buffered at the receiver/STB. The nonlinear content is generally viewed at a time after it is downloaded and stored at the receiver/STB.

There are also differences in the different modes of transmission. Broadcast transmission is the transmission of content from a single point source to multiple points or destinations; whereas, unicast transmission is the transmission of content from a single point source to a single destination. For example, when content is broadcasted, the content may be received and captured by different receiver/STB in different households. However, when content is unicast, the content is aimed at a particular receiver/STB at a particular household. While the transmission bandwidth of broadcast networks is generally dynamic and variable over time, it may also be fixed. In other words, the bandwidth available in a broadcast stream for transmission of data changes, depending on the amount of bandwidth used by the network to transmit its content. For example, this is particularly the case when the broadcast bandwidth used are owned and controlled by affiliates 109 that are independent networks using a portion of their broadcast bandwidth for their own terrestrial digital television broadcasts. For example, such an affiliate may transmit about 6 Mbps of its content in the morning, but transmits about 15 Mbps of its content during primetime. If in this example, the entire bandwidth is 20 Mbps, then, about 14 Mbps is available in the morning and about 5 Mbps of bandwidth is available during prime time. In some embodiments, each individual broadcast stream in a network is defined as a single data channel for content transmission. For example, a local broadcast affiliate of ABC network broadcasts one stream of data and this stream of data forms a single data channel for content transmission in this system. The dynamic and varying nature of bandwidth availability also applies similarly to unicast transmissions.

Another manner that differentiates broadcasting and unicast transmission is the content that is transmitted in each mode. Audio and visual programming content of the highest demand by viewers are broadcasted; whereas, programming content of low demand or specifically requested by viewers are transmitted by unicast transmission. Furthermore, content transmitted by unicast transmission may be initiated by a server without a prior request by the user. An example of this type of content is "long tail" content which only a small subset of the viewer base is likely to consume but are very likely to be consumed by those specific viewers that have an expressed or implied likelihood to consume. In some embodiments, the different content being transmitted by broadcast transmission is allocated for transmission by various broadcast networks in accordance with a set of criteria associated with the broadcast transmission characteristics of a plurality of broadcast networks in which the content is being transmitted. The set of criteria includes at least available bandwidths on different broadcast networks, number of subscribers reachable by each broadcast network, and costs of data transmission in each broadcast network. Similarly in some embodiments, the different content being transmitted by unicast transmission are allocated to different unicast distribution methods in accordance with a set of criteria associated with the unicast transmission characteristics of a plurality of unicast networks in which the content is being transmitted. The set of criteria includes at least available bandwidths on different unicast networks, number of subscribers reachable by each unicast network, and costs of data transmission in each unicast network.

In some embodiments, linear content may be received at the content operation center 501 either by linear streaming or from physical storage media. In some embodiments, for linear content received by linear streaming, the linear content is processed in real time before being sent for immediate delivery. In some embodiments, the processing also includes at least transcoding and/or encryption of the linear content in real time. The processed linear content is fed directly into the available bandwidth in a broadcast stream for delivery to viewers. In some embodiments, the linear content that is received by linear stream is not stored. However, linear content received by linear streaming may sometimes be stored and either broadcasted later as linear content, for viewing in real time, or as nonlinear content where the rate of transmission is not suitable for real time viewing. In other embodiments, content received in form of discrete files or from physical storage media may be transmitted as linear content and are transmitted to viewers at a rate of transmission suitable for real time viewing, at a particular designated time. For example assume, a brand new, never aired episode of a popular television series is obtained from the television series producer. The episode is targeted to be aired and viewed by viewers in real time, according to a particular schedule. In most cases, such an episode will not be available as nonlinear content for broadcasting at least until the same time that the episode is schedule to be broadcasted for real time viewing. In some embodiments, all linear content that is transmitted at a rate suitable for real time viewing is delivered by broadcast transmission. In other embodiments, certain linear content may be transmitted at a rate suitable for real time viewing by unicast transmission.

In some embodiments, audio and visual content may be separated into different portions based on demand by viewers for each of the different portions. The estimated demand for different audio and visual programming content is based on one or more factors. In some embodiments, there are at least six different factors from which demand by viewers may be determined and on which separation of content can be based. First is a list of interaction events resulting from watched programming content, such as watched television content, that is selectively chosen for viewing by the one or more viewers using a user interface to control the selection of the programming content. Second is a list of interaction events resulting from ignored programming content, such as ignored television content that is browsed but not selected in the user interface. Third is a time of day and week wherein at least one of the first list of interaction events and the second list of interaction events occurred. Fourth are ratings of programming content, such as general television content, submitted by the one or more viewers about the television content viewed, using a user interface. Fifth is programming content, such as movies, television content, etc., specifically requested by the one or more viewers. And, sixth is programming content, such as specific television series or movies etc., which is selectively captured by the receiver/STB in response to one or more viewers' commands.

While in some embodiments demand from viewers may be directly estimated from at least one of the above factors, in other embodiments, different factors regarding the consumption of content serve as input into, for example, a recommendation engine 512 that further processes these factors to estimate demand. This may prove useful for instance in estimating demand for shows that have had no prior history of consumption and have not been available to the viewer base. In some embodiments, there are at least six different factors that may be processed by a recommendation engine 512 to estimate demand by viewers and on which separation of content can be based. First is a list of interaction events resulting from watched programming content, such as watched television content, that is selectively chosen for viewing by the one or more viewers using a user interface to control the selection of the programming content. Second is a list of interaction events resulting from ignored programming content such as ignored television content that is browsed but not selected in the user interface. Third is a time of day and week wherein at least one of the first list of interaction events and the second list of interaction events occurred. Fourth are ratings of programming content, such as general television content, submitted by the one or more viewers about the television content viewed, using a user interface. Fifth is programming content, such as movies, television content, etc., specifically requested by the one or more viewers. And, sixth is programming content, such as specific television series or movies etc., which is selectively captured by the receiver/STB in response to one or more viewers' commands.

In gathering viewer information, such as those described above, about a programming content, a specific demand for the programming content may be established. Further, this specific demand may be determined for a particular geographical region or demographic population. In contrast, when such information provided by a viewer is analyzed for a particular viewer or user, a profile can be created for each viewer and the viewer's individual preference is identified. Moreover, a continuous analysis of the information gathered may allow a system to modify and adjust the viewer's preference and modify the viewer's profile containing the viewer's preferences.

In some embodiments, separation of content may be based on other factors in addition to those defining demand of particular programming content. For instance, programming content may be separated based on how content can be most conveniently delivered to a specific demographic population. In an example, certain foreign language based programming content, such as Spanish, may be more conveniently be delivered by a particular network because that network broadcasts to a region most populated by a Spanish speaking viewer base. Separation of content may also be based on a cost factor. For example, a satellite network may be able to reach a larger population, but using a combination of WiMax broadcast and a terrestrial broadcast at different times may reach the same population at a lower cost Therefore, the content may be divided not simply based on the type of transmission, but also based on the times at which the network becomes available for transmission, at a lower cost. The above examples are merely illustrations of different ways in which content can be separated. The theme is that content is separated before transmission. Content separation may be based on one or more factors that include but is not limited to, at least, a mode of transmission, a time of transmission, rate of transmission, user demand, viewers reached of a network, and cost of data transmission, etc.

In some embodiments, broadcast transmission comprises at least one of several different types of networks, including, but not limited to, a wired broadcast network, a wireless broadcast network, and an Internet Protocol (IP) multicast network. In some embodiments, the wired broadcast network may be a cable network. Whereas, in other embodiments, the wireless broadcast network may be at least one of a satellite broadcast network, a terrestrial broadcast network, an ATSC DTV broadcast, a local cellular broadcast network, and a WiMax broadcast. In some embodiments, different broadcast networks are selected for broadcasting different portions of the content to be delivered. Generally, a schedule is created by the scheduler. This schedule contains information about where and when content including linear and nonlinear content will be transmitted by broadcasting and unicast transmission. The schedule is sent to the different receiver/STBs at different households so that the receiver/STBs can capture the particular linear and nonlinear programming content preferred by each viewer associated with the receiver/STBs.

Optimizing Content Transmission Using Different Schemes

Figure 8:
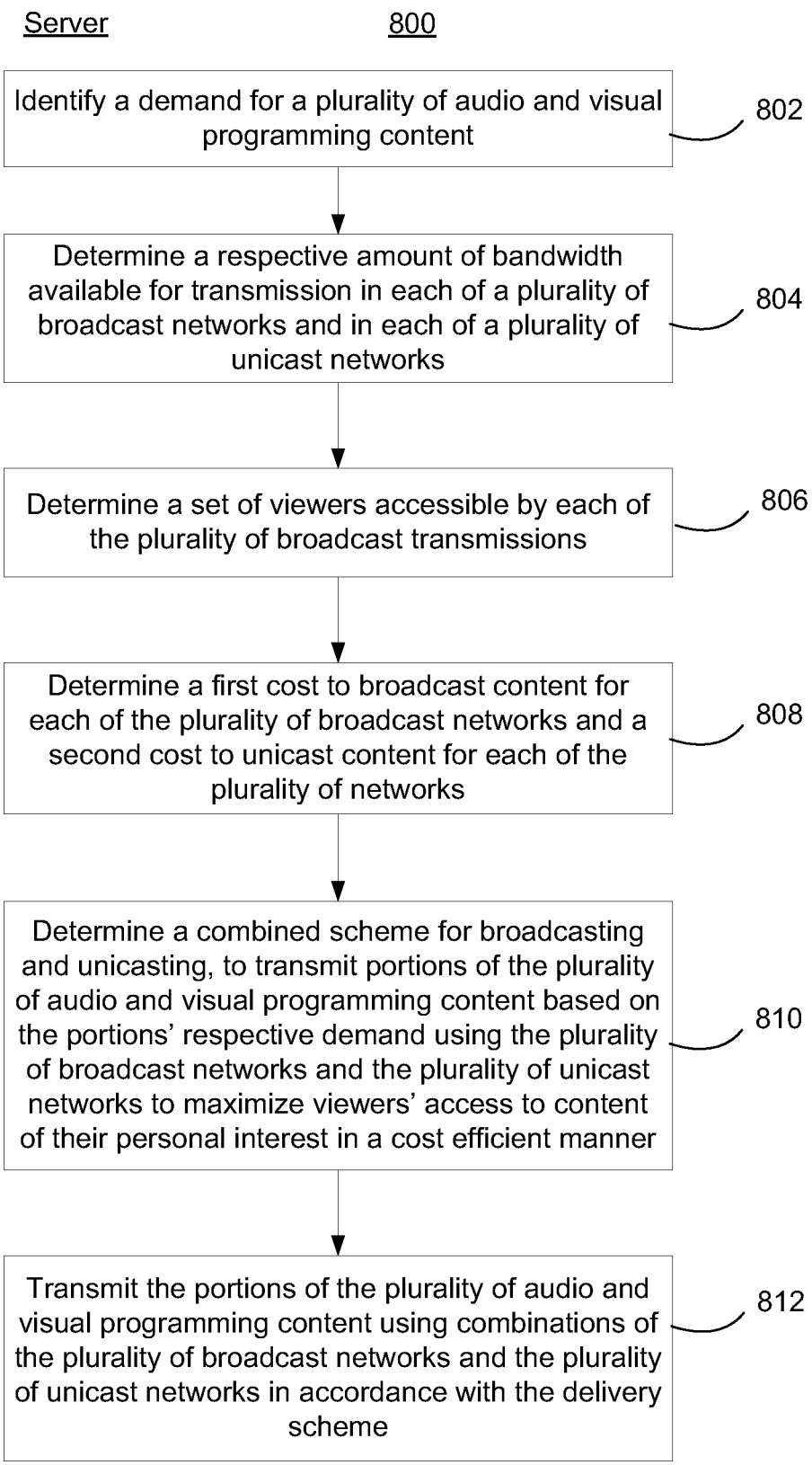
FIG. 8 is a flow diagram illustrating a method for selecting a broadcast scheme in a hybrid delivery system in accordance with some embodiments.

FIG. 8 illustrates a method for selecting a combined scheme for broadcasting and unicast transmission in a hybrid delivery system in accordance to some embodiments. A combined scheme having multiple broadcast networks and multiple unicast networks for transmitting data is used for transmitting content. Such a method of transmitting content using a combination of multiple broadcasting networks and multiple unicast transmission networks is described in flow chart 800. In some embodiments, a demand for a plurality of audio and visual programming content is identified, as shown in block 802. A respective amount of bandwidth available for transmission in each of a plurality of broadcast networks and in each of a plurality of unicast networks is to be determined, as shown in block 804. A set or group of viewers accessible by each of the plurality of broadcast transmissions is determined, as shown in block 806. The different costs associated with each of the plurality of broadcast networks and with each of the plurality of unicast networks are also determined, as shown in 808. A combined scheme for broadcasting and unicast transmission is determined, based on several factors, to maximize viewers' access to content of their respective interests, in a cost efficient manner, is shown in block 810. The factors include the different levels of viewers' demands for different content, the availability of the bandwidth in the plurality of broadcast networks and the plurality of unicast networks, the accessibility in reaching viewers by each of the plurality of broadcast networks, and the cost associated with transmitting content in each of the plurality of broadcast networks and each of the plurality of unicast networks. The different content is transmitted in portions using combinations of the plurality of broadcast networks and the plurality of unicast networks in accordance with the delivery scheme, as shown in block 812.

In some embodiments, content is distributed in accordance with demand. For example, content with a higher demand is generally transmitted using broadcasting while content that is in less demand is generally transmitted using unicast transmission to viewers specifically requesting the content. As such, understanding viewers' demand for different content is used in deciding which combination of using different modes of transmission is suitable for delivering a particular content to viewers demanding the content at a lowest cost per data transmitted.

Determining an availability of bandwidth for each broadcast and unicast network at any particular time is used for determining a schedule. In some embodiments, each of the different broadcast networks has a dynamic bandwidth that varies in time. In other embodiments, each of the different broadcast networks has a fixed bandwidth. Still, in other embodiments, some broadcast networks have dynamic bandwidths while others have fixed bandwidths. Similarly, in some embodiments, each unicast network has a dynamic and variable bandwidth. In other embodiments, each different unicast network has a fixed bandwidth. Still, in some embodiments, there may be a mix of unicast networks, some having dynamic and variable bandwidth, and others having fixed bandwidth. Therefore, understanding when and which particular broadcast networks and which particular unicast networks have the bandwidth available for transmissions is useful for determining a transmission schedule.

In some embodiments heterogeneous broadcast networks may be employed wherein the broadcast networks have different throughputs, possibly different or overlapping coverage in terms of subscribers, and diverse cost profiles. In these cases it is beneficial to ensure that content is delivered over the combination of broadcast networks in such a fashion as to maximize the ability of users to access the content of personal interest in as efficient a manner as possible. The general procedure to perform such maximization is to establish one or more cost functions and one or more associated constraints in order to reduce the problem to an optimization problem. This procedure is illustrated for heterogeneous broadcast as follows where, for simplicity, it is assumed that the broadcast networks have constant transmission bandwidth:

Let i label each content element and let n label each available broadcast network. Let matrix B represent the broadcast transmission of content i over network n where B(i,n)=1 if asset i is to be broadcast over network n and B(i,n)=0 otherwise.

Let matrix "Reach" represent the ability for broadcast network n to reach subscriber s where Reach(n,s)=1 if network n can reach subscriber s and Reach(n,s)=0 otherwise.

Let matrix "Demand" represent a measure of demand by subscribers for specific content assets, so that Demand (s,i) is then a measure of demand by subscriber s for content i Let matrix "Cost" represent the broadcast transmission cost of the programming content so that Cost(n,i) is the cost of transmission of programming content i over network n.

Then in one embodiment, the heterogeneous broadcast optimization problem is to determine matrix B according to:

Maximize Over matrix B: Trace(Demand*Min{[B*Reach],1});

While limiting the total cost of broadcast Trace(B*Cost) below a predetermined value; and While ensuring that the capacity of no broadcast network is exceeded.

The matrix B so determines and establishes which programming content to broadcast on which networks.

Similarly, each different broadcast network may reach a different set of viewers. In some embodiments, some broadcast networks are located in densely populated areas, thus reaching large sets of viewers. In other embodiments, some broadcast networks are located in sparsely populated areas, thus reaching smaller sets of viewers. Still, in some embodiments, some broadcast networks broadcast to geographical areas highly populated by a particular social or demographic group, thus more suitable for delivering content to viewers fitting the particular demographics. Broadcasting is generally a preferred means of delivering content because of its efficiency in reaching a large set of viewers. In some embodiments, a combination of different broadcast networks reaching different social or demographic groups can be used to reach a diverse group of viewers.

Cost of transmission of content is a factor in determining a combined scheme. In some embodiments, keeping cost at a minimum is a goal, and therefore broadcasting may be favored for delivering most content. However, in other embodiments, in order to ensure that a maximum set of viewers can receive the most generally demanded content or content in which each viewer specifically requested, unicast transmission may be used for content delivery. Unicast transmission is generally more costly than broadcast transmission, but is effective to ensure successful delivery of content to specific individuals as long as these viewers are connected to a broadband network.

A combined scheme for content delivery using a combination of broadcast networks and unicast networks is aimed at maximizing viewers' access to content of their respective personal interests in a most cost efficient manner. Specifically, the combined scheme is targeted to reduce cost per viewer in receiving portions of the plurality of audio and visual programming content demanded by the viewers while maximizing the set of viewers to which the content can be delivered for each broadcast transmission. In some embodiments, when the bandwidth of the plurality of unicast networks is zero, or cost of data transmission for each of the plurality of unicast networks is prohibitively high, no unicast network is used. In other embodiments, the broadcast networks can reach a sufficiently large set of viewers, so no unicast transmission has to be used for content delivery. Still, in some embodiments, content designated for unicast distribution or transmission is available for download by a set of end users and is transmitted upon explicit request by the end users. In other embodiments, content designated for unicast distribution or transmission is content that is pushed from a content operation center, including content from a recommendation engine that is based on viewers' personal preferences.

A combined scheme can be used to deliver audio and visual programming content including both linear and nonlinear content. Nonlinear programming content is transmitted at a rate independent of a rate of transmission suitable for real time viewing of the nonlinear programming content at the time of receiving the nonlinear programming content at the receiver STB. Linear programming content is generally delivered using broadcast transmissions and may sometimes be delivered using unicast transmission. Broadcast transmissions may include at least one of a wired broadcast, a wireless broadcast, and an IP multicast. Furthermore, the wireless broadcast may include any one of a satellite broadcast, terrestrial broadcast, local cellular broadcast, IP multicast, and a WiMax broadcast. Content scheduled for broadcasting is generally inserted in available bandwidth in an existing broadcast stream of a broadcast network, such as an available bandwidth in an ATSC digital broadcast of a broadcast network.

Figure 9:
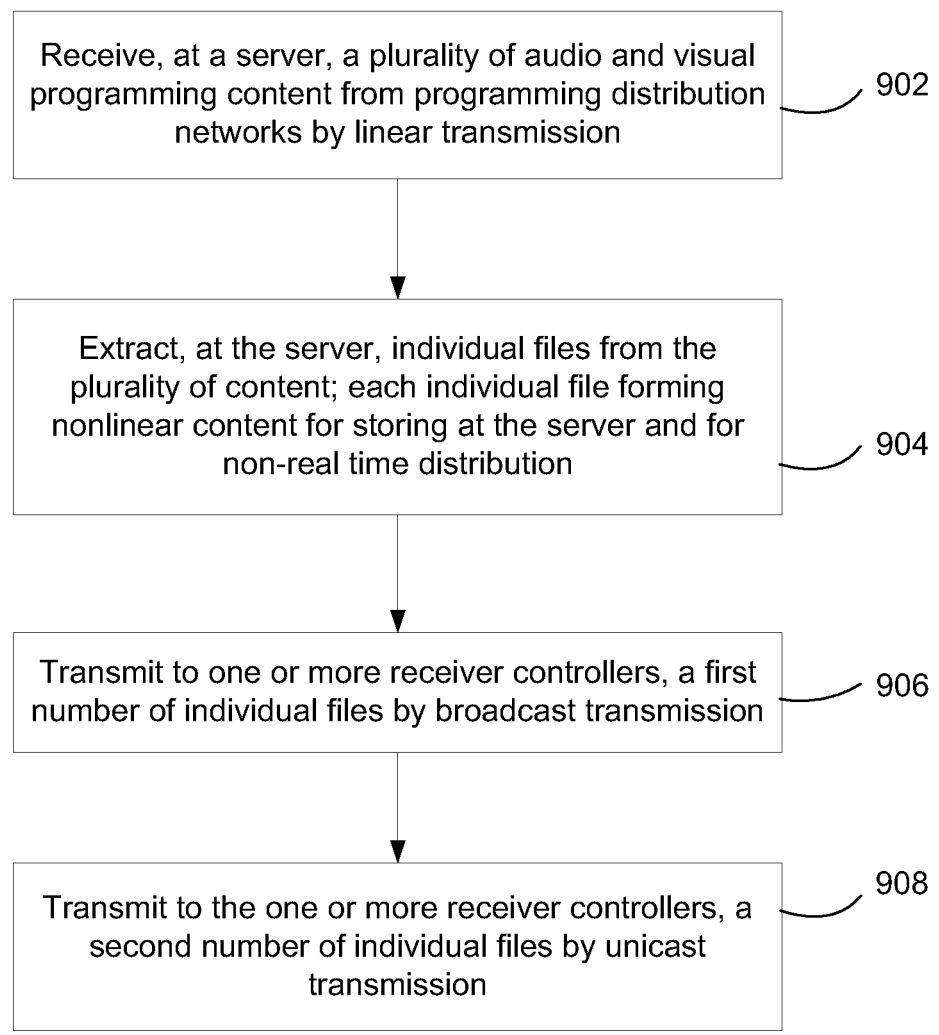
FIG. 9 is a flow diagram illustrating separation and extraction of content into nonlinear content for hybrid delivery, in accordance with some embodiments.

FIG. 9 is a flow diagram illustrating a separation and extraction of content into nonlinear content for hybrid delivery in accordance with some embodiments. In some embodiments, nonlinear content is ingested directly as individual discrete files from physical storage media. However, in other embodiments, nonlinear content may be ingested from linear feeds, then separated and extracted from the linear feeds into individual discrete files for processing. In most cases, nonlinear content is stored before they are sent for delivery.

In some embodiments, flow diagram 900 in FIG. 9 illustrates a method where nonlinear content is separated and extracted from linear feeds. A plurality of audio and visual programming content is received from one or more programming distribution networks by linear streaming, also known as linear transmission or linear feed, as shown in block 902. A component in the content operation center 501, such as the content preparation and modification system 103 or the content download manager 502, extracts individual files from the plurality of audio and visual programming content into individual files. Each individual file forms a different nonlinear content for storing at a component of the content operation center 501, such as the content storage module 507. These files are stored for a time delayed distribution for non-real time viewing, as shown in block 904. From the content storage module 507, a first number of individual files that are nonlinear content will be selectively retrieved and transmitted to one or more receiver/STBs by broadcast transmission, as shown in block 906. Similarly, a second number of individual files that are also nonlinear content will be selectively retrieved and transmitted to one or more receivers by unicast transmission, as shown in block 908.

Nonlinear content ingested from physical storage media may be conveniently ingested as discrete files. In other embodiments, when nonlinear content is ingested in a form of a linear stream, extraction is more time consuming as the nonlinear content is ingested at the rate of transmission of the nonlinear content, such as a transmission rate suitable for real time viewing, and then separated into discrete files corresponding to the respective nonlinear programming content. The nonlinear content extracted from linear feeds may then be processed before storage. Such processing may include but is not limited to the processes of transcoding and encryption.

Broadcasting is a single point to multiple point transmission. As described before, in some embodiments, a broadcast network may be any one of a wired broadcast network, a wireless broadcast network and an IP multicast network. In some embodiments, a wired broadcast network is a cable network. However, in other embodiments, a wireless broadcast network may include at least one of satellite broadcast, terrestrial broadcast, ATSC DTV broadcast, local cellular broadcast, and WiMax broadcast. In some embodiments, the broadcast transmission utilizes extra bandwidth in the broadcast stream, such as available bandwidth on an ATSC digital broadcast stream, for delivery of content.

The nonlinear content, once extracted is generally transcoded and then encrypted before being stored. While most nonlinear content goes through similar processing, different nonlinear content are demanded differently by viewers. For purposes of illustration and not by restriction, assume there are two groups of individual files, all representing nonlinear content. A first number of individual files having a first aggregate demand by a segment of viewers, and a second number of individual files having a second aggregate demand by a same segment of viewers. Further assuming that the first number of files has a higher aggregate demand than the second number of files. The first number of files may be identified for broadcast transmission while the second number of files may be identified for unicast transmission. While this is a simplified analogy, the object is that different groups of nonlinear files are often selected by one or more factors for different modes of transmission.

Figure 10:
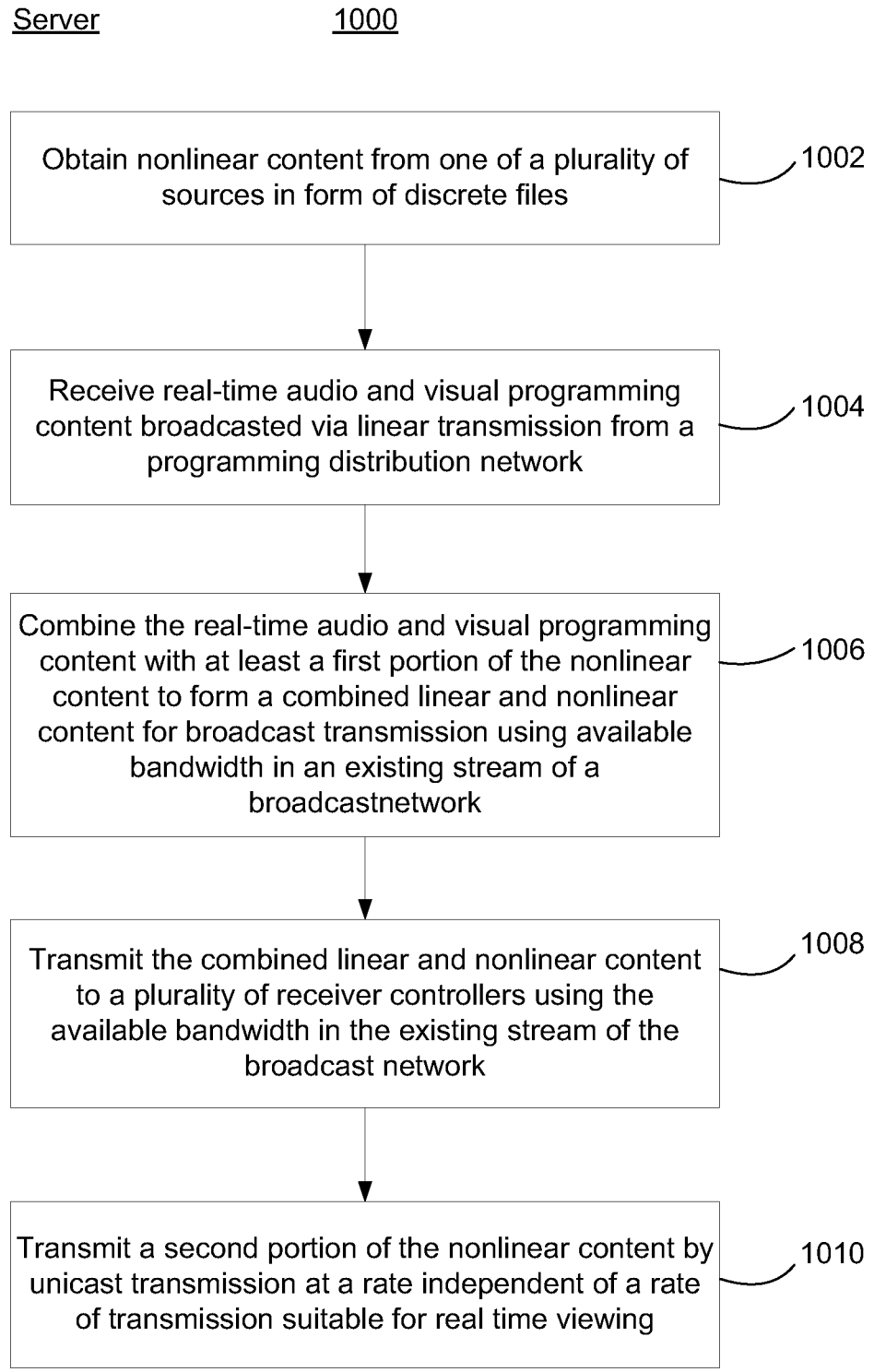
FIG. 10 is a flow diagram illustrating a method of combining of linear and nonlinear content for transmission, in accordance with some embodiments.

In some embodiments, linear and nonlinear content are combined before being further delivered to viewers. FIG. 10 is a flow diagram illustrating combining of linear and nonlinear content for transmission in accordance to some embodiments. In some embodiments, the combined linear and nonlinear content is to be inserted into an available bandwidth in a broadcast stream for broadcast transmission. In other embodiments, the combined linear and nonlinear content is prepared for unicast transmission.

Flow diagram 1000 illustrates the combining of nonlinear and linear content for either broadcast or unicast transmission. Nonlinear content is usually obtained in form of discrete files, originally from either a linear feed or a physical storage, as shown in block 1002. Linear content, such as real time audio and visual programming content, may be received in form of linear streaming from an audio and visual programming distribution network, as shown in block 1004. In some embodiments, the real time audio and visual programming content is combined with at least a first portion of the nonlinear content, forming a combined linear and nonlinear content, for insertion into an available bandwidth in an existing stream of a broadcast network for broadcast transmission, as shown in block 1006. In the same embodiments, the combined linear and nonlinear content is transmitted to a plurality of receiver/STBs using the available bandwidth in the existing stream of the broadcast network, as shown in block 1008. A second portion of the nonlinear content which is not combined with the linear content is transmitted by a unicast transmission at a rate independent of a rate of transmission suitable for real time viewing. Therefore, FIG. 10 illustrates some embodiments where a combined linear and nonlinear content is transmitted by broadcast transmission, while a portion of the non-combined nonlinear content is transmitted by unicast transmission.

For some embodiments, linear content may not originate from a linear feed but instead originate from a physical storage media. In both cases, the linear content is being transmitted at a rate of transmission which is suitable for real time viewing as the linear content is being received by the viewer. For instance, in one case where the linear feed is already being transmitted at a rate suitable for real time viewing, the linear feed can be inserted directly into the broadcast stream at that rate of transmission. For linear content that may original from a physical storage media, the linear content will be played out at a rate suitable for real time viewing and then inserted into the broadcast stream for broadcast transmission. On the contrary, nonlinear content are discrete files and since they are intended for a time delayed distribution and for non-real time viewing, they can be transmitted at any rate and do not have to adhere to the exact rate of transmission that is suitable for real time viewing. In some embodiments, discrete files of nonlinear content are each sent individually at a higher transmission rate. In other embodiments, portions of nonlinear content, each in the form of discrete files, are encoded into an aggregate file for transmission. In some embodiments the encoding may include both interleaving the bits in each discrete file together with the application of forward error correction. In such embodiments, since discrete files are encoded and combined into a larger aggregate file, the information associated with each discrete file is actually transmitted at a rate slower compared to when each discrete file is sent individually.

As mentioned above, nonlinear content is intended for non-real time viewing and can be transmitted at any rate and do not have to adhere to the exact rate of transmission that is suitable for real time viewing. This allows a greater degree of flexibility in how and when nonlinear is distributed. This is particularly the case when the broadcast bandwidths used are owned and controlled by affiliates 109 that are independent networks that use a portion of their broadcast bandwidth for their own terrestrial digital television broadcasts. When a certain bandwidth is already occupied with live content transmitted by the network for real time viewing, a certain amount of bandwidth remains. In this remaining bandwidth, a fixed amount is used for sending linear content. Since linear content is being transmitted at a constant rate for play out over a certain period of time, during this time period, the amount of bandwidth used for the linear content transmission is constant. Therefore, the leftover bandwidth is available for broadcast transmission of nonlinear content. While each discrete file of a nonlinear content is of a certain size, if one discrete file is sent using all the leftover bandwidth, the discrete file can be transmitted faster as compared to when multiple discrete files are combined together using the same amount of left over bandwidth. When multiple discrete files are aggregated together on the leftover bandwidth, the capacity of the leftover bandwidth is split among the multiple files, and so the size of bandwidth for each discrete file being transmitted is less and so it will take longer for each discrete file to be transmitted.

In some embodiments, the nonlinear content may be stored at the affiliate prior to being combined into the available bandwidth in the broadcast stream before transmission. While generally, the linear content is directly streamed through without being stored, as described earlier, some content that is to be streamed at a linear content transmission rate may be first stored at the affiliate and played out at a rate for transmission suitable for real time viewing. In some embodiments, the broadcast network may include any of a wired broadcast network, a wireless broadcast network, and an IP multicast network. The wireless broadcast network may further include any of a satellite broadcast, terrestrial broadcast, ATSC DTV broadcast, local cellular broadcast and WiMax broadcast. In some preferred embodiments, the available bandwidth may be extra bandwidth in an ATSC digital broadcast of a broadcast network.

Figure 11:
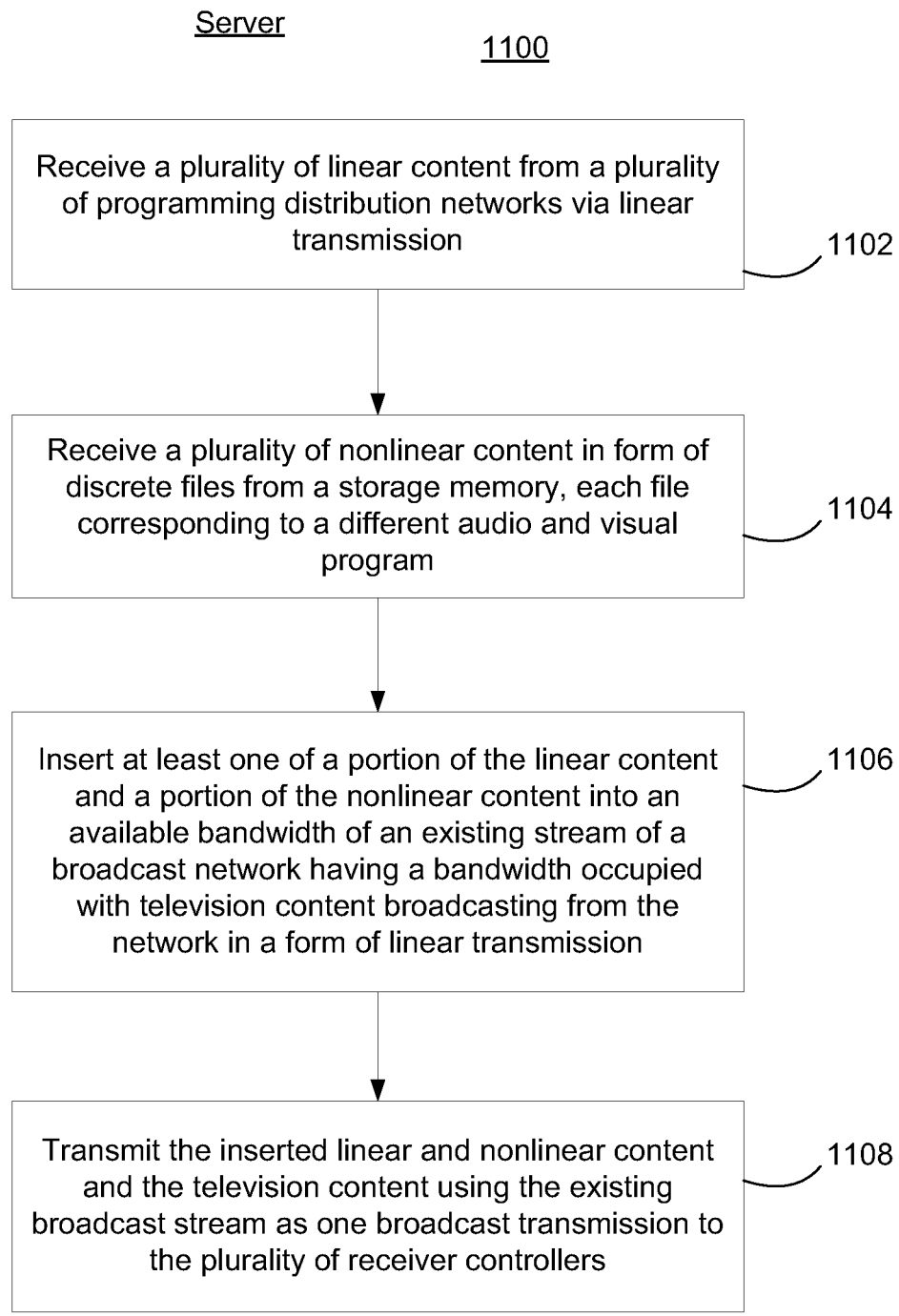
FIG. 11 is a flow diagram illustrating insertion of linear and nonlinear content into an available bandwidth of a broadcast stream for broadcast transmission, in accordance with some embodiments.

In some embodiments, the combined linear and nonlinear content are inserted into an available bandwidth in an existing broadcast stream for broadcast transmission to viewers in different households. In some embodiments, the existing broadcast stream has a certain bandwidth occupied by live television programming content that is broadcasted at a transmission rate for real time viewing when received by the viewers. FIG. 11 is a flow diagram illustrating insertion of linear and nonlinear content into an available bandwidth of a broadcast stream for broadcast transmission in accordance with some embodiments.

In some embodiments, the combined linear and nonlinear content is multiplexed into the linear stream of a broadcast network at the affiliate. Flow diagram 1100 illustrates the insertion of linear and nonlinear content into an existing stream of a broadcast network. In some embodiments, a plurality of linear content from a plurality of audio and visual programming distribution networks is received by an affiliate via linear streaming transmission as shown in block 1102. In the affiliate, a plurality of nonlinear content in form of discrete files is retrieved from a storage memory. Each of the discrete files corresponds to a different audio and visual program, as shown in block 1104. An available bandwidth in an existing stream of a broadcast network in the affiliate is to be identified. The existing stream will have a portion of bandwidth occupied with, for example, television content broadcasting from the network in a form of a linear streaming transmission at a transmission rate suitable for real time viewing. After the available bandwidth is identified, at least one of a portion of the linear content and a portion of the nonlinear content are inserted in the identified available bandwidth to form an inserted content, as shown in block 1106. The inserted content is to be transmitted with the television content broadcasted in the same existing stream of the network as one broadcast transmission to the plurality of receiver/STBs, as shown in block 1108. The portion of linear content, if present, in the inserted content, and the television content broadcasted from the network are transmitted at a rate of transmission suitable for real time viewing. However, the portion of nonlinear content, if present, in the inserted content, will be transmitted at a rate independent of the rate of transmission suitable for real time viewing. Therefore, even though the linear and nonlinear content are combined and inserted into the available bandwidth of the broadcast stream as the linear television content, the rates of transmission for the different content can be different from each other.

The broadcast stream of each broadcast transmission is dynamic and variable. The bandwidth available on each broadcast stream varies over time depending on the amount of content that is sent by a network through an affiliate at different times of a day. For instance, a broadcast transmission stream may be viewed as carrying affiliate content in affiliate occupied bandwidth, and the remaining bandwidth or available bandwidth is used to carry linear and/or nonlinear content. In some embodiments, during prime time, more users are tuned into the broadcast networks and the affiliate content occupies a larger bandwidth, for instance, to broadcast live television content to the larger number of viewers demanding the live television content, such as news. In other embodiments, for example, during off-peak hours, such as when everyone has gone to sleep, the demand for live television content is minimal and thus the available bandwidth increases as the affiliate occupied bandwidth decreases. Therefore, the available bandwidth remaining for transmitting linear content and nonlinear content also fluctuates and is variable depending on the amount of affiliate content that contributes to the affiliate occupied bandwidth in the overall broadcast transmission stream capacity. In some embodiments, during peak hours, because a high percentage of the viewers is using the tuners to tune into linear content or prime time content provided by third party television stations, tuners are less available for receiving broadcast transmission of nonlinear content. Therefore, since most tuners are occupied and there is a likelihood that nonlinear content may be missed by viewers, usually the less demanded content are broadcast transmitted at this time. Additionally, prime time is when viewers are expecting "watercooler" content, defined as the third party channel content that may be expected to be viewed by a viewer base at a particular time. Therefore, most of this available bandwidth will be used for transmitting the "watercooler" content. However, during non peak hours, when the affiliate occupied bandwidth is low and the available bandwidth is high, the highly demanded nonlinear content may be broadcasted. One feature of the content operation center is that it has the intelligence to identify when the available bandwidth is a maximum and when the available bandwidth is minimal. Consequently, the nonlinear content is often separated into at least a first portion and a second portion based on at least one of demand by viewers for the nonlinear audio and visual programming content and the bandwidth available for the broadcast.

In some embodiments, the more popular or highly demanded content has a high priority to be transmitted than the less demanded content using a broadcast stream. However, the least demanded nonlinear content may be transmitted by unicast transmission because it tends to be the most costly to use. In some embodiments, different content may be allocated to be transmitted at different times using a same transmission mode, such as broadcast transmission. In other embodiments, the different content may be allocated to be transmitted by a same transmission mode, such as broadcasting, but by different networks based on the demand. Still, in some other embodiments, the different content may be allocated to be transmitted by a different transmission mode based on demand. Lastly, different content may be allocated to be transmitted by same or different transmission modes, individually or combined, and at various different times etc., to achieve the most efficient manner of delivering as many of the demanded content to the viewers demanding the content at the lowest cost.

When content is transmitted to a receiver/STB 601 over unicast transmission, the receiver/STB 601 receives and captures content for storage and playback of the content. This content may either be linear content or nonlinear content. Linear content may be viewed or recorded live in real time as it is being received at the receiver/STB 601. Nonlinear content is often received and saved for a time delayed play back. In some embodiments, nonlinear content may begin a process of downloading and as soon as a sufficient amount of the nonlinear content is downloaded and buffered, a viewer may begin watching the programming content, even if the entire file is not completely downloaded.

In some embodiments, there is one or more receiver/STB in every household. In some embodiments, each receiver/STB is configured to capture content independent of another and each receiver/STB 601 is connected to the Internet, for instance, via a broadband network. In some embodiments, each of multiple receiver/STBs in one household may be configured to communicate with other receiver/STBs using a local area network (LAN) or an equivalent network, including but not limited to a wireless network and an Ethernet. Collectively, the broadband distribution network and each receiver/STB connected to the broadband network together form a peer-to-peer network. In some embodiments, each receiver/STB and the content operation center acts as a peer in the network. All the peers are configured to communicate and interact with each other using the broadband network. As such, information can be exchanged between any two peer in the network.

Modes of Transmission and Capturing of Content

Figure 12:
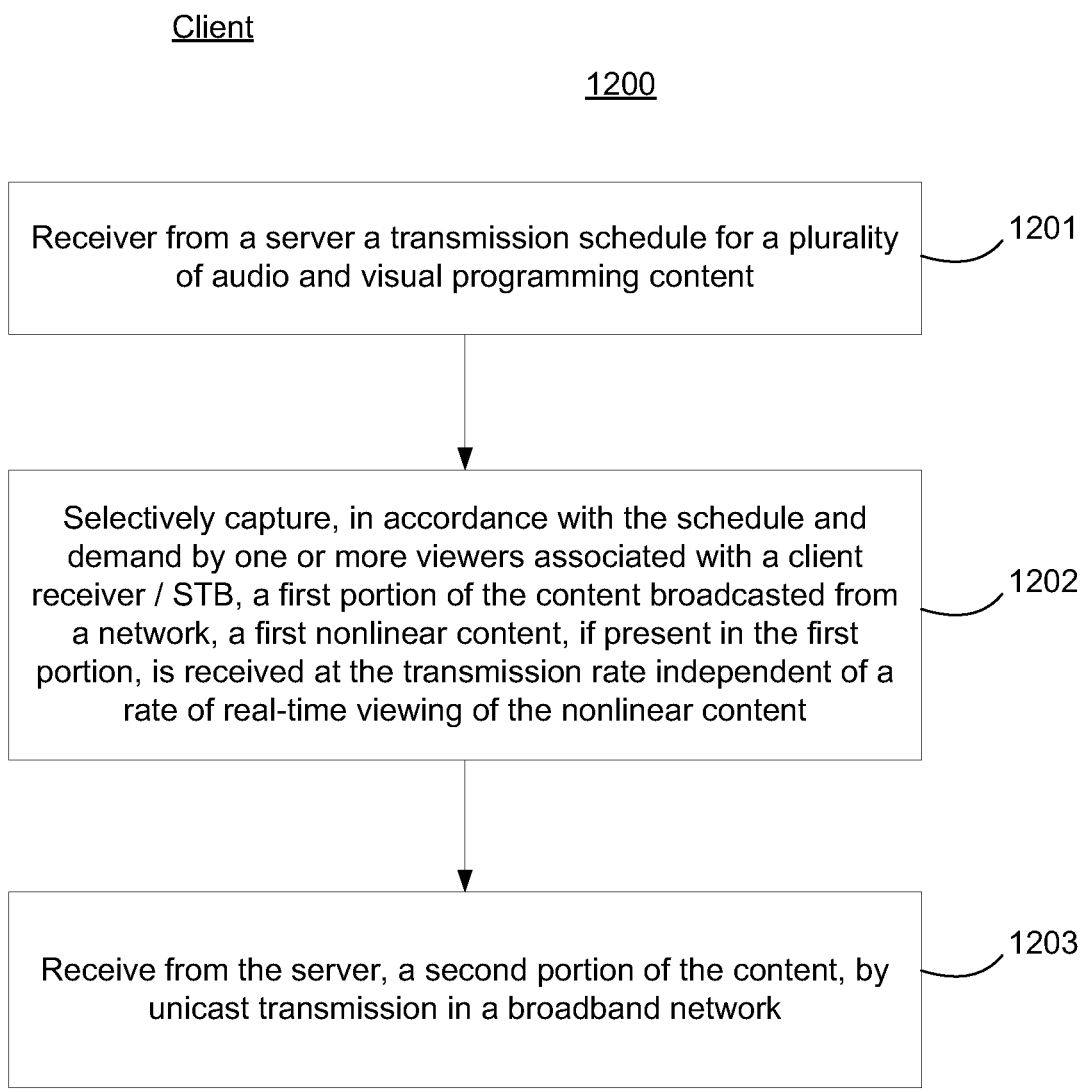
FIG. 12 is a flow diagram illustrating reception of content in a receiver/STB, in accordance with some embodiments.

In some embodiments, receiver/STBs receive linear and nonlinear content similarly. FIG. 12 is a flow diagram illustrating reception of content in a receiver/STB in accordance with some embodiments. Flow diagram 1200 illustrates how a receiver/STB receives both linear and nonlinear content from both a broadcast transmission and a unicast transmission. In some embodiments, a receiver/STB receives a transmission schedule for a plurality of audio and visual programming content from a transmission stream, for example, a broadcast transmission stream from an affiliate network, as shown in block 1201. In accordance with a demand by one or more viewers associated with the receiver/STB, and the transmission schedule, the receiver/STB will selectively capture a first portion of the plurality of audio and visual programming content transmitted by broadcast transmission from a broadcast network, as shown in block 1202. There may be linear content, nonlinear content, or both kinds of content, in the first portion of the content. If linear content is present, the non linear content is received at a rate of transmission suitable for real time viewing as the linear content is being received at the receiver/STB. If nonlinear content is present, it is likely received at a rate of transmission independent of the rate of transmission for real time viewing. In other words, nonlinear content is likely received at a transmission that is either too fast or too slow for real time viewing as it is being received at the receiver/STB. Also in accordance with the demand by the one or more viewers and the transmission schedule, the receiver/STB will receive or selectively capture a second portion of the plurality of audio and visual programming content that is transmitted by unicast transmission from a broadband network, as shown in block 1203. In some embodiments, content designated for unicast transmission is made available to the broadband distribution network. The content designated for unicast distribution is either automatically pushed to the corresponding receiver/STBs or is indicated as ready for download by the receiver/STBs which then download the content over the broadband network. In other embodiments, content may be designated for unicast distribution but are downloaded only upon explicit feedback by the end user.

In some embodiments, each receiver/STB may capture content in multiple different ways depending on what content is transmitted, the format in which the content is being transmitted and the mode of content transmission. In some embodiments, the audio and visual programming content includes both linear and nonlinear content. Linear content, in some embodiments, is received in a form of linear streaming in a broadcast transmission, while in other embodiments, may be received in a unicast transmission, at the receiver/STB, for real time viewing and/or recording. Nonlinear content, in some embodiments, may be received in a form of discrete files. Nonlinear content in form of discrete files generally do not have to undergo further processing. The discrete files are stored for a time delayed play back. In other embodiments, portions of nonlinear content, each in the form of discrete files, are encoded into an aggregate file for transmission. In some embodiments, the encoding may include interleaving the bits in each discrete file together with the application of forward error correction. After the aggregate file is received at the receiver/STBs, it is decoded back into individual discrete files of nonlinear content for storing and non-real time play back. Nonlinear content may be delivered by either broadcast transmission or unicast transmission.

Each receiver/STB is configured to receive content in a hybrid delivery system that includes at least broadcast transmission and unicast transmission. A broadcast network, in some embodiments, includes at least one of: satellite network, terrestrial network, local cellular network, an IP multicast network, and a WiMax network. Both linear and nonlinear content may be broadcasted to the receiver/STB in any of the above networks. Each receiver/STB will have at least one communication interface, such as an antenna subsystem, configured to receive the broadcasted content by at least one of the above mentioned networks. Each receiver/STB will also have a communication interface for receiving linear or nonlinear content unicast by a broadband network. Linear and/or nonlinear content is typically inserted into an extra bandwidth of a broadcast stream for transmission. In some embodiments, the extra bandwidth is the residual bandwidth left over in an ATSC digital broadcast containing pre-existing third party linear broadcast streams.

Generally, linear and nonlinear content are selectively inserted into a particular mode of transmission for delivery to a receiver/STB. In some embodiments, linear and nonlinear content are both inserted into extra bandwidth of a broadcast stream for transmission to a plurality of receiver/STBs. In other embodiments, nonlinear content may be sent to designated receiver/STBs by unicast transmission. In some embodiments, linear and nonlinear content are selected for transmission based on demand by one or more viewers associated with the receiver/STBs receiving the content. For example, nonlinear content that is demanded by a large population of viewers are received by broadcast transmission at the various receiver/STBs associated with the large population. In another example, a few individuals who specifically request certain nonlinear content that is not widely popular will receive their nonlinear content by unicast transmission. Similarly, receiver/STBs may also receive targeted promotional content, and/or recommendations of nonlinear content that is initiated by the server via unicast transmission without a prior request by a user. In other embodiments, content may be designated for unicast distribution by the system but are downloaded only upon explicit feedback by the end user.

A receiver/STB learns about which linear and nonlinear content to capture from a broadcast transmission and/or a unicast transmission by learning about the viewing routines and preferences of viewers who are associated with the receiver/STB. Routines may refer to at least one of certain recurring programming content viewed by a viewer during a time in a day, week, month and/or year, and recurring interaction events such as channel surfing among certain channels during a time in a day, week, month and/or year. In other words, routine is used to describe a recurring event performed by the viewer and may reflect on the viewer's viewing habits. Whereas preference may refer to programming content that are preferred by the viewer. These routines and preferences are utilized by each receiver/STB to capture linear and nonlinear content preferred by the viewers associated with a particular receiver/STB. According to some embodiments, capturing refers to selectively receiving nonlinear programming content, whereas recording refers to selectively receiving linear programming content. While in both cases, the programming content are preferred by a viewer, the rate at which the content is received by capturing (nonlinear content) and recording (linear content) differs. For each viewer, the receiver/STB estimates a demand for a particular content and learns about a viewer's viewing routine and preference by performing at least one of the following: First, tracking a list of interaction events resulting from watched content that is selectively chosen for viewing by the one or more viewers using a user interface; Second, tracking a list of interaction events resulting from ignored content that is browsed but not selected in the user interface; Third, tracking a time of day and week wherein at least one of the first list of interaction events and the second list of interaction events occurred (e.g., routine); Fourth, tracking ratings of watched content submitted by one or more viewers; Fifth, tracking content that is specifically requested by the one or more viewers (e.g., preference); and sixth tracking content selectively recorded by the receiver/STB at the one or more viewers' command (e.g. preference).

Additionally, a receiver/STB learns about which linear and nonlinear content to capture from a broadcast transmission and/or a unicast transmission through communications with the PDP module in the content operations center. The PDP module informs each receiver/STB of "discovery" content that viewers associated with each receiver/STB may be interested in. The PDP analyses information sent from each receiver/STB including at least content viewing patterns of individual subscribers. The PDP module uses at least this information to correlate the viewing pattern across multiple viewers together with any direct input from the programming interface to determine which content is likely to be preferred by different viewers, therefore creating a personalized list of recommended shows for each viewer. This personalized list then forms the basis for capture of "discovery content" at the STB.

All content is securely encrypted before either broadcast transmission or unicast transmission. In some embodiments, after receiving a linear content, the receiver/STB will automatically decrypt the linear content for display. In other embodiments, after receiving a nonlinear content, the nonlinear content is directly placed in storage and will not be decrypted unit it is ready for display. The process of decrypting and displaying content is performed by the software of the receiver/STB. In some embodiments, the receiver/STB also incorporates different mechanisms to prevent tampering to protect the content. In other embodiments, communication transmitted to receiver/STB is encrypted using SSL/TLS protocols or other schemes depending on the type of communication.

Content Repair at a Receiver/STB

Figure 13:
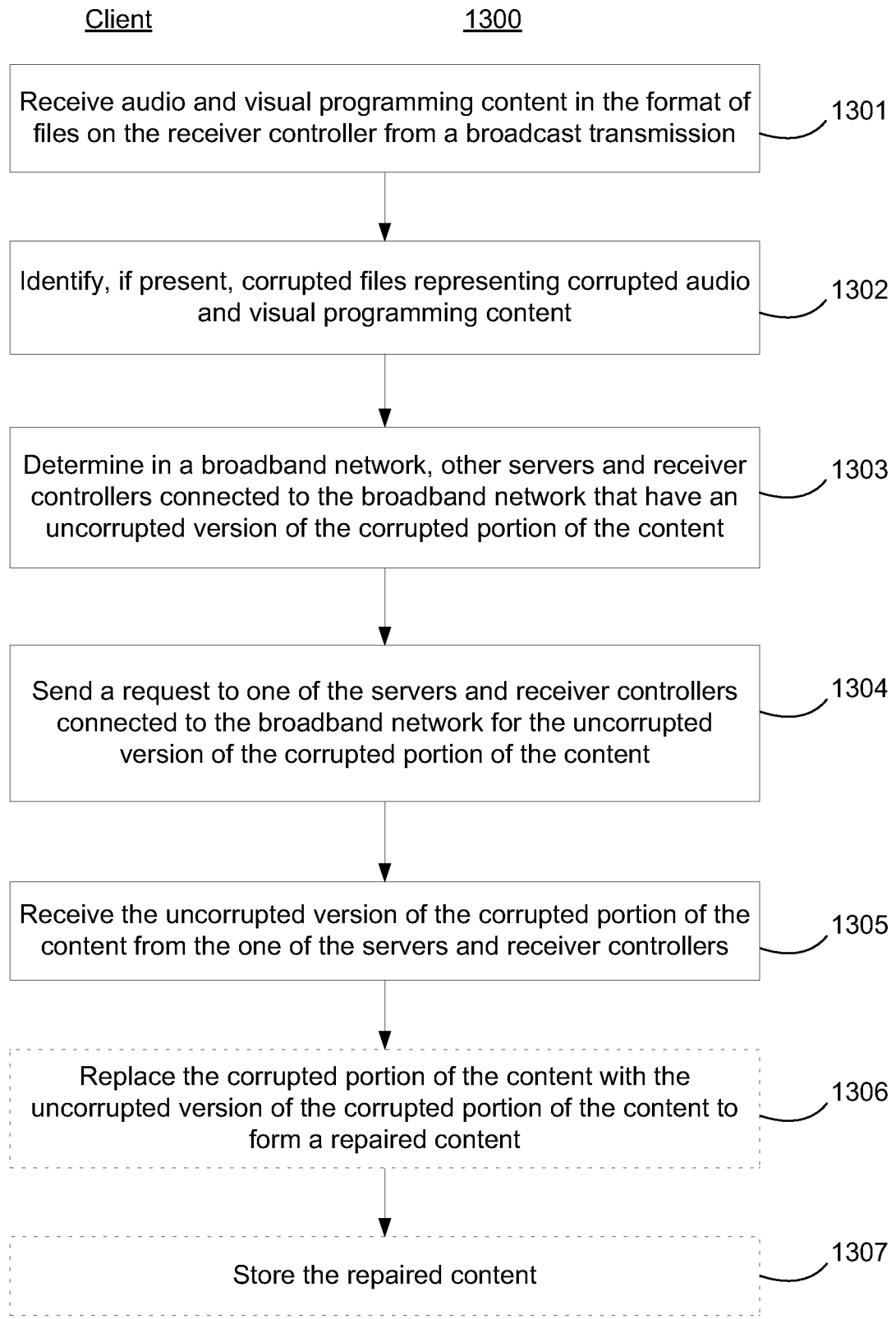
FIG. 13 is a flow diagram illustrating repairing portions of content received by a receiver/STB, in accordance with some embodiments.

FIG. 13 is a flow diagram illustrating repairing portions of content received by a receiver/STB in accordance with some embodiments. In some embodiments, nonlinear content may be sent as individual files or encoded as one aggregate file from the content operation center to receiver/STBs. In some instances, errors may incur during receiving of content, leading to corruption of the file(s). This may occur during the reception of individual files(s), or it may occur during reception and subsequent decoding of aggregate file(s). Flow diagram 1300 illustrates repairing of portions of content by a receiver/STB after files are received. In block 1301, audio and visual programming content in the format of files are received at the receiver/STB from a broadcast transmission. In some embodiments, the files received at the receiver/STB are stored in the content storage module 607 after having been received at the receiver/STB (and are later repaired if found to be corrupted.) In block 1302, corrupted files representing the corrupted audio and visual programming content, if present, is detected. In some embodiments, the error or corruption detection mechanism is inherently built into the file(s) itself. In block 1303, the content repairing module 612 sends a request to the nodes or peers, such as other servers and receiver/STBs connected to the broadband network, to determine which ones of the nodes have an uncorrupted version of the corrupted portion of the content. In block 1304, the content repairing module 612 in the receiver/STB sends a request to at least one of the identified nodes having the uncorrupted version of the portion of the content. In block 1305, the content repair module 612 receives the uncorrupted version of the corrupted portion of the content from one of the servers or receiver/STBs on the network. In block 1306, the content repair module 612 replaces the corrupted portion of the content with the uncorrupted version of the corrupted portion of the content to form a repaired content. In block 1307, the repaired content is stored in the content storage module 607 and ready for display in response to a user command.

In other embodiments, errors may occur during the reception of linear content originating from third party providers such as third party terrestrial digital TV stations. Such content are similarly stored in the content storage module 607 after having been received at the receiver/STB and are later repaired if found to be corrupted. If particular segments are found to be corrupted, the content repairing module 612 sends a request to the nodes or peers, such as other servers and receiver/STBs connected to the broadband network, to determine which ones of the nodes or peers have an uncorrupted version of the corrupted portion of the content. The content repair module receives the uncorrupted version of the corrupted portion of the content from the one of the servers or receiver/STBs on the network and replaces the corrupted portion of the content with the uncorrupted version of the corrupted portion of the content to form a repaired content.

In some embodiments, as described above, nonlinear content files can be corrupted anywhere in the process of transmitting files from the content operation center to receiving the files at the receiver/STB. In some embodiments, portions of a received content in files are corrupted, but not the entire file. In other embodiments, an entire file or more than one part of each file is corrupted. When a portion of a file is corrupted, the file can be repaired in accordance with the process described above. Alternately, the entire file can be replaced instead of repairing a portion of the file. The process of replacing a corrupted file is described below.

Figure 14:
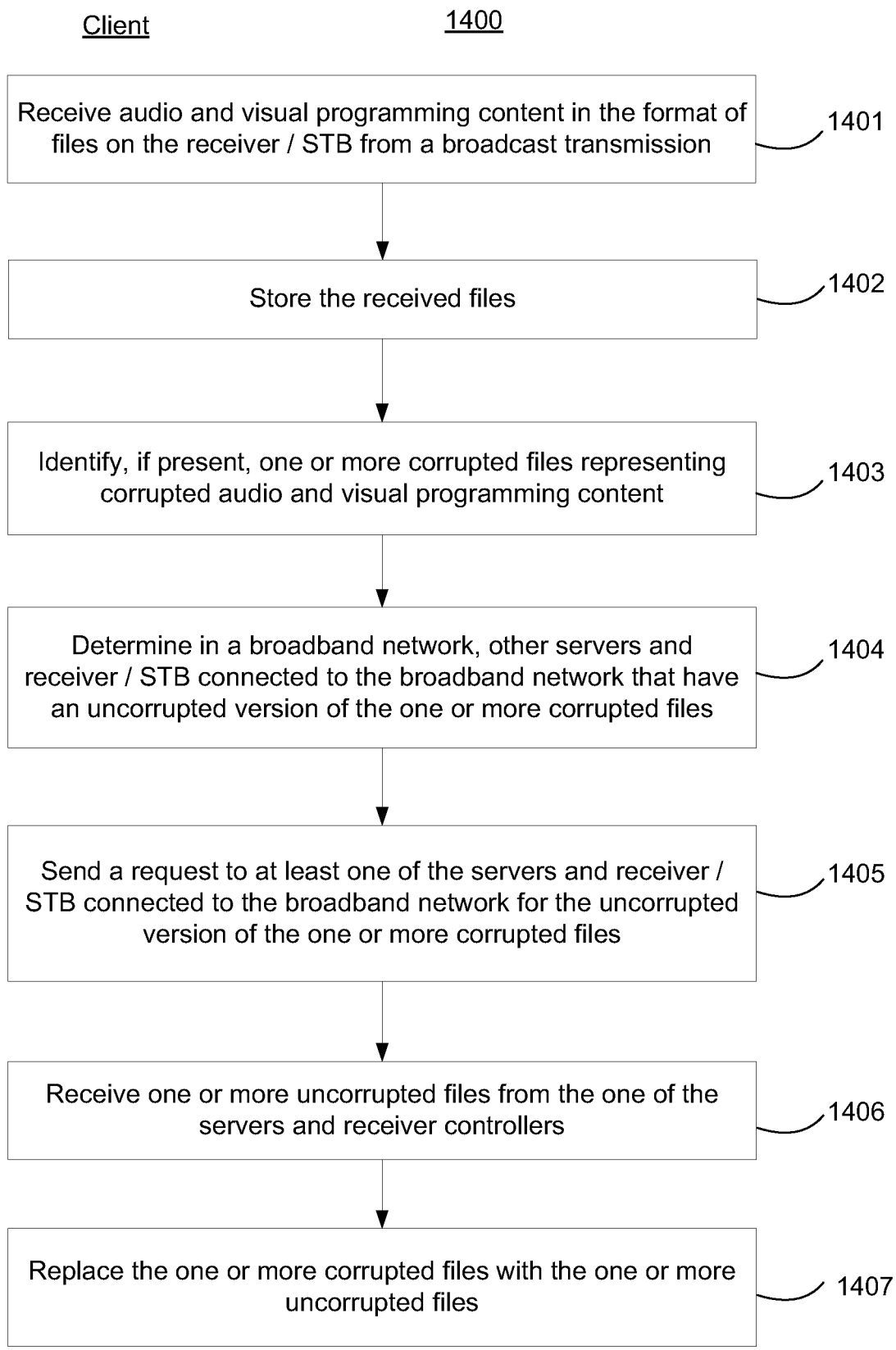
FIG. 14 is a flow diagram illustrating a method for repairing whole files received by a receiver/STB, in accordance with some embodiments.

FIG. 14 is a flow diagram illustrating repairing whole files received by a receiver/STB in accordance with some embodiments. In some embodiments, audio and visual programming content are received at the receiver/STB from a broadcast transmission, as shown in block 1401. In some embodiments, the audio and visual programming content received are optionally stored in form of files in the content storage module 607, as shown in block 1402. In block 1403, the one or more corrupted files representing corrupted audio and visual programming content is identified. In some embodiments, the one or more corrupted files are detected by the file(s) itself as the file structure has a file detection mechanism inherently built-in. In other embodiments, the one or more corrupted files are detected and identified by the content repair module 612 that scans each individual file that is stored in the content storage module 607. In block 1404, having known which file(s) are corrupted, the content repair module 612 sends a request to other nodes or peers connected to the network, including other servers and receiver/STBs, to determine which of the nodes have an uncorrupted version(s) of the one or more corrupted files. In some embodiments, the content repair module 612 simultaneously sends multiple requests to multiple nodes on the network to determine which has an uncorrupted version of the one or more corrupted file(s). In other embodiments, the content repair module 612 sequentially sends requests to determine which node has the uncorrupted version of the one or more corrupted files.

In block 1405, the content repair module 612 sends a request to at least one of the servers and receiver/STBs connected to the broadband network for the uncorrupted version of the one or more corrupted files. In some embodiments, once the content repair module 612 learned about which nodes contain the uncorrupted version of the one or more corrupted files, the content repair module 612 simultaneously sends a request to all the identified nodes or peers and waits for a response in the form of receiving the uncorrupted version of the corrupted file. Once the content repair module 612 receives the uncorrupted version of the one or more corrupted files, a request is sent to the remaining identified nodes, notifying them there is no need to send the file. In other embodiments, the content repair module 612 sequentially sends a request to each of the identified nodes and waits for a response in the form of receiving the uncorrupted version of the one or more corrupted files. When the file is not received within a certain duration, a termination request is sent, and a new request is sent to a next node for the uncorrupted version(s) of the one or more corrupted file(s). This process is iterated until the uncorrupted version of the one or more corrupted file(s) is received. In block 1406, the content repair module 612 or the receiver/STB receives one or more uncorrupted files from one of the nodes contacted. In block 1407, the content repair module 612 replaces the one or more corrupted files stored in the content storage module 607 with the uncorrupted version(s) received.

Both content repairing mechanisms described above may apply to content received by broadcast or unicast transmission. Generally, content corruption occurs in files that pertain to nonlinear content, including but are not limited to movies, television series episodes, and internet video files etc. The content repair mechanism can equally be applied to repair or replace content files for any type of nonlinear files. Furthermore, the content repair mechanism can equally be applied to repair or replace content files for any type of recorded linear content such as content distributed by unrelated third party digital terrestrial television networks. Similarly, it should be appreciated that audio and visual content may be received in any one of multiple forms of broadcast transmissions including, but are not limited to, a wired broadcast, a wireless broadcast, and an IP multicast. Furthermore, the wireless broadcast may include, but is not limited to, satellite broadcast, terrestrial broadcast, local cellular network broadcast, and WiMax broadcast. As discussed previously, the broadband transmission generally utilizes extra bandwidth in an ATSC digital broadcast of broadcasting networks. In some embodiments, each node or peer, including any one of the receiver/STBs and servers on the network, is configured to communicate with each other directly without going through a central server.

Determination of a Schedule for Content Transmission

Figure 15A:
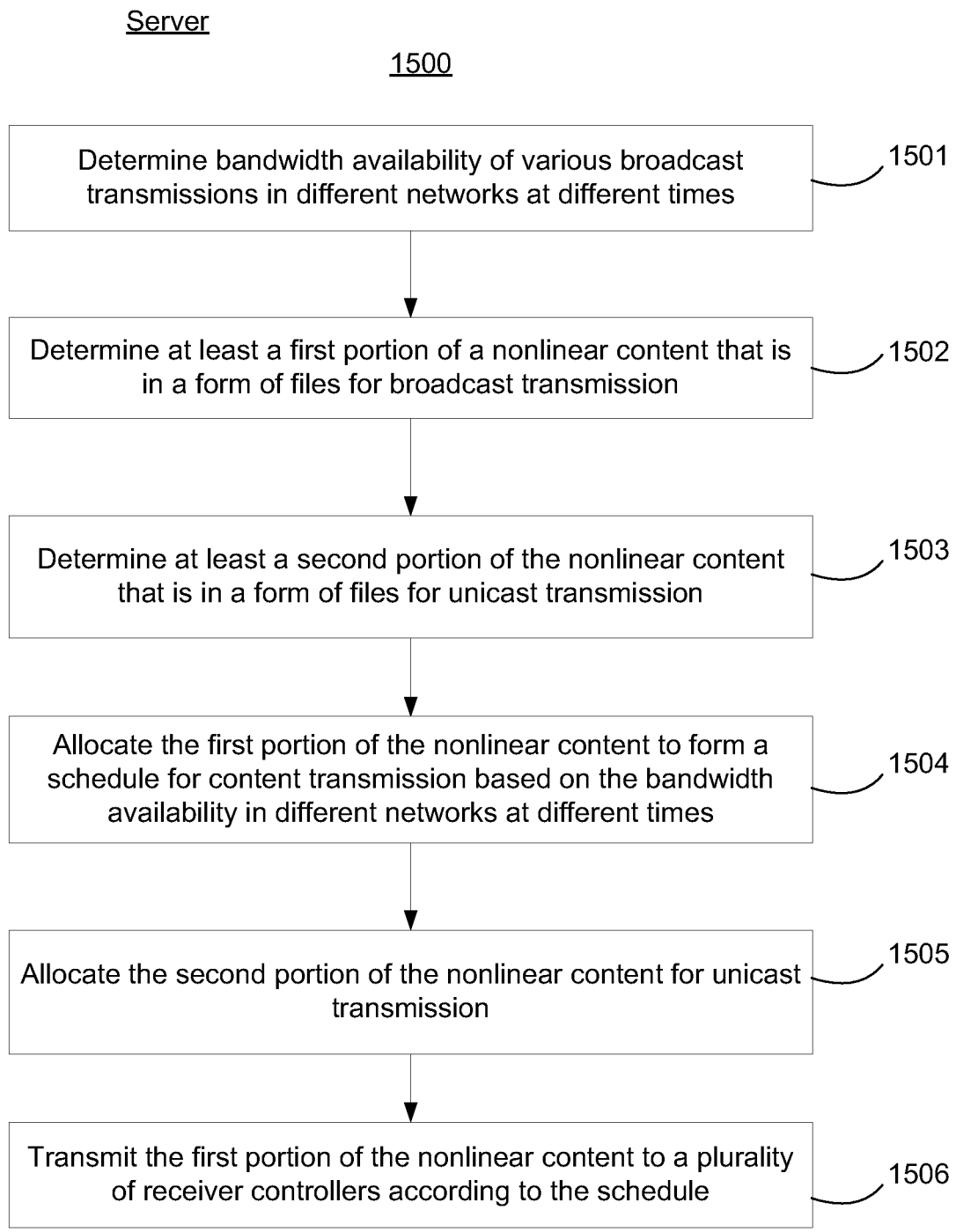
FIG. 15A is a flow diagram illustrating a method for determining a schedule for content delivery by a content operation center, in accordance with some embodiments.

FIG. 15 is a flow diagram illustrating determination of a schedule for content delivery by a content operation center in accordance with some embodiments. Content is delivered to viewers in accordance with a schedule that is determined based on at least one of a number of factors. In some embodiments, the schedule controls how content is delivered and when content is delivered to viewers. For example, the schedule may decide whether a particular nonlinear content is delivered by broadcast transmission or by unicast transmission and at what times. To create a schedule, in some embodiments, the available bandwidth of various broadcast transmission in different broadcast networks at different times is first determined, as shown in block 1501. In block 1502, a first portion of a nonlinear content is chosen for broadcast transmission. In block 1503, a second portion of the nonlinear content is chosen for unicast transmission. In block 1504, the first portion of the nonlinear content is allocated to form a schedule for broadcast transmission based on the bandwidth availability in different broadcast networks at different times. In block 1505, the second portion of the nonlinear content is allocated for unicast transmission. In block 1506, the first portion of the nonlinear content is transmitted to a plurality of receiver/STBs in accordance with the schedule.

In some embodiments, the schedule is designed to ensure that at least some of the nonlinear content is delivered not longer than a time period after a target time such as the initial airing of a corresponding one of the nonlinear content on other third party systems. For instance, if a television episode is first aired in a cable network at a certain time and date, the same episode, in form of nonlinear content would be scheduled for transmission no later than a period after the initial airing of the episode. In same embodiments, the schedule is designed to ensure that the most popular content is transmitted via broadcast transmission while less popular content is allocated to unicast delivery.

The method by which such schedules are optimized involves the creation of a cost function for a given schedule whose value can then be minimized by various optimization techniques. By way of illustration one may construct such a cost function that takes into account available broadcast bandwidth, time of airing, and popularity of the content as follows:

$$\text{Cost(Schedule } S) = \sum_{i \in Broadcast(s)} B(i) * D(i) * \left[ e^{\frac{t(i,S) - tU(i))}{tau(i)} i} \right] + \sum_{i \in Unicast(s)} U(i) \times D(i)$$

Cost(Schedule S) is the cost assigned to a given schedule. The first sum covers all assets Broadcast(S) scheduled for broadcast transmission in schedule S and the second sum covers all assets Unicast(S) scheduled only for Unicast distribution. Here D(i) represents the fractional demand for asset or show "i" which may be taken, for example, as the fraction of viewers that have a high probability of consuming asset "i". The demand assigned may be based on past popularity of the show in question or estimated future popularity determined either via manual input or estimated future demand so determined via automated means such as the use of a recommendation engine. Here B(i) and U(i) represent the cost of broadcast and unicast distribution of asset or show "i" respectively. Since broadcast transmission is generally much cheaper than unicast distribution, B(i)<<D(i). Here t(i,S) represents the time t(i,S) that the asset or show "i" is scheduled for broadcast transmission by schedule S. t0(i) is the target time at which asset (or show) "i" should be broadcasted. For example, this could be the time that the show is aired on other systems. tau(i) is a time constant designed to penalize scheduling a show too far ahead of the target time. The optimization problem is then simply to minimize Cost(Schedule S) across all schedules such that the identified broadcast bandwidth is not exceeded.

While in general achievement of a global minimum may be computationally difficult, particularly when the cost function is further enhanced to take into account of other factors, a good first guess may be achieved by assigning and scheduling the assets in order starting from most popular assets until the broadcast bandwidth is exhausted. This is illustrated schematically in FIG. 15B, a figure similar to FIG. 7B as described earlier. FIG. 15B illustrates a relationship between user demand and programming content identification of content. The curve 1523 is the demand by programming content or asset IDs where the asset IDs for various content are ordered by most popular on the left and least popular to the right. An initial schedule may be established by first scheduling the asset of highest demand and then successively scheduling the asset of lesser demand wherein at each individual scheduling step the incremental effect on the cost function is minimized. This procedure is continued until all assets have been scheduled. The threshold 1526 represents a cutoff point where certain programming content or asset, for example, those in a high demand region 1524, are scheduled for broadcast distribution, and where certain other programming content or asset, for example, those in a lower demand region 1525, are made available for unicast transmission. This cutoff is determined by the available broadcast bandwidth. Finally, while such a schedule may represent a good first guess, it may also be possible to achieve a lower cost by successively varying the schedule. For example, the scheduled time and distribution method (broadcast vs. unicast) for two or more assets may be interchanged on a random or pseudo random basis or according to some intelligent heuristic, such changes resulting in a revised schedule only if the change results in a lower cost function.

In some embodiments, factors beyond available bandwidth may be used for determining a schedule. For example, the times that are available for receiver/STBs to receive content on each network are estimated or determined. The availability of receiver/STBs is important since in some embodiments, receiver/STBs are more occupied in receiving and recording other programming content such as linear content or receiving and capturing to disk other nonlinear content and are thus less available for receiving content from a transmission. On the contrary, there are other times where most receiver/STBs are more available for receiving content from transmissions, such as during working hours when viewers are typically at work, or late in the night when viewers may be sleeping. Therefore, there are embodiments that will allocate the non-linear content to form a schedule for content transmission based on available bandwidth in different broadcast networks at different times, as well as, based on times of availability for receiver/STBs to receive content from different networks. In such circumstances the procedure of cost function minimization outlined above may be enhanced to take into account receiver availability.

In some embodiments, the determination of a schedule for content transmission is targeted to maximize probability of reception and storage of nonlinear content at the plurality of receiver/STBs. And generally such maximization may be accomplished through the creation and minimization of a representative cost function.

Generally, in some embodiments, the schedule is transmitted to the receiver/STBs so that the receiver/STBs can capture the nonlinear content in accordance with the schedule.

Still, in other embodiments, linear content is also transmitted according to a schedule. In determining a schedule for transmitting both linear and nonlinear content in broadcasting and/or unicast transmission transmissions, the different types of linear content to be transmitted in the form of streams are determined. For example, linear content may include live news and sports or linear feeds of popular prime time cable content ("watercooler content"). In some embodiments, the first portion of a linear content in the form of streams for broadcast transmission is determined and the nonlinear content in form of files for broadcast transmission is determined, then both the linear and nonlinear content are scheduled for broadcast transmission.

In some embodiments, tuners within the population may be allocated to receiving local DTV channels. In such cases, tuner availability for the reception of nonlinear content will not be static overtime and will tend to be low during prime time and high during off peak hours. Furthermore the number of tuners per set top box may depend on the set top box in question. In such embodiments, the determination of a schedule for content transmission is designed to account for availability of tuners at receiver/STBs in receiving nonlinear content from different networks at different times at which broadcast bandwidth and demand for the assets are in question. This may be accomplished by introducing appropriate terms in the cost function to account for tuner availability so that for example transmitting an individual asset during periods of low tuner availability incurs a higher marginal cost In some embodiments, the delivery of linear content is also an important part of the service. For example, some prime time cable channel content may be expected to be viewed by the viewer base at a particular time. Such content is often termed "watercooler" content as the expectation is that the corresponding content may form the subject of active conversations at schools, offices, and places of leisure the next day. In such embodiments, therefore, the determining and scheduling a first portion of a linear content in form of streams for broadcast transmission is an important part of the creation of the schedule. Nonlinear content may then be incorporated into such a schedule based on factors that include, but is not limited to, the bandwidth availability in the different networks at the different times, utilization of the plurality of receiver/STBs by viewers, and demand of nonlinear content by viewers The bandwidth available for broadcast transmissions may be dynamic or static in different broadcast networks. In some embodiments, some broadcast networks broadcast a same amount of network content at different times, thus, the amount of available bandwidth for broadcasting transmission of linear or nonlinear content is static and remains constant at all times. In other embodiments, some broadcast networks broadcasts different amount of network content during different times, thus, the amount of available bandwidth for broadcast transmission of linear or nonlinear content is dynamic and changes depending on a time of day, week, and/or year. Still in other embodiments, there are occurrences where extra bandwidths may become available in a manner that was unanticipated beforehand. This unanticipated bandwidth that becomes available is known as opportunistic bandwidth. In some embodiments of this system, the system is capable of inserting at least one of a portion of the nonlinear content and a portion of the linear content into an opportunistic bandwidth for broadcast transmission. This portion of nonlinear and/or linear content inserted into the opportunistic bandwidth may be content previously scheduled for broadcast transmission, or it may be content previously scheduled for unicast transmission, or it may be content not previously scheduled for immediate transmission.

Similar to other descriptions above, nonlinear content in a schedule for broadcast transmission is transmitted at a rate independent of a rate of real-time viewing of the nonlinear content at the receiver/STBs receiving the nonlinear content. Furthermore, the broadcast networks may be a wired broadcast network, a wireless broadcast network, and an IP multicast network. If it is a wired broadcast network, the network may be a cable network. However, if it is a wireless broadcast network, the broadcast may be at least one of a satellite broadcast, a terrestrial broadcast, an ATSC DTV broadcast, a local cellular broadcast, and a WiMax broadcast.

System Intelligence for Adapting and Learning Viewing Preferences

Figure 16:
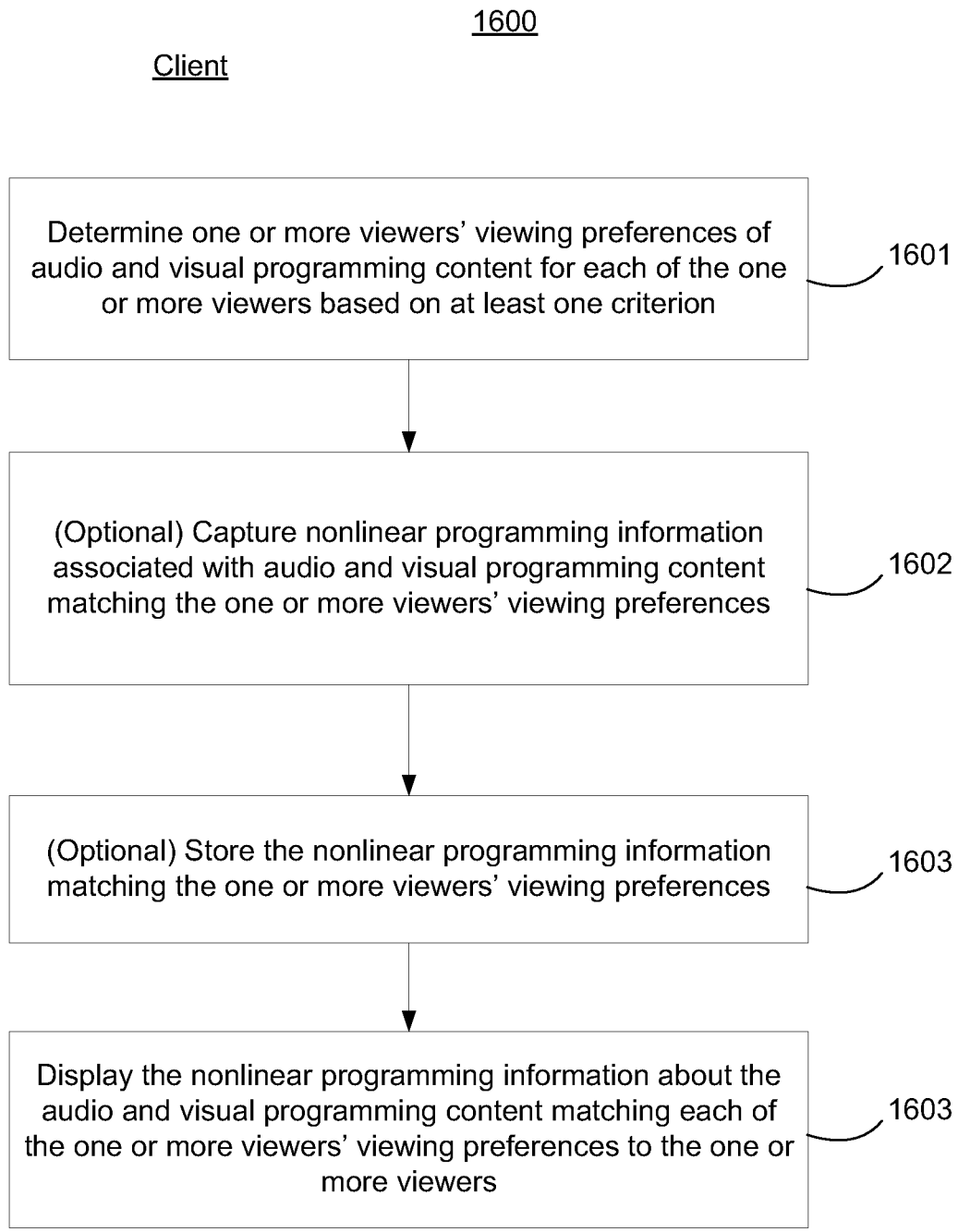
FIG. 16 is a flow diagram illustrating the PDP (Predictive Delivery and Personalization) portion in a receiver/STB as an automated personalized recommendation and storage engine, in accordance with some embodiments.

FIG. 16 is a flow diagram illustrating the PDP portion in a receiver/STB as an automated personalized recommendation and storage engine in accordance with some embodiments. In some embodiments, the receiver/STB is an automated personalized recommendation and storage engine of nonlinear content. For instance, some receiver/STBs may have the intelligence to learn about viewers' preferences for audio and visual programming content through programming content viewed by viewers, programming content not viewed by viewers, the time of day and week when such events occur, and programs that are recorded, subscribed to, and/or rated by viewers. Furthermore, these receiver/STBs are also capable of continuously adapting to and modifying the viewers' viewing preferences as long as the viewers are using the receiver/STBs to select and to watch programming content. Once these receiver/STBs learn about the viewing preferences, they are capable of making recommendations to the viewers based on the viewers' viewing preferences.

In some embodiments, the capture and storage of programming content is illustrated in flow diagram 1600 of FIG. 16. In flow diagram 1600, one or more viewers' viewing preferences of particular audio and visual programming content for the one or more viewers associated with the receiver/STB is determined based on at least one criterion, as shown in block 1601. In some embodiments, the receiver/STB can automatically capture the nonlinear programming content information matching the one or more viewers' viewing preferences. In other words, the receiver/STBs has built in intelligence to first learn about the viewers' viewing preferences based on at least one of many possible factors, including learning about the programming content that is viewed, selected, not selected, subscribed to and/or rated by the viewer. Furthermore, in some embodiments, once the viewing preferences for the one or more viewers are determined, the receiver/STB can automatically search for nonlinear programming content matching the viewers' preferences in accordance with the schedule in which the nonlinear programming content matching the viewers' preferences are transmitted. In other embodiments, the receiver/STBs can search, and optionally capture the nonlinear programming information the corresponding to the audio and visual programming content matching the one or more viewers' viewing preferences, as shown in block 1602. The corresponding captured nonlinear programming content matching the one or more viewers' viewing preferences are stored in the receiver/STBs, as shown in block 1603. The nonlinear programming information about the audio and visual programming content matching each of the one or more viewers' preferences is then displayed and presented to the viewers, as shown in block 1604.

In some embodiments nonlinear programming content is not captured until the viewer explicitly makes a request to capture the content. For instance, information about nonlinear programming content maybe presented and displayed to viewers to generate interest, and only captured via broadcast transmission or downloaded via unicast transmission after an indication is received from the viewer.

The receiver/STB learns and continuously adapt to viewers' viewing preferences by evaluating several criteria. In some embodiments, no emphasis is placed on any particular criterion, while in other embodiments, emphasis may be placed on selected ones of a series of criteria. The criteria comprise a range of factors. In some embodiments, a first list of interaction events resulting from watched television content that is selectively chosen for viewing by the one or more viewers using a user interface is used. In other words, the first list of interaction events leading to a particular watched programming content is used as a pattern to learn about the one or more viewers' viewing preference. In other embodiments, a second list of interaction events resulting from ignored television content that is browsed but not selected in the user interface is used. In this case, the second list of interaction events resulting from ignored television content that are browsed but not selected are used to learn about programming content that is not preferred by the one or more viewers. In some other embodiments, the criterion is a time of day, week, and/or year wherein at least one of the first list of interaction events and the second list of interaction events occurred. For instance, the time of day, week, and/or year when particular viewer interactions are most frequent may be understood by the receiver/STB to be the favored times for presentation of the particular or similar nonlinear content associated with such events.

In some embodiments, a list of audio and visual programs marked for subscription by the one or more viewers is used to learn about content favored by the one or more viewers. Similarly, in some embodiments, ratings of television or programming content submitted by the one or more viewers about content viewed, television content requested by the one or more viewers, and television content selectively captured by the receiver/STB at the one or more viewer's commands, are also used by the receiver/STB to learn about the one or more viewers' viewing preferences.

In some embodiments, if after a number of instances where information about captured nonlinear programming content is presented to the viewer and the viewer is not interested in viewing the underlying content, the captured nonlinear programming content may be deleted from disk. In some embodiments, the content is either automatically deleted after a period of time or deleted in response to a user command. However, in other embodiments, where the viewer is interested in the captured nonlinear programming content based on the information displayed, the viewer can request to view the captured nonlinear programming content by a user command.

Figure 17:
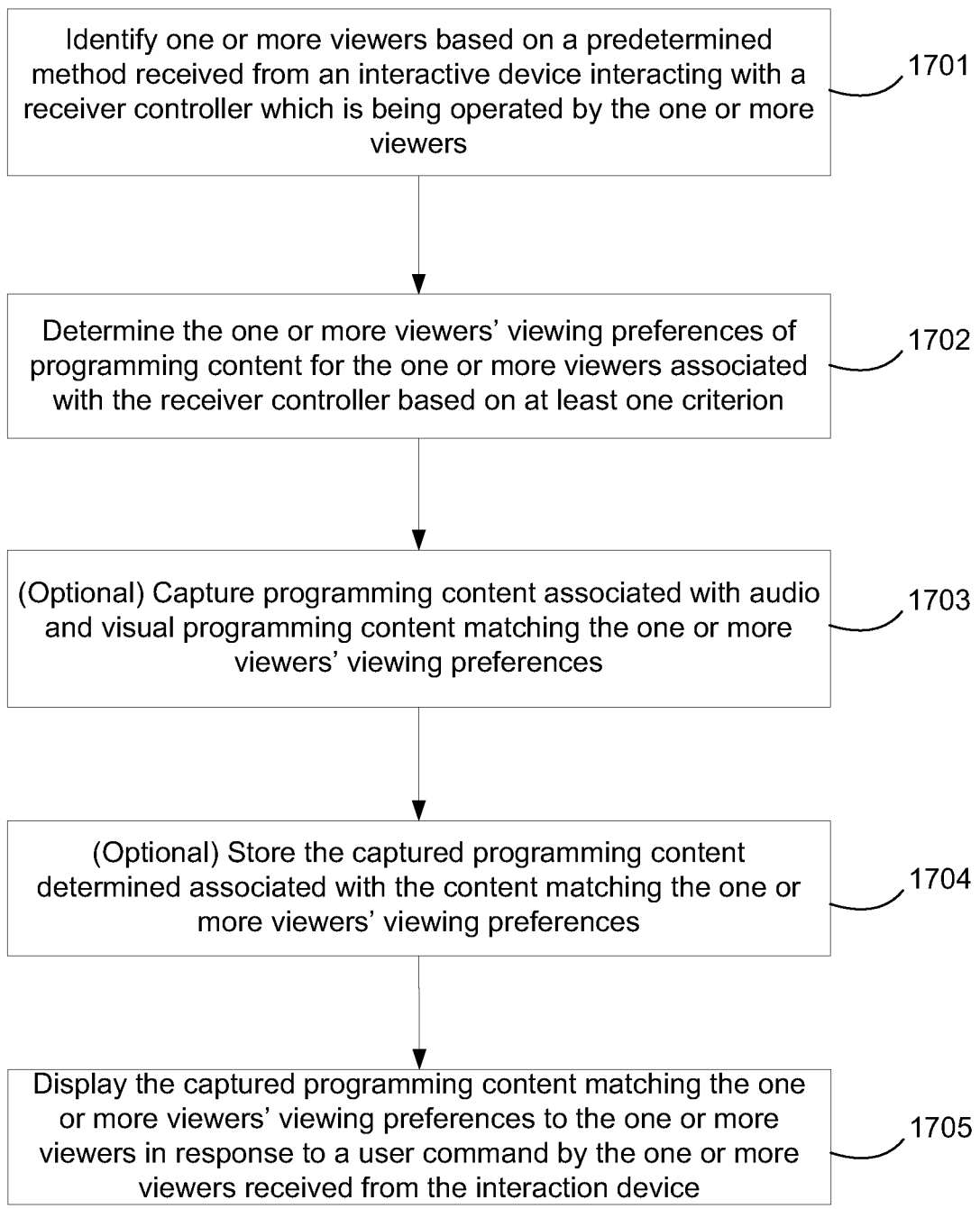
FIG. 17 is a flow diagram illustrating the receiver/STB performing as a recommendation engine in conjunction with use of a remote control, in accordance with some embodiments.

In some embodiments, the system described may be used in conjunction with an interface device, including, but not limited to a remote control. The interface device may be used to control a user interface on the receiver/STB to control different functions and operations of the receiver/STB. FIG. 17 is a flow diagram illustrating the receiver/STB performing as a recommendation engine in conjunction with use of a remote control in accordance with some embodiments. For example, at a receiver/STB, one or more viewers are identified based on a user command sent from an interaction device capable of identifying the one or more viewers using the interaction device to interact with the receiver/STB as shown in block 1701. For instance, such a user command may be accomplished at least by one or more user buttons on the interaction device where the one or more user buttons are dedicated to identify a corresponding one or more individual viewers operating the interaction device. In other words, the user command sent from the interaction device is used to activate a viewer profile that is stored in the receiver/STB, which corresponds to a user operating the interaction device, containing that viewer's viewing preferences. The viewer's viewing preferences of programming content is determined based on at least one criterion. While the viewer is identified based on the user command received from the interaction device, the viewing preferences corresponding to the identified user is determined based on past and continuing interaction with the receiver/STB, as shown in block 1702. Once determined, the viewing preferences of the identified user or viewer is used by the receiver/STB to, optionally, capture programming content information associated with audio and visual programming content matching the viewer's viewing preferences, as shown in block 1703. The captured programming content associated with the audio and visual programming content matching the one or more viewers' viewing preferences is stored, optionally, as shown in block 1704. The receiver/STB may display the captured programming associated with the content matching the viewer's viewing preference to the one or more viewers in response to a user command by the one or more viewers received from the interaction device by the viewer, as shown in block 1705.

In essence, interactions between the interaction device and the receiver/STB are used to accomplish at least two important features of the system: to build a viewer profile that is stored on the receiver/STB and to present matching content. In some embodiments, interaction events represented by, for example, viewer selections and ratings of programming content, assist the system in identifying viewers' preferences to build a profile and to capture programming content that are at least similar to those preferred by viewers. In other embodiments, interaction events, similarly, including but not limited to user selections and ratings of programming content, are used to instruct the system in presenting programming content, including those selected by the viewers and recommended to the viewers based on their individual preferences.

In other embodiments, the viewer may continue to watch a program, and upon conclusion of the program in progress or before the viewer begins to watch a new program, the programming information corresponding to other programming content matching the viewer's viewing preference will be displayed for the viewer to select. In such embodiments, the programming content associated with the programming information has preferably already been captured along with the programming information. In other embodiments, the programming content is captured in response to explicit instructions from a viewer after the programming information is displayed. In such a case, the associated content is typically captured via unicast. In some embodiments, the programming content matching the viewer's viewing preference is automatically selected and displayed in transition after the program in progress is terminated, without a viewer's explicit instruction.

According to one embodiment, a unique remote control, as described in the earlier referenced U.S. provisional application Ser. No. 60/985,173, titled "Remote Control Unit for Intelligent Video Programming System" filed on Nov. 2, 2007, is used to control a user interface in the receiver/STB. The remote control has at least one button dedicated to the identification of a viewer. Specifically, when a viewer identification button is activated, the user profile of the particular viewer corresponding to the user identification button is activated in the receiver/STB. Consequently, the viewing profile of the viewer becomes active and the programming information captured for the viewer is retrieved from storage and displayed by the receiver/STB to the viewer.

Figure 18:
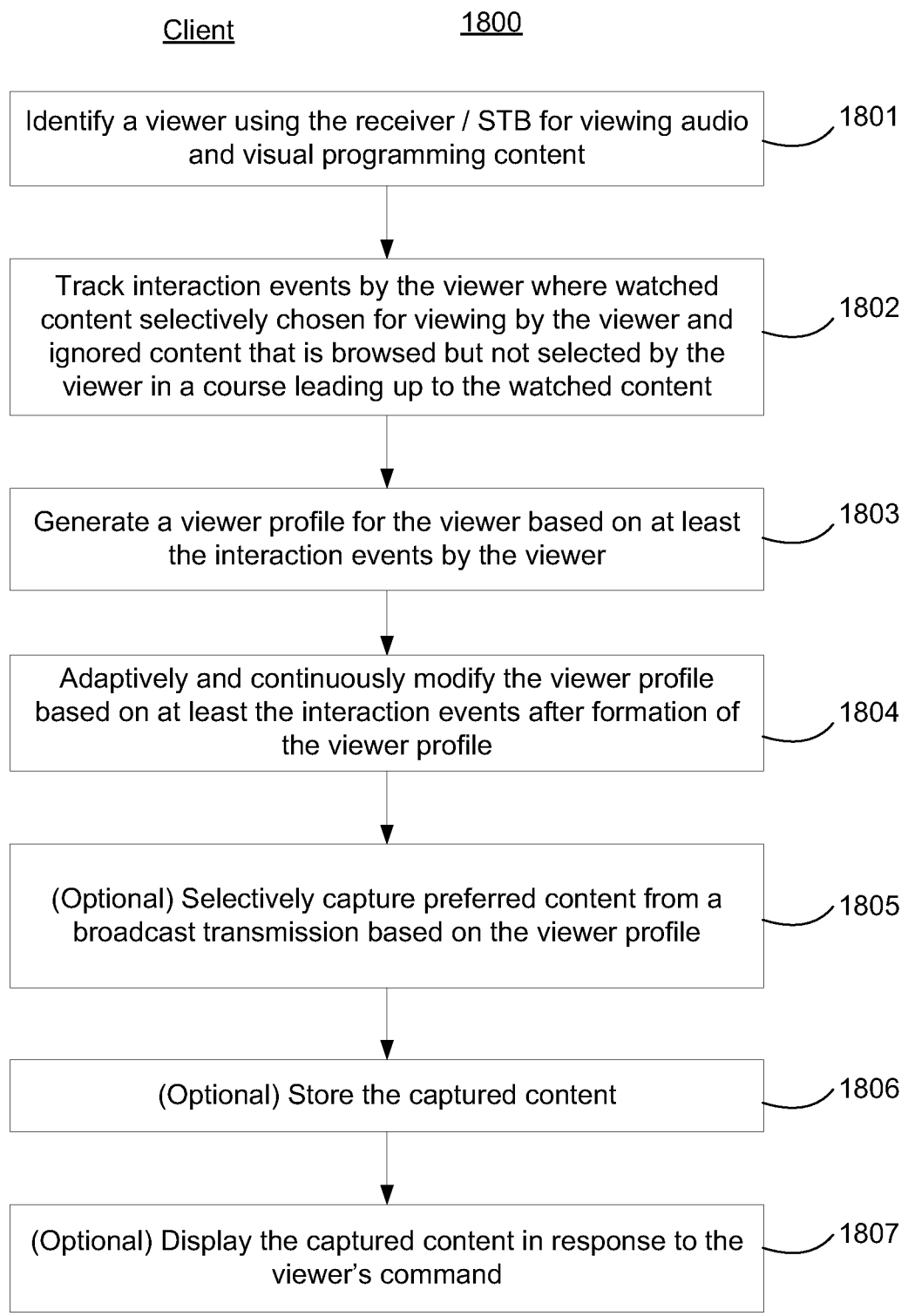
FIG. 18 is a flow diagram illustrating the PDP portion in a receiver/STB as an adaptive learning device with tracking of hits and misses in accordance with some embodiments.

Generally, in some embodiments, the receiver/STB captures audio and visual programming content matching a viewer's preferences. The viewer's preferences are based on at least one of multiple criteria. In some embodiments, the receiver/STB is an adaptive learning device that tracks hits and misses of programming content selected by a viewer to determine the viewer's viewing preference. "Hits" are defined as programming content that are selected or substantially consumed or viewed by a viewer, while "misses" are defined as programming content which are browsed prior to a "Hit" against other programming content but not viewed. FIG. 18 is a flow diagram illustrating the PDP portion in a receiver/STB as an adaptive learning device with tracking of hits and misses in accordance with some embodiments. Viewing preferences are determined independently for each viewer, and the receiver/STB continuously modifies a viewer's viewing preference by learning and adapting to different programming content that are viewed and/or deliberated skipped by the viewer.

Flow diagram 1800 in FIG. 18 illustrates, in some embodiments, how a receiver/STB adaptively learns about each viewer's viewing preferences by tracking programs watched and not watched by each viewer. For instance, a receiver/STB identifies a viewer using the receiver/STB for viewing audio and visual programming content, as shown in block 1801. When the viewer is identified, the interaction events by the viewer are tracked as the viewer uses the interface device and the user interface to select programs for viewing, as shown in block 1802. For example, interaction events may include, but are not limited to, a viewer choosing and selecting a first content for viewing, but ignoring at least a second content that is browsed but not selected. If a viewer's profile has been previously created, the viewer's profile in the receiver/STB is modified based on the interaction events by the viewer, and if the viewer's profile is not previously created, one is generated based on the interaction events by the viewer, as shown in block 1803. This series of adaptive and continuous modifications of the viewer profile based on at least interaction events after formation of the viewer profile is repeated for interaction events while the viewer is operating the receiver/STB, as shown in block 1804. The receiver/STB can optionally selectively capture preferred audio and visual programming content from at least a broadcast transmission based on the viewer profile, as shown in block 1805. The captured audio and visual programming content is, optionally, stored in block 1806 and, optionally, displayed in response to the viewer's command, as shown in block 1807. In some embodiments, the captured audio and visual programming content is prioritized in accordance to at least one of users' preferences and users' routines before display. Thus, the order in which programming content is presented for display may be determined by the demand for a particular program by the viewer and/or by the habit or routine in which the viewer watches different programming content.

Besides interaction events, the receiver/STB may also use other factors and criteria for modifying the viewer profile. In some embodiments, the time of day, week, and/or year in which the interaction events occur are tracked. For example, the times in which interactions with certain content are most frequent represent instances when the viewers are most active in viewing content of a certain type. Using the viewer profile, for example, in such an instance, the receiver/STB may therefore present the user with the specified content type at the appropriate time of day, thus adapting to the viewer's daily routine. In some embodiments, the receiver/STB tracks the subscriptions of audio and visual programs by the viewer. Still in some embodiments, the receiver/STB adaptively and continuously modifies the viewer profile based on the subscriptions. In other embodiments, the receiver/STB tracks audio and visual programs that are rated favorably by the viewer. Still, in some embodiments, the receiver/STB tracks programming content specifically requested by the viewer. While in other embodiments, the receiver/STB tracks programming content that is selectively captured by the receiver/STB at the viewer's command. In some embodiments, a receiver/STB may use collectively, all or some of the above factors or criteria to modify a viewer profile on a continuous basis as long as a viewer is properly identified by the receiver/STB to correspond the events to the proper viewer profile.

Figure 19:
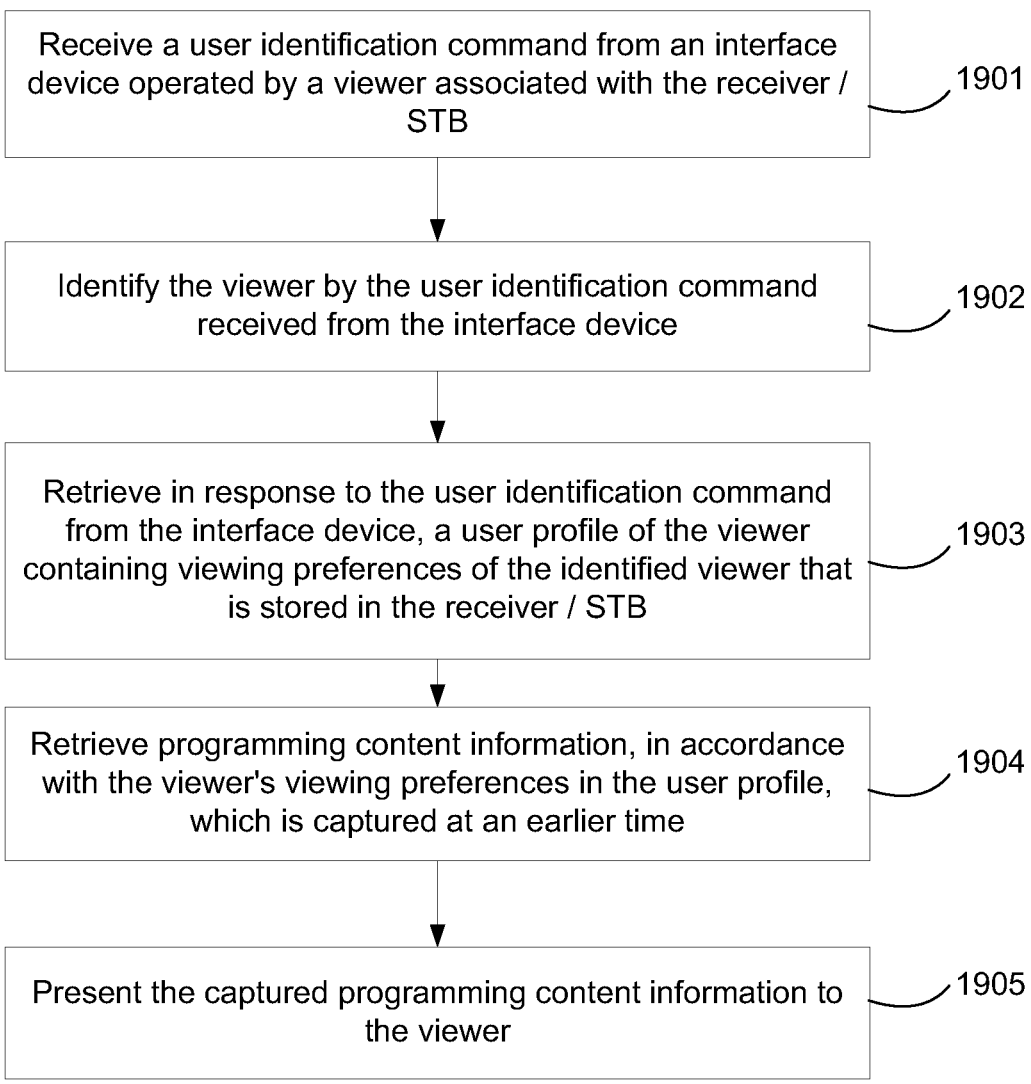
FIG. 19 illustrates a flow diagram of a method displaying information about captured programming content by a receiver/STB in accordance to some embodiments.

In some embodiments, the receiver/STB identifies the viewer through feedback from an interface device and uses the associated viewer's viewing profile, and uses these viewing preferences to present information about content that may be of interest to the viewer. FIG. 19 illustrates a flow diagram of receiver/STB displaying information about programming content in accordance with some embodiments. Block 1901 shows a receiver/STB receiving user identification command from an interface device operated by a viewer associated with the receiver/STB. In block 1902, the receiver/STB identifies the viewer by the user identification command received from the interface device. In block 1903, the receiver/STB retrieves, in response to the user identification command from the interface device, a user profile of the viewer containing viewing preferences of the identified viewer that is stored in the receiver/STB. In block 1904, the receiver/STB retrieves programming information, in accordance with the user profile having one or more viewers' viewing preferences, which is captured at an earlier time. In block 1905, the captured programming information is presented to the viewer.

In the embodiments described above, the receiver/STB displays and presents the captured programming information when a different user is identified by the receiver/STB through the different user's activation of a different user identification button on the interface device. In other embodiments, the captured programming content information may be displayed upon request by a viewer or upon completion of a programming content that is being viewed by the viewer. In the former case, if the viewer requests to view programming content information captured, the programming content information is displayed once the receiver/STB receives such a user command from the interface device. In other embodiments, the programming content information is automatically presented to the viewer, among other programming content information stored on the receiver/STB, upon completion of a program being viewed, without instructions from the viewer. If a viewer is interested in the programming content associated based on the information presented, the viewer selects the audio and visual programming content by activating a command from the interface device (e.g., remote control), and the receiver/STB will respond by displaying the selected programming content.

Figure 20:
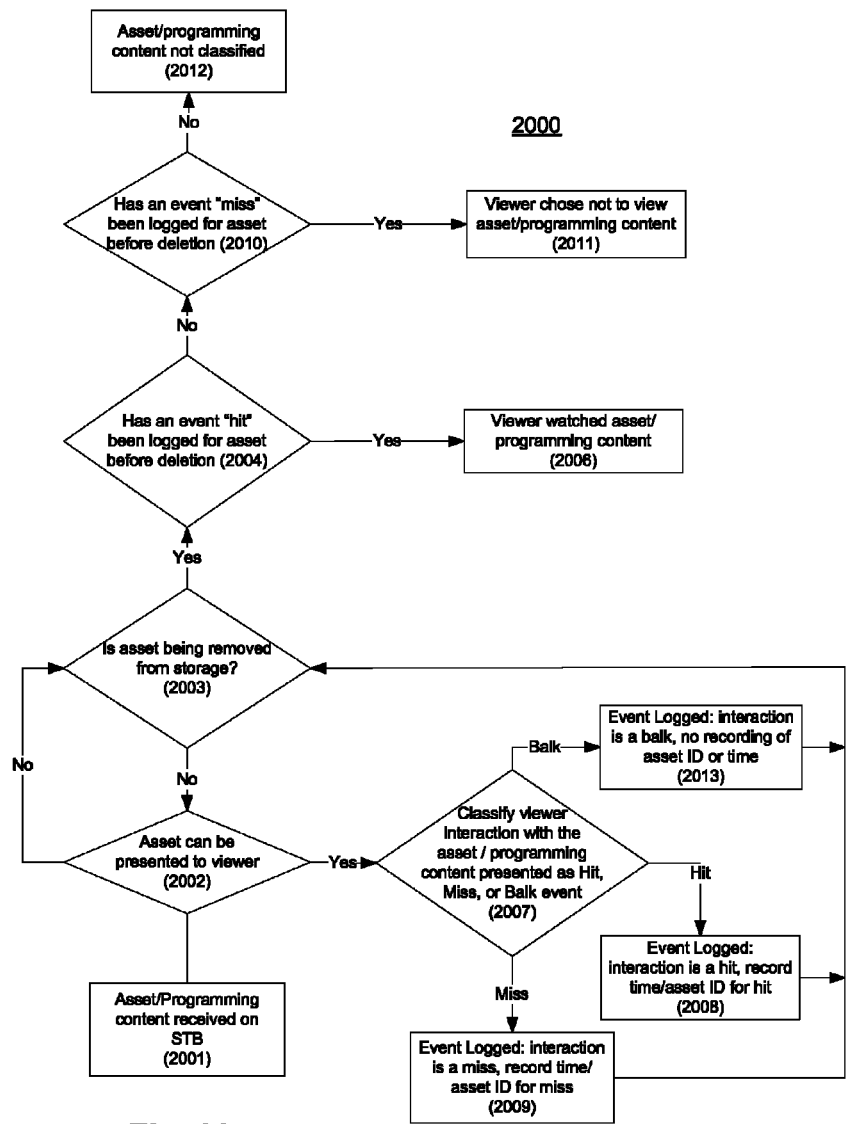
FIG. 20 is a block diagram illustrating an algorithm that intelligently determines viewer preferences by tracking a viewer's interactions with programming content, in accordance with some embodiments.

One of the novel intelligent features of this system is its ability to use the viewers' interactions with the programming content or asset, to improve viewer experience. Generally, such interaction events are used to improve viewer experiences such as, including but not limited to, "personalizing" the PDP module in the content operation center and display priority of different programming content/asset in the user interface when interfacing with the receiver/STB. FIG. 20 is a block diagram illustrating a method that intelligently determines viewer preferences by tracking a viewer's interactions with programming content in accordance with some embodiments. In some embodiments, the asset or programming content is received via at least one of broadcast transmission and unicast transmission at the receiver/STB, as shown in block 2001. This programming content or asset may then be presented by the system to a viewer associated with the receiver/STB in response to activation of the receiver/STB and identification of the viewer as shown in block 2002. If the programming content/asset is presented to the viewer, the response of the viewer, in form of viewer interaction with the asset/programming content, is determined by the system intelligence as one of hit, miss, or balk events, as shown in block 2007. A hit is referred to as a viewer selecting the asset/programming content for viewing, a miss is referred to as a viewer skipping the asset/programming content and choosing to watch another asset/programming content, and a balk is referred to as a viewer not responding to the asset/programming content, in which case, it is unclear if the asset or programming content is received favorably or unfavorably by the viewer. The system logs each of these viewer interactions as an event. For instance, if the viewer interaction is classified as a hit, the event is logged as a hit, and the corresponding time and asset ID are recorded for the event as shown in block 2008. If the viewer interaction is classified as a miss, the event is logged as a missed, and the corresponding time and asset ID are recorded for the event as shown in block 2009. Lastly, if the viewer interaction cannot be classified, the event is logged as a balk, and no corresponding time or asset ID is recorded for that event. In some embodiments, such classification of interaction events as they are related to particular programming content/asset helps to personalize the PDP in the content operation center and contribute to the determination of programming content in which the recommendation engine sends or recommends to the receiver/STB.

In some embodiments, this logging of events and association of events logged for each asset helps a receiver/STB to prioritize the many programming content or asset being displayed in a user interface to the viewer. For instance, in some embodiments, where an asset is associated with multiple events that the interaction is a miss, the asset is displayed lower on a list since it realizes the viewer has deliberately skipped it a number of times. Alternatively, they could be put higher on the list because the receiver/STB wants to bring attention to the viewer that the particular asset has been skipped multiple times, and thus the viewer should either watch it or delete it. Similarly, an asset receiving multiple events where the interaction is a hit suggests that the viewer likes the asset and repeatedly watches the asset, and thus the asset may be placed high on the list. Also, for assets associated with a large number of events where there is not any favorable or unfavorable interaction, the assets may be listed high on the list to generate interest from the viewer or placed low on the list.

In other embodiments, once the interaction with the programming content has been logged as an event as either a hit, miss, or balk classification, the programming content/asset is then stored until the asset is deleted by the receiver/STB to make room for other programming content, expiration of the digital management rights (or viewing rights), or until the viewer deliberately deletes or removes the content. While the asset is stored, the asset may be presented to the viewer again for viewing. However, if the asset is being removed from storage, as shown in block 2003, the system will query about the hit, miss, and balk events related to the viewer interactions with the asset or programming content that is being removed. For instance, if there is at least one event of a hit logged for the asset before it is being deleted, the system will register that the viewer has watched the asset or programming content, as shown in block 2006. If there is not a single log event associated with the asset as being a hit, the system asks if there has ever been an event logged as a miss for the asset being deleted, as shown in block 2010. If there is, then the system interprets that the viewer has chosen not to view the asset/programming content, as shown in block 2011. Still, if there is not an event associated with the asset being deleted as being a hit or a miss, the system interprets the viewer's impression of the asset is undetermined and the system cannot interpret if the viewer liked or disliked the asset and thus the asset is not classified as shown in block 2012. In some embodiments, such classification of interaction events as they are related to particular programming content/asset helps to personalize the PDP in the content operation center and contribute to the determination of programming content in which the recommendation engine sends or recommends to the receiver/STB.

Yet another intelligent aspect of the system is that each viewer is capable of sharing his/her preferred programming content with other viewers. This is a form of community sharing of programming content. Community sharing refers to the ability of having one viewer recommend programming content to one another. For example, person A in California can recommend a specific show to person B in New York, directly by using the interface device or remote control. Such recommendations may be processed by the PDP in the content operations center before being pushed to the other receiver/STBs or such recommendations may be sent directly to the other receiver/STBs. In some embodiments, viewer A recommends a program to viewer B through the user interface on A's receiver/STB. Person B's receiver/STB would then either automatically capture and present the recommended content to person B, or present an option for person B to capture the recommended content in the future. In some embodiments, this recommendation and sharing feature may be presented as one option in the user interface of the receiver/STB where a viewer can select and control using the remote control or interface device. For instance, each viewer may have an option to "recommend to friends", where recommendations of a programming content can be sent to any of a list of friends where their receiver/STBs are interconnected.

In other embodiments, the system can identify that certain viewers are recommending content to one another and so build a social recommendation graph and data mine such a graph to automate such cross promotions between users. In other words, a network of receiver/STB may be made into a social network comprising viewers operating their receiver/STB that communicates with each other by recommending audio and visual programming content. In some embodiments, the network of receiver/STB may be tied into a social network application that is commonly operated on a desk top terminal such as a computer. In such embodiments, each receiver/STB is aware of a social network and each profile on a receiver/STB may be tied to a corresponding profile on the social network. In this example, a particular user of the social network may show other users what specific content the particular user has recently viewed. By associating a profile on the receiver/STB with a profile on a social network, this association may be used as a basis for sharing recommendations in programming content among users.

Still another intelligent aspect of the system is its ability to capture and present content of relevance to a viewer using information collected during initial configuration to generate a foundation of a profile for a user or viewer. In some embodiments, after a system is initiated, a user or viewer is asked to set up a viewer profile on the receiver/STB. Specifically, each user button on the interactive device/remote represents an individual viewer associated with the receiver/STB. In some embodiments, initial configuration of the receiver/STB, includes but is not limited to, questions about the viewer's sex, age, race, education level, preferred programming content such as genre and channels. All the questions were aimed at collecting information about the viewer so as to build an initial user profile and to capture and present content of relevance or of interest to the viewer.

Intelligent Presentation of Targeted Advertising

The system described in this disclosure is designed to store and play out digital audio and video files to the television set. This system utilizes a user interface to present content options in an organized and personalized fashion. One distinct aspect of the system is its ability to deliver advertising in a paradigm different than the thirty second ad segments employed by the traditional television advertising. The advertising paradigm of this system is novel in at least three different ways. First, the system provides a number of diverse opportunities to target advertisements to viewers within the user interface, in accordance with rules of an advertising campaign. Second, the system has the potential to target and achieve relevancy in targeting advertising to the viewer using different rules belonging to different advertising campaigns. And third, the system has the capability of implementing, managing and tracking different advertising campaigns.

The different ways of implementing the advertising paradigm of the system is enabled by the interaction of at least the user interface, the interaction device (e.g., remote control), the receiver/STB, and the ability to transmit programming content and advertising content through different means in an expeditious manner. For example, the receiver/STB is able to identify different viewers through the interaction device, and the user interface on the receiver/STB enables different viewers to control their individual viewing content providing opportunities for advertisement insertion where it is not previously possible. The components in the receiver/STB enable the system to continuously and adaptively learn about the viewers' preferences and to target advertising content to specific viewers based on either the viewing preferences or the selected programming content. Furthermore, the massive storage enables the receiver/STB to provide a wide range of programming content and advertising content for display.

Interaction of different components and functions of the system enables the implementation of intelligent advertising. First, the system has the ability to remove original advertisements from programming content and/or insert targeted advertisements into programming content at different levels. Second, in combination with a user interface, the system has the intelligence to selectively target, display, and place advertisements, in accordance with different advertising campaign management rules, including but not limited to, targeting one or more specific viewers associated with the receiver/STB, to effectively communicate promotional information to viewers. Third, advertising may be targeted at precise circumstances associated with viewers' interactions (e.g., time of day, week, and/or year, type of program etc.) as dictated by a list of attributes or rules supported by a campaign management system.

Figure 21:
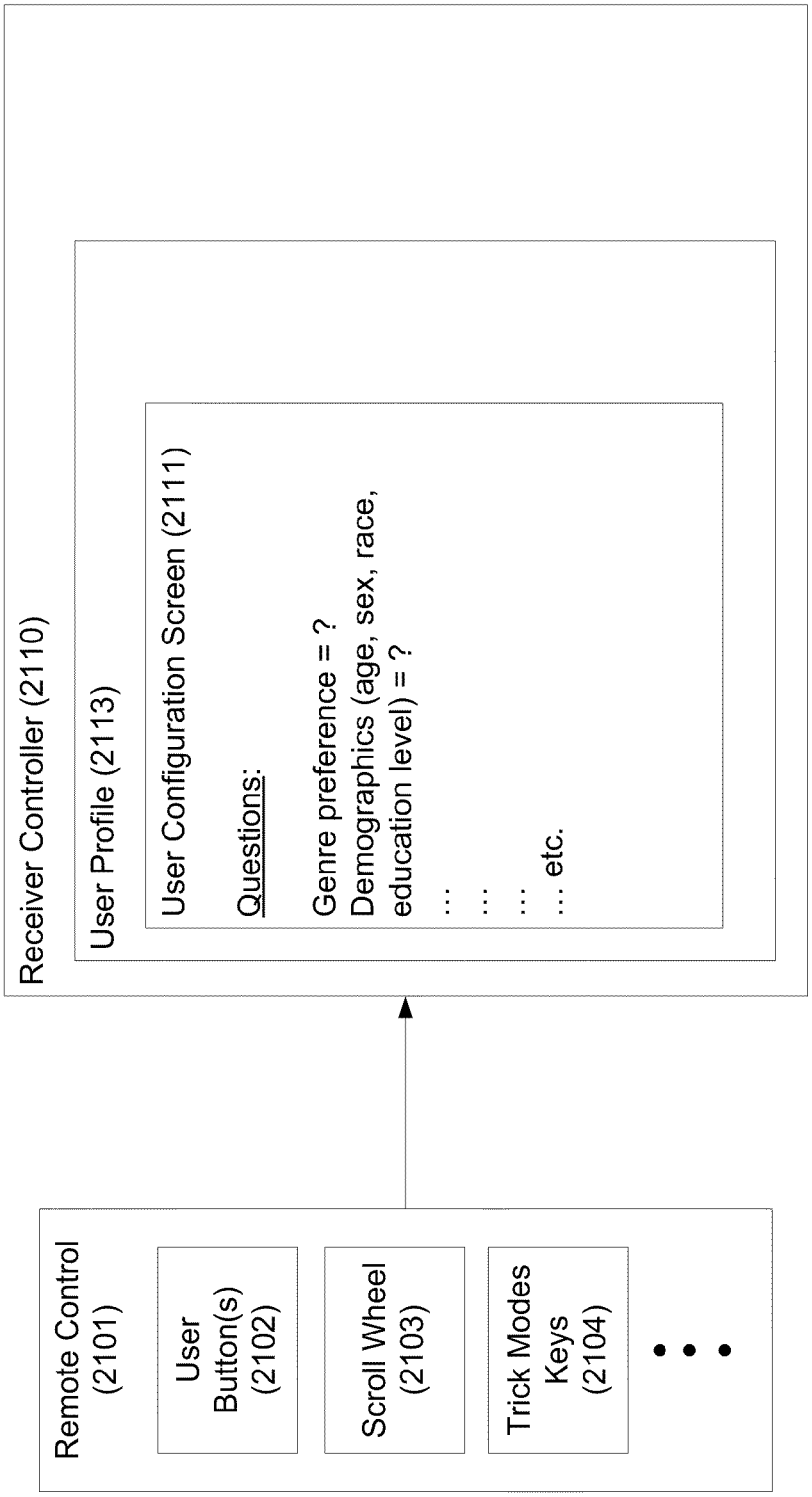
FIG. 21 is a block diagram illustrating the initial set up of a remote control/interaction device in setting up a user profile stored on the receiver/STB, which user profile corresponds to a particular user button on the remote control, in accordance with some embodiments.

In some embodiments, the interaction device or the remote control device has one or more user buttons specifically designed to send a user identification command to the receiver/STB to identify the viewer operating the interaction device. In some embodiments, this user identification is accomplished during set up of the receiver/STB in conjunction with the use of the remote control. In some embodiments, initial configuration of the user profile may be achieved via a website on the internet. FIG. 21 is a block diagram illustrating the initial set up of a remote control/interaction device in setting up a user profile stored on the receiver/STB that corresponds to a particular user button on the remote control, in accordance with an embodiment. FIG. 21 shows a remote control or interaction device 2101 having at least one or more user buttons 2102, a scroll wheel 2103, and keys or buttons to activate certain "trick modes" 2104. During initial set up, one of the user buttons 2102 is activated and corresponds to a particular user/viewer profile 2113. Within this user/viewer profile is a user/viewer configuration screen 2111 for configuring the basic demographic information of the user/viewer that is being identified by the particular user button. In some embodiments, questions including but not limited to information about the viewer's sex, age, race, education level will be presented to gather basic demographic information of the viewer. Further, other questions, including but not limited to programming content preference such as genre, may be asked of the user/viewer. Such information is collected during initial configuration to generate a foundation of a profile of the user/viewer. The complete profile will be built with additional information gather from other data/information, including but not limited to, the tracking of interaction events such as classification of programming content as hits, misses and bulk, viewer/user's rating of programming content, user/viewer's ranking of programming content, user/viewer's subscription to particular programming content etc. will all be used to modify the viewer profile. This specific profile will be retrieved by the receiver/STB whenever the particular user identification command is received from the activation of the corresponding user button on the remote control/interaction device.

Removal of Advertisements at the Content Operation Center

Figure 22:
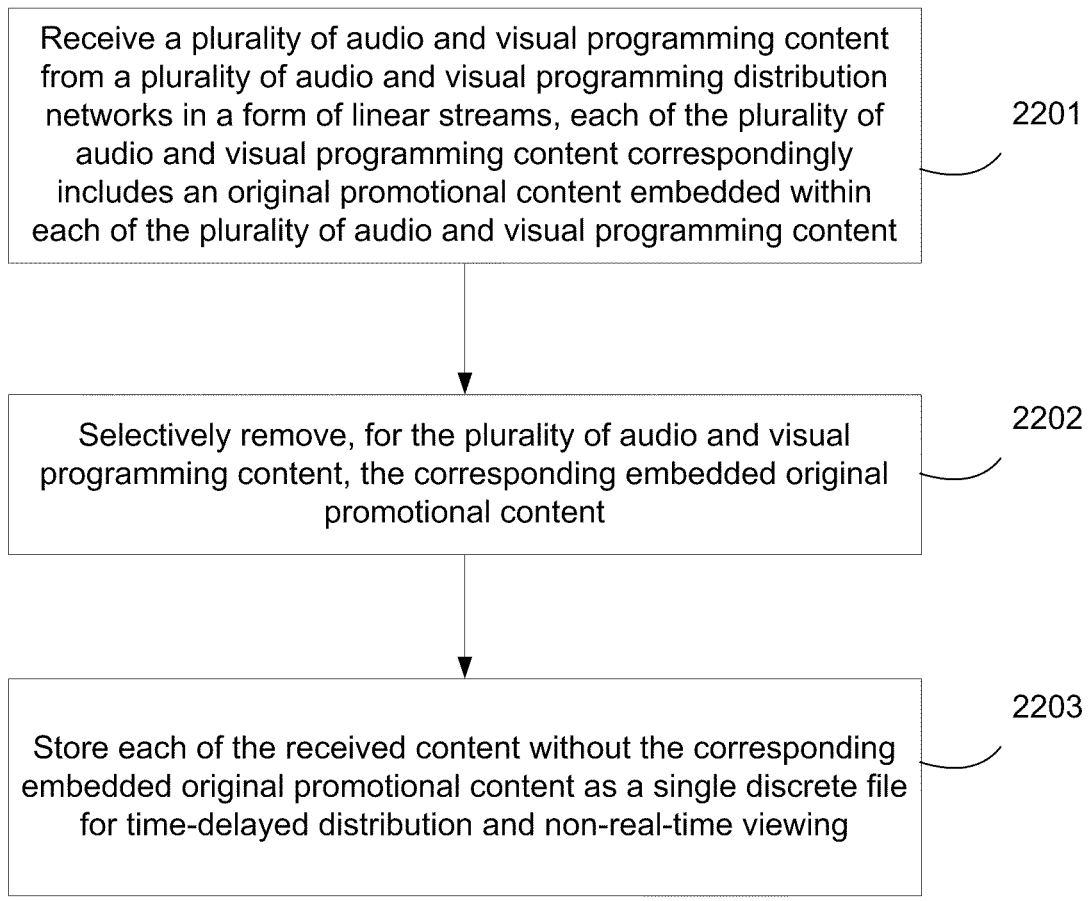
FIG. 22 is a flow diagram illustrating removal of original advertising content from programming content at the content operation center, in accordance with some embodiments.

The system has the ability to remove original advertisements from programming content and/or insert advertisements and promotional content into programming content at different levels of the system. For instance, either or both of these operations can be performed at the content operation center. FIG. 22 is a flow diagram illustrating removal of original advertising content from programming content at the content operation center in accordance with some embodiments. In some embodiments, the content operation center receives a plurality of audio and visual programming content from a plurality of audio and visual programming distribution networks in a form of linear streams, as shown in block 2201. Each of the plurality of audio and visual programming content includes a corresponding original promotional content embedded within each of the plurality of audio and visual programming content. The content operation center further selectively removes the corresponding embedded original promotional content, as shown in block 2202, for the plurality of audio and visual programming content. The content operation center then stores each of the plurality of audio and visual programming content without the corresponding embedded original promotional content as nonlinear content, in the form of a single discrete file, for time-delayed distribution and non-real time viewing.

In some embodiments, the audio and visual programming content received by the content operation center in form of linear streams may include, but are not limited to, television programming such as episodes of a series, movies, documentaries, internet videos etc. In some embodiments where the audio and visual programming content contains original advertisements embedded in the programming content, once the original advertisements are removed, the programming content without the advertisements are saved as discrete files for time-delayed distribution as nonlinear content. Such nonlinear content may be transmitted to the viewers depending on a schedule. The nonlinear content may be delivered by broadcast transmission or unicast transmission. If it is a broadcast transmission, it may be a wired broadcast network, wireless broadcast network, or an IP multicast network, using available bandwidth of an ATSC digital broadcast.

Figure 23:
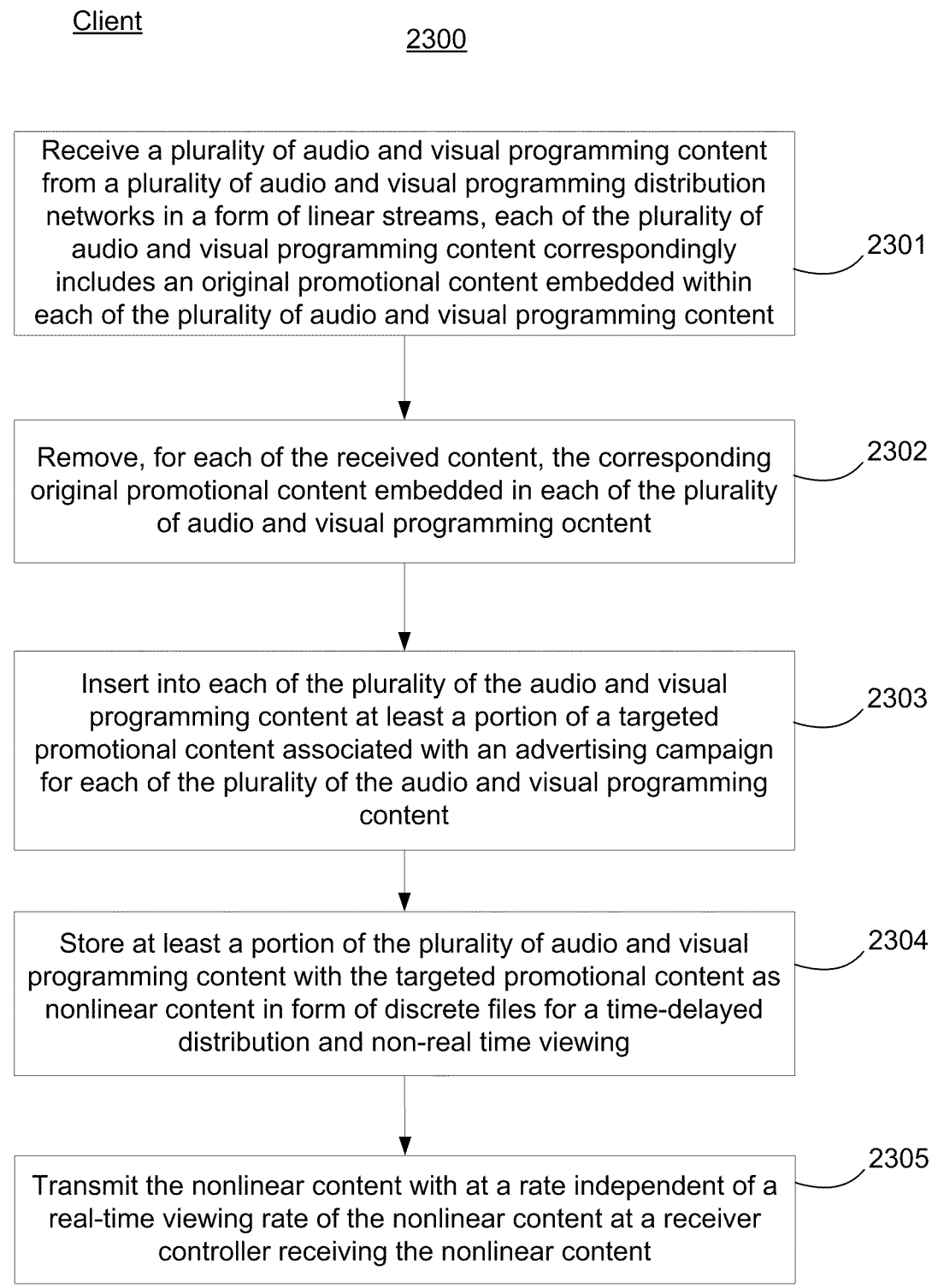
FIG. 23 is a flow diagram illustrating removal of original advertising content and insertion of targeted advertising content into programming content at the content operation center, in accordance with some embodiments.

Removal and Insertion of Advertisements at the Advertising Campaign Management Module In some embodiments, the content operation center may perform both removal and insertion of advertisement content in the programming content. For instance, FIG. 23 is a flow diagram illustrating removal of original advertising content and insertion of targeted advertising content into programming content at the content operation center in accordance with some embodiments. Similar to removal of content, the content operation center receives a plurality of audio and visual programming content from a plurality of audio and visual programming distribution networks in a form of linear streams, as shown in block 2301. Original promotional content is embedded within each of the plurality of audio and visual programming content. In other embodiments, the programming content may be received in form of discrete files. The content operation center then removes the corresponding original promotional content embedded in each of the plurality of audio and visual programming content as shown in block 2302, in accordance with a particular advertising campaign. The content operation center then inserts into each of the plurality of the audio and visual programming content, at least a portion of a targeted promotional content by applying a set of rules for the particular advertising campaign, as shown in block 2303. In some embodiments, the advertising campaign may be aimed at viewers of each of the plurality of the audio and visual content, while in other embodiments, the advertising campaign may be aimed at attributes associated with a particular programming content. Still, in some embodiments, the promotional content may be part of an advertising campaign unrelated to programming content, but rather a time such as Christmas to generate interests on advertised goods and services, that is inserted into a broad range of programming content, indiscriminate of the programming content. In other embodiments, certain targeted promotional content relevant to the programming content is inserted. In some embodiments, at least a portion of the plurality of audio and visual programming content with the targeted promotional content is stored as nonlinear content in form of discrete files for a time-delayed distribution and non-real time viewing, under at least instructions from the advertising campaign management system, as shown in block 2304. In other embodiments, at least a portion of the nonlinear content is transmitted to viewers by broadcast transmission at a rate that is independent of a real-time viewing rate of the nonlinear content at the receiver/STB receiving the programming content, in accordance to a schedule, as shown in block 2305.

In some embodiments, audio and visual programming content may be received at the content operation center in a form of discrete files or linear streams. While the programming content may or may not contain original advertising content, the content operation center has the ability to extract or remove original advertising content if present, whether the audio and visual programming content is received as linear streams or discrete files. If there is no embedded advertising content within the programming content, as in some other embodiments, the programming content is either stored as discrete files as received without advertisements, or have targeted advertisements inserted into the programming content before being stored under instructions from the campaign management system to target a specific advertising campaign. Similarly, if the programming content has original advertising content in some embodiments, the programming content may be stored with the embedded original advertising content as discrete files and save for removal of the advertisements at a different time. On the contrary in other embodiments, the original embedded advertisements may be removed from the programming content before stored, or insert targeted advertisements in place of the original advertisements before the programming content is stored. In some embodiments, where and when any original advertising is removed and/or where and when advertising targeted to a particular advertising campaign is inserted, are at least controlled in part by the advertising campaign management system.

Removal of Advertisements at the Receiver/STB

In those embodiments where the programming content does not include advertisements, or if the original advertisements embedded in the programming content is not removed before being transmission to the viewers, advertisements removal and/or insertion that is part of an advertising campaign is performed at the receiver/STB prior to display of programming content. FIG. 24 is a flow diagram illustrating removal of original advertising content from programming content at the receiver/STB in accordance to some embodiments. In some embodiments, the receiver/STB receives a plurality of audio and visual programming content in a form of linear streams or discrete files, where each of the plurality of audio and visual programming content contains original advertising content, as shown in block 2401. The receiver/STB selectively extracts the original advertising content, which is embedded within the plurality of audio and visual content, from each of the plurality of audio and visual programming content, as shown in block 2402. The receiver/STB then stores each of the plurality of the audio and visual programming content without the corresponding original advertising content as modified discrete files in the receiver/STB, as shown in block 2403. The removal of original advertising content may, in some embodiments, may be a function of a particular targeted advertising campaign with a unique objective.

In some embodiments, the audio and visual programming content may be linear or nonlinear content. Linear content is typically received by broadcast transmission while nonlinear content may be received by the receiver/STB via broadcast transmission or unicast transmission. Furthermore, nonlinear content is generally received at a rate independent of a rate of real time viewing of the nonlinear content at the receiver/STB. For instance, the nonlinear content may be transmitted at a rate much faster or much slower than the real-time viewing rate of the nonlinear content.

In the aforementioned embodiments, the audio and visual programming content generally contains originally embedded advertising content, but in some cases, may contain advertisements inserted into the audio and visual programming content at the content operation center. There may be instances where the advertisements inserted at the content operation center may be expired or are to be replaced as instructed by the content operation center because of a change in advertisement campaign. In each of these cases, the advertising content may be removed by the receiver/STB under specific instructions from the advertising campaign management system.

In some other embodiments, each of the received programming content is identified before advertisements are removed under instructions from the advertising management system in accordance to rules targeting a specific advertising campaign. For instance, the advertising management system may make a determination about a programming content in which a targeted advertising campaign is to be applied. Afterwards, based on advertising campaign rules, identification of the programming content, the original advertisements associated with the programming content is removed and the advertisements associated with the targeted advertising campaign is inserted. In some embodiments, selected advertisements may be inserted into the programming content before it is stored, and in other embodiments, selected advertisements may be inserted immediately before display after the programming content has been requested by the viewer.

Insertion of Advertisements at the Receiver/STB

Figure 25:
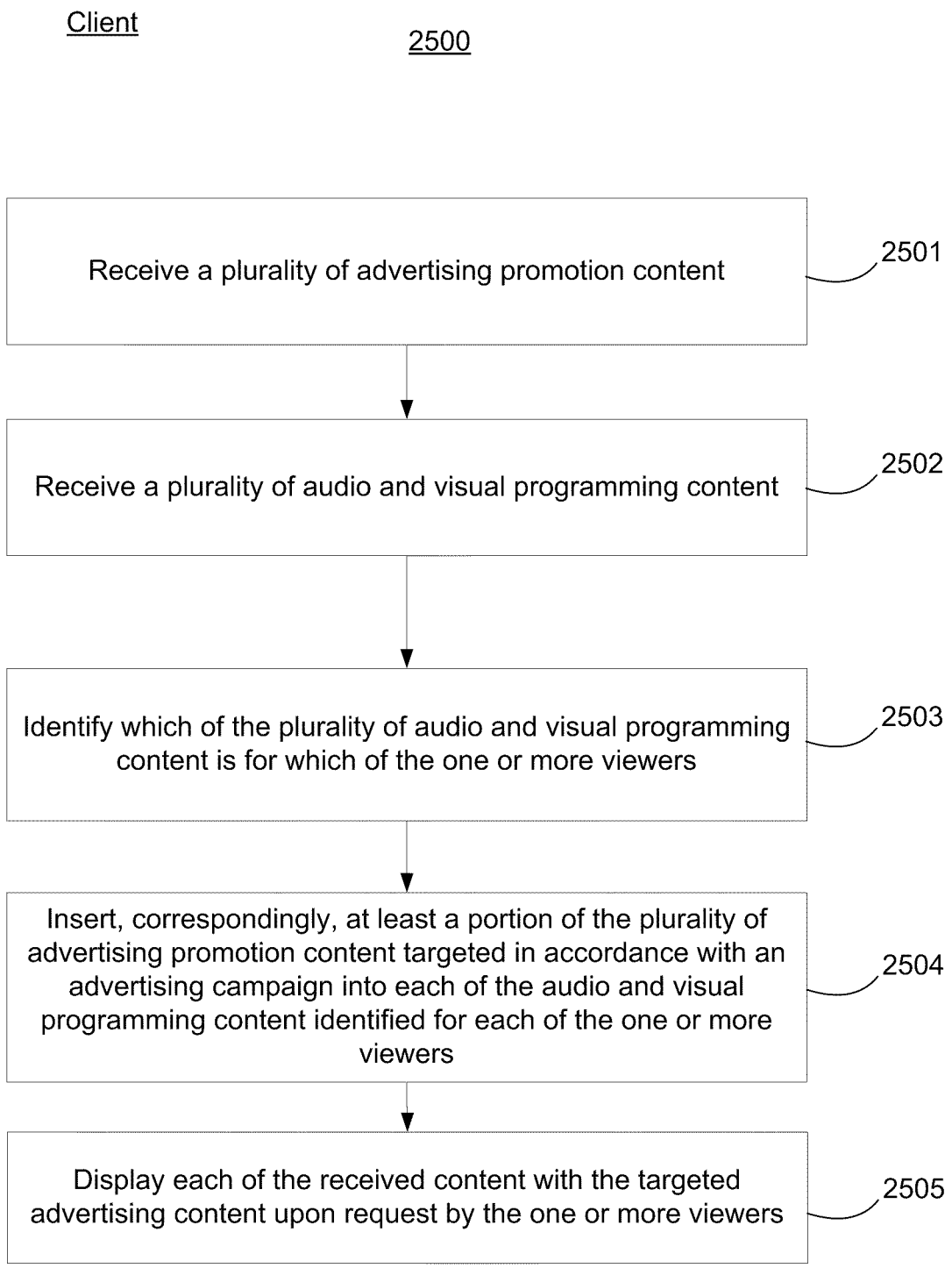
FIG. 25 is a flow diagram illustrating insertion of targeted advertising content into viewer specific programming content at the receiver/STB, in accordance with some embodiments.

Still there are some embodiments where the audio and visual programming content does not contain any advertisement when received at the receiver/STB. Typically, when the receiver/STB receives programming content without any advertisements, advertisements from targeted advertising campaigns are inserted into programming content. In some embodiments where advertising campaigns are targeting each of the specific viewers associated with the receiver/STB, the targeted advertisements will be inserted into corresponding programming received for each of the specific viewers. In these embodiments, the programming content is either ingested at the content operation center without advertisements, or the original embedded advertisements are removed before transmitted to the receiver/STB. FIG. 25 is a flow diagram illustrating insertion of targeted advertising content into viewer specific programming content at the receiver/STB in accordance with some embodiments. In these embodiments, the receiver/STB is configured to receive a plurality of advertising promotion content, as shown in block 2501, and may optionally be targeted to a particular advertising campaign by the advertising campaign management system or to one or more viewers using the receiver/STB. The receiver/STB receives a plurality of audio and visual programming content, as shown in block 2502. Then, the receiver/STB identifies which of the plurality of audio and visual programming content is for which of the one or more viewers, as shown in block 2503. In some embodiments, some of the plurality of audio and visual programming content may also be identified as targets of one or more particular advertising campaigns. After the identification, the receiver/STB inserts, correspondingly, at least a portion of the plurality of advertising promotion content targeted in accordance with an advertising campaign or for the one or more viewers into each of the audio and visual programming content identified for each of the one or more viewers, as shown in block 2504. The receiver/STB then displays each of the plurality of audio and visual programming content with the targeted advertising promotion upon request by the one or more viewers using the receiver/STB, as shown in block 2505.

In some embodiments, after having been received by the receiver/STB, each of the plurality of audio and programming content after the plurality of audio and visual programming content is stored before any advertising promotion content is inserted. In other words, the advertising content is inserted before the programming content is displayed or inserted during displaying of the programming content, and after a request is made to view the programming content. In other embodiments, after having been received by the receiver/STB, the plurality of audio and visual programming content is identified either for one or more viewers or for association with one or more advertising campaigns. The appropriate advertising content selected for each of the plurality of audio and visual programming content is retrieved and inserted into each of the corresponding plurality of audio and visual programming content. In some embodiments, the advertising content is stored in the receiver/STB. In other embodiments, the advertising content is directly retrieved by downloading via unicast transmission from the content operation center. The audio and visual programming content with the inserted advertising content is then stored before being displayed in response to a viewer request.

In some embodiments, a viewer may be identified via a user command received from an interaction device having one or more user buttons that is activated by the viewer when interacting with the receiver/STB. Specifically, when the one or more user buttons are activated in the interaction device, a predetermined profile stored on the receiver/STB is activated, such that specific viewing preferences and programming information and/or content associated with the viewing preferences connected to the corresponding profile is determined.

When programming content matching the viewing preferences is selected, the programming content is displayed. In some embodiments, the targeted advertisements are inserted after the programming content is selected but before it is displayed; in other embodiments, the targeted advertisements are inserted as the program is being displayed, still, in some embodiments, the advertisements are inserted before the programming content is initially stored.

In some embodiments, targeted advertisements may be inserted before, after, or as part of the programming content when an action is being performed on the audio and visual programming content. In some embodiments, at least a portion of the plurality of advertising promotion content is selectively downloaded onto the receiver/STB to target the viewers associated with the receiver/STB. Such selectively downloaded advertising promotion content is displayed over the programming content when an action, including but not limited to, fast forward, rewind, pause, skip forward, skip backward etc., is performed on the programming content. For example, during fast forward, when embedded or inserted advertisements in the programming content are being fast forwarded, a different advertising image or another form of advertising may be placed over the fast forwarding advertisements. This overlaying image or advertising is then removed when the operation is deactivated. In other embodiments, advertisements may be selectively inserted immediately before and after content playback. Still, some portions of the advertisements can be personalized to make the advertisements particularly individualized to the viewer, such as for example, "Bill, this can be your car!!"

Removal and Insertion of Advertisements at the Receiver/STB

Figure 26:
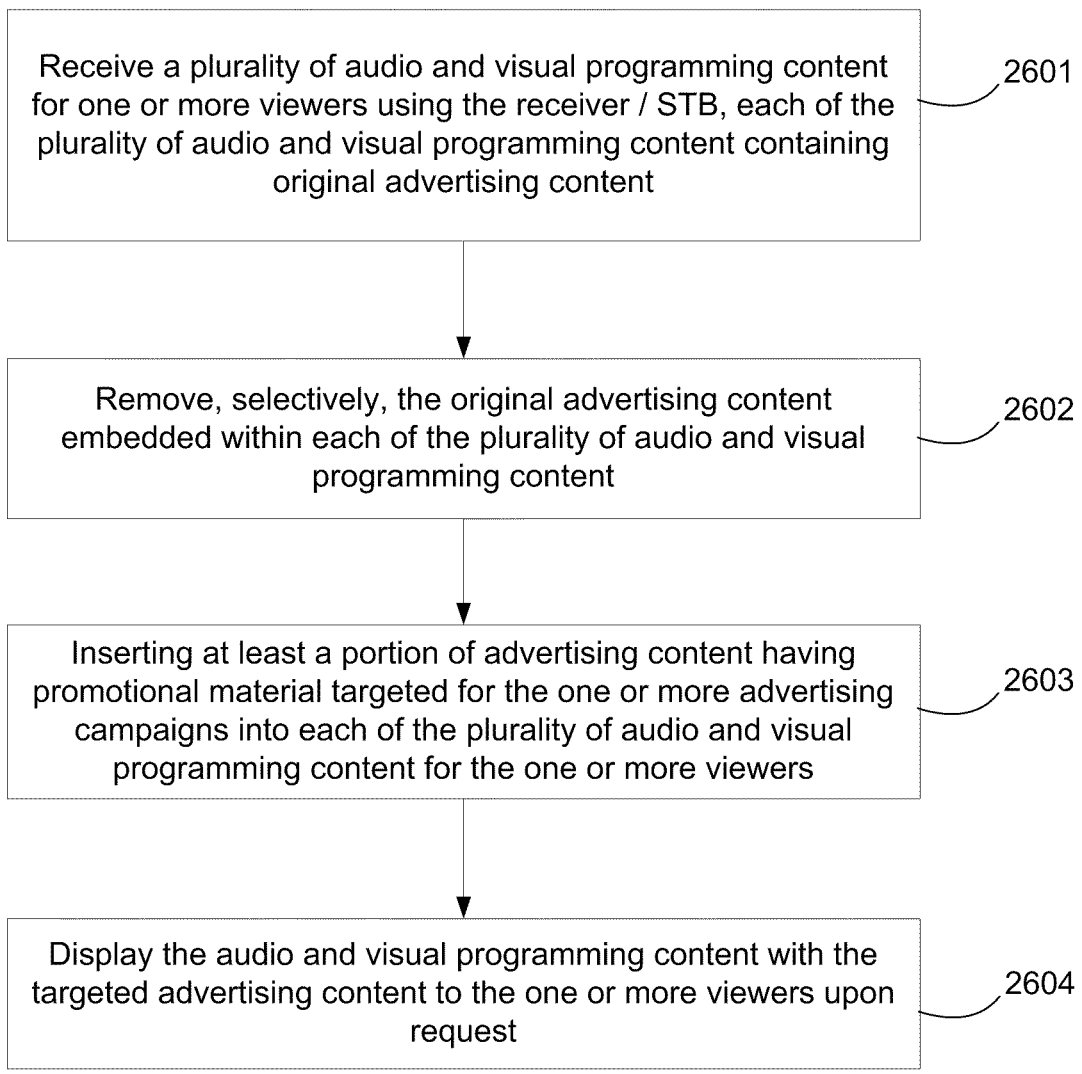
FIG. 26 is a flow diagram illustrating removal of original advertising content from viewer specific programming content and insertion of targeted advertising content into the viewer specific programming content at the receiver/STB, in accordance with some embodiments.

Both removal of original advertisements and insertion of targeted advertisements may be performed in the receiver/STB. For instance, in some embodiments, programming content may not be processed at the content operation center at all after ingestion. However, in some other embodiments, programming content is processed at the content operation center but has to be modified at the receiver/STB either due to a change in advertising campaign or updating of advertising content to better target the viewers. FIG. 26 is a flow diagram illustrating removal of original advertising content from viewer specific programming content and insertion of targeted advertising content into the viewer specific programming content in the receiver/STB in accordance with some embodiments. In some embodiments, a receiver/STB receives a plurality of audio and visual programming content for one or more viewers using the receiver/STB, each of the plurality of audio and visual programming content containing original advertising content, as shown in block 2601. Optionally in some embodiments, the receiver/STB identifies which of the plurality of audio and visual programming content is for which one of the one or more viewers. The receiver/STB then selectively removes the original advertising content embedded within each of the plurality of audio and visual programming content, as shown in block 2602. At least a portion of advertising content having promotional material targeted for one or more advertising campaigns is correspondingly inserted into each of the plurality of audio and visual programming content for the one or more viewers, as shown in block 2603. In some embodiments, the advertising campaigns may be targeted at one or more viewers associated with the receiver/STB. Upon request by the one or more viewers, the audio and visual programming content is displayed with the targeted advertising content, as shown in block 2604.

In some embodiments, the audio and visual programming content is stored in the receiver/STB before identification of the audio and visual programming content, removal of original advertising content, or insertion of targeted advertising content. As described previously, in some embodiments, the removal of original advertising content and insertion of targeted advertising content occurs after the audio and visual programming content is identified, associated with the viewer, and retrieved. In some embodiments, the removal and insertion of advertisements are performed prior to display of the programming content, while in other embodiments, the removal and insertion of advertisements are performed during display of the programming content. In some embodiments, targeted advertising content is received by the receiver/STB via either broadcast or unicast transmission from the content operation center.

In some embodiments, as described earlier, retrieval of programming content is in response to identification of the viewer. In some embodiments, a viewer operating an interaction device sends a user identification command to the receiver/STB, using one of the user identification buttons on the interaction device, and the receiver/STB identifies the viewer based on the user identification command. In some embodiments, when a particular program is selected, advertising content targeted for one or more advertising campaigns that is downloaded earlier is retrieved and selectively inserted into the program either before the program is displayed or when the program is being displayed. In other embodiments, some portions of the advertisements for the advertising campaigns may also be displayed when an action is performed on the program, including, but not limited to, fast forward, reverse, pause, skip forward, skip backward, etc., as previously described. Similarly, other portions of the advertisements targeting the viewer may also be displayed before or after playback of the program. Furthermore, some portions of the advertisements may be personalized specifically for the viewer, such as, for example, "Bill, this can be your car!!" to make the advertisements more personal to the viewer.

According to one embodiment, expired advertisements that are considered "old" or "stale" can be swapped out. For instance, a network broadcasting a general television program is paid by advertisers for advertisements that are viewed up to three (3) days from original airing. In this example, an "old" or "stale" advertisement may be defined as any advertisement that is older than three (3) days from original airing. Anytime after the three (3) days, the content broadcasting network is free to remove and replace those advertisements. In one embodiment, a receiver/STB can have the ability to identify these expired advertisements and replace them by "new" or "fresh" ones at the time of expiration of these advertisements. Storage space consumed by expired advertisements can be recycled for new ones. This feature enables advertisement storage space to be utilized efficiently on the receiver/STB so that the viewer is always receiving the most up-to-date advertisements. From a perspective of a content broadcasting network, a fresh stream of revenue also accompanies the new advertisements.

System Intelligence Enabling Targeted Advertising

Besides the system's ability to remove and/or insert advertisements in the programming content at different levels, the intelligent and personalized nature of the service provided by the system enables it to target different advertisements at different viewers who may be viewing the same programming content. For example, different viewers viewing the same programming content in different households may view different advertising. In other words, different viewers viewing the same programming content at on the same channel at the same time can view different advertisements. The system's targeted advertising is determined based on answers to questions such as "who is watching", "what is being watched", "when is it being watched" and "where is it being watched". By understanding who is watching a particular content at what particular time and where, in some embodiments, the system is capable of associating relevant advertisements to the particular viewers to increase efficiency in which advertisers can reach a particular targeted audience.

This system, including at least the content operation center, the advertising campaign management system, and the receiver/STB receiving the content, is configured to show various types of different advertising content in one or more different ways. First, for programming content that supports advertising queues, the advertising management system can intelligently and dynamically insert advertising segments during play back of the programming content. In some embodiments, advertising segments may be of any length (e.g., the typical thirty seconds in duration, or a combination of different lengths.) In other embodiments, the targeted advertising content may be determined based on a pre-designed rule set for a targeted advertising campaign. Second, different advertising content may be selectively inserted for display during pre-roll and post-roll of programming content playback. In other words, different content may be selectively displayed before or after programming content playback. For instance, pre-roll advertising is common in free online content offerings. Third, discrete advertising overlays and "ad bugs" during operations on the programming content so termed as "trick mode" play back such as fast forward, rewind, pause, skip forward, skip backwards, slow motion etc. are also made possible. For instances, static or dynamic advertising images can be inserted during activation of such trick mode operations. Fourth, various locations in the user interface offers advertisers opportunities to present static image based advertising that may or may not contain an interactive component. For example, in some embodiments, static images of a product or brand of product and service is displayed. In other embodiments, an image of products or services may include an interactive component, such as, without limitation, a hyperlink or some other active component for interaction with the viewer. Fifth, the user interface can have branded "zones" that offer networks and content providers the ability to highlight content and their brands. Still in some embodiments, the system is capable of creating telescoping and interactive advertisements. For example, telescoping advertisements "expand" a short advertisement into a longer advertisement in response to a user selection and activation. Interactive advertisements allow the viewer to make selections during the advertisements where the possibilities include branching to other advertisements or other advertising segments as well as requesting responses that may include, but is not limited to, an electronic coupon offering.

Central to the advertising campaign is a powerful user interface, an intelligence component and a massive storage which are parts of the receiver/STB and an interaction device that interacts with the receiver/STB to identify the viewer. In addition to the programming content, the storage in the STB/Receiver may hold at least approximately about five hundred (500) to approximately about two thousand (2000) traditional thirty seconds duration advertising clips. These advertising clips or segments are generally delivered to the receiver/STB using at least one of the broadcast transmission and unicast transmission. In some embodiments, the advertising segments are pushed down to particular receiver/STBs by the content operation center. In other embodiments, the receiver/STB selectively capture different advertising clips/segments from the broadband or unicast transmission.

The intelligence behind the targeted advertising is made possible by the advertising campaign management module in the content operation center and the advertising module in the receiver/STB. While the advertising campaign management module manages advertising campaigns and coordinates the different campaigns and different rules for the different campaigns, the advertising module in the receiver/STB determines which advertisements to present on screen. The advertising module selects advertisements to present in accordance with queues resulting from user operations in the user interface and according to rule sets determined by various active advertising campaigns. Specific viewer responses to the advertisements, also known as impression counts, are tracked and logged in the advertising module and fed back to the advertising campaign management system in the content operations center for feedback of the one or more campaigns' effectiveness.

Figure 27:
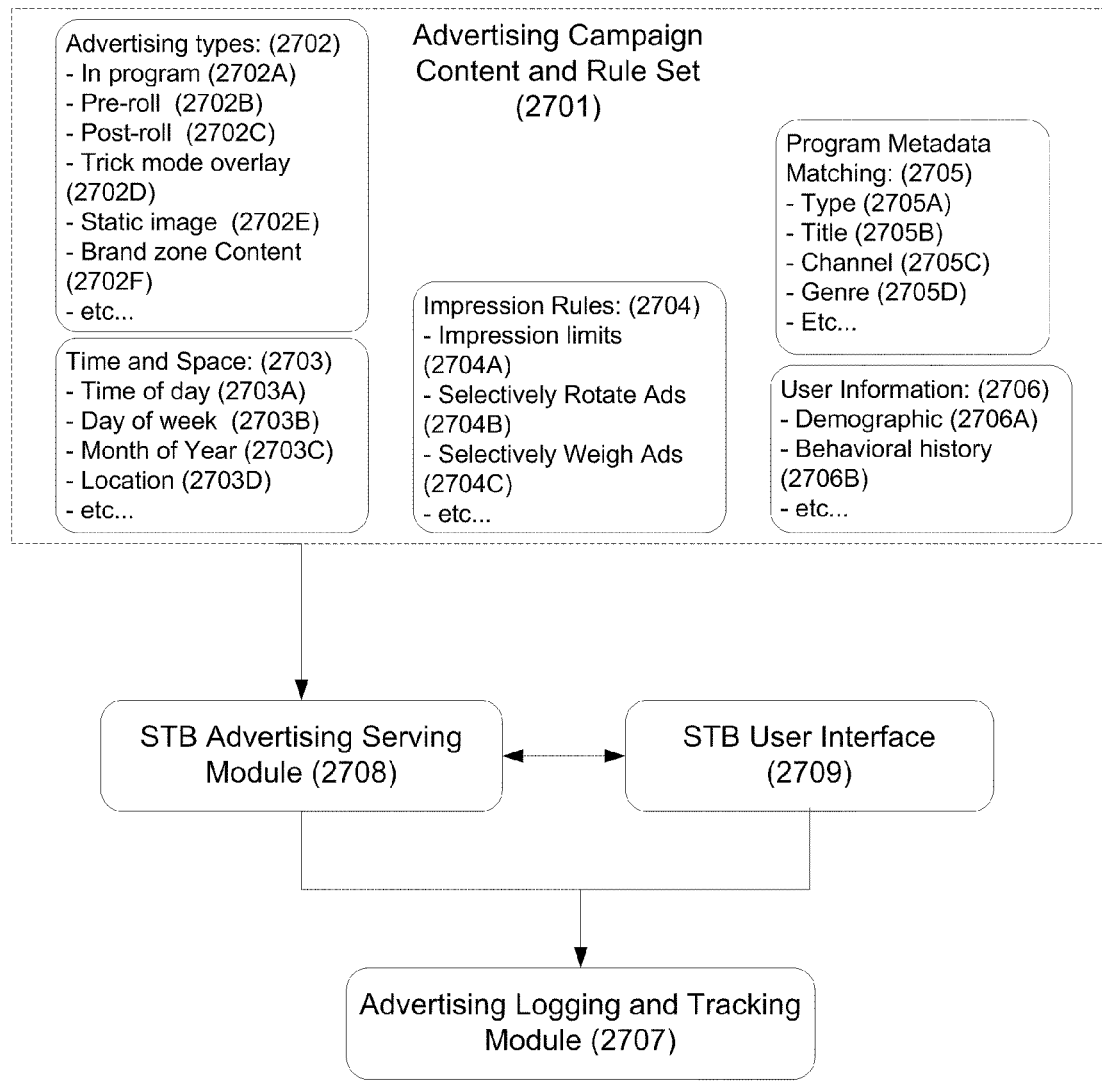
FIG. 27 is a block diagram illustrating different elements used by advertising campaigns and rules of the advertising management system, in accordance with some embodiments.

Each advertising campaign may specify rule sets incorporating a number of different elements. FIG. 27 is a block diagram illustrating different elements in advertising campaigns and rules of the advertising management system in accordance with some embodiments. Associated with each advertising campaign content and rule set 2701 are different elements including, but not limited to, advertising types 2702, time and space 2703 in which the advertisements are presented, impression rules 2704, program metadata 2705, and user information 2706. The advertising campaign content and rule set 2701 and its elements can be distributed to the advertising module in the receiver/STB 2708 which decides based on the rules and elements, what, when, where and how the advertisements are presented to viewers. Viewers can respond to the advertisements through the STB/user interface 2709, and both the information about the presentation of the advertisements from the advertising module 2708 and the responses from the STB/user interface 2709 are fed back to the advertising logging and tracking module 2707 which is a part of the advertising campaign management system in the content operations center.

The different elements in the advertising campaign content and rule set 2701 interact in concert to selectively display advertisements targeting different viewers while viewers are watching different programming content. Advertising types 2702 refer to the different forms advertisements can be presented. For instance advertisements can be presented in program 2702A, similar to traditional advertisements that are separately spaced and inserted within a programming content. Due to the unique user interface of the system, various other advertising types are possible. For example, specific advertisements may be presented pre-roll 2702B and post-roll 2702C, where advertisements are inserted before and after the programming content. Such pre-roll 2702B and post-roll 2702C advertisements, in some embodiments, can be made compulsory that cannot be skipped or fast forwarded by viewers. In other embodiments such as a trick mode overlay 2702D, advertisements can be presented to a viewer when a user selects a user operation including, but not limited to, fast forward, reverse, pause, skip forward, skip backwards, slow motion etc. Such trick mode overlay 2702D is performed during the time in which the operation is in effect and throughout the duration of the operation. In some embodiments, the trick mode over is a static advertisement image, in other embodiments, the trick mode overlay 2702D may be a dynamic advertisement. Still in other embodiments, static images 2702E may be presented on screen in different viewing areas of the user interface that are visible by viewers. Finally, the user interface may incorporate brand zone content 2702F that are zones for network and content provider to promote contents or brands. In some embodiments brand zone content 2702F is an area on the user interface that can dynamically interact with a viewer.

Another different element is time and space 2703 that controls when and where the advertisements are displayed. For instance, certain advertising campaign may be targeted at general adult viewers, such advertising content may be presented during a particular time of day 2703A, like during prime time, when news are broadcasted. Similarly, in other embodiments, different campaigns may be seasonal and targeted for a specific duration. For instances, a campaign for thanksgiving turkeys may be targeted for display over certain days of week 2703B or month of year 2703C. Other examples of seasonal advertising campaigns are Christmas sales or sales of produces or services around specific times of a year. Still, in some embodiments, advertisement campaigns may be specifically targeted at different locations 2703D. Different locations may include, but are not limited to, different cities, counties, states and regions. Furthermore, different locations may be determined based upon the different social demographics, including but not limited to, diversity of population, educational level of population, spoken language(s) of population, income level(s) of population and ethnicity or cultural background of population.

A different element contributing to advertising campaign rules is program metadata matching 2705. Program metadata contains inherent information about a programming content that identifies the programming content. For example, program metadata may include, but is not limited to, type of programming content (e.g. movie, episode etc.), title of programming content (e.g., "Friends", "24"), or specific episode (e.g. "Seinfeld Episode 23"), channel where programming content is displayed (e.g., "Discovery", "TLC" etc.), and genre/category of the program (e.g., reality, documentary etc.). The advertising module can target advertising by matching advertisements to one or more specific types of information found in the metadata. For example, advertisements for cars and trucks may be matched with genre of program that is classified as "action", female products may be targeted at title of programming content such as "Sex in the City" etc. In some embodiments, matching is accomplished via a Boolean rule set so that inclusion and exclusion rules can easily be manipulated.

Another element contributing to advertising campaigns and rules is user information 2706. User information includes demographic profile 2706A and behavioral history 2706B. In some embodiments, demographic profile is used in a specific campaign to target a specific segment of the population. For instance, a campaign may be targeted at teenage females, while a different campaign may be targeted at female household members. In other embodiments, behavioral history may be used by a specific campaign to target matching against previous events in the viewers' behavioral history. For example, if a particular interactive advertisement has once generated a particularly high response, a new campaign to follow up on that interactive advertisement may be directed at those viewers who previously responded or interacted with that advertisement.

Another different element that is important to the advertising campaign and rules are impression rules 2704. Impression rules are rules that govern the number of times and how advertisements are displayed and presented to viewers. Impression rules include, but are not limited to, setting impression limits 2704A or the number of times advertisements are displayed, selectively rotating ads 2704B, and selectively weighing ads 2704C. In some embodiments, certain ads about new products may want a high exposure and thus the frequency of display may be high, however, another different service may want to maintain a sense of exclusivity and is only displayed only in association with certain programs. Similarly, those ads that are intended to have achieved a high impression may have a heavier weight for more frequent displaying while those with lesser impressions may be rotated more frequently.

A last element that is essential to the advertising campaign is the interaction device. The interaction device or remote control, not displayed, serves a fundamental function in identifying the viewer. Specifically, in each interaction device or remote control, there is at least one dedicated button or key which is used by the viewer to identify him/herself. This interaction device is customized and tailored to interact specifically with the user interface and the components inside the receiver/STB to achieve the targeted advertising and personalized viewing based on profiles for each identified viewer stored in the receiver/STB.

In this system, cross-platform advertising may also be implemented. In particular, advertising on the receiver/STB may be made more relevant to the viewer by understanding a user's preferences through websites visited or searches the viewer makes at home via their computer. In some embodiments, a program may be associated with a computer that communicates with the receiver/STB used by a viewer. This program may be used to learn about a viewer's web behavior such as websites the viewer likes to visit on the internet. This "internet profile" may be communicated by the program to the advertising campaign management module in the content operations center or to the advertising module on the receiver/STB and then used as input into advertising campaigns running on the receiver/STB. For instance, a viewer seeking to purchase a new vehicle may have been visiting websites and searching for a sports car. With this information, the receiver/STB may be able to filter, retrieve, and/or capture relevant advertisements personalized to sports cars and present these advertisements/promotions to the user to help the user in making a purchase. In some embodiments, association may be made between the Internet profile on the computer and the receiver/STB. This may be accomplished, in some embodiments, by manually making the program on the computer aware of the serial number of the receiver/STB by the viewer. In other embodiments, the computer can be made to communicate with the receiver/STB via a home network. In summary, the program acts as an information collector that works with the advertising campaign management module in the content operations center and the advertising module in the receiver/STB so the receiver/STB can download and present the relevant advertisement for presentation.

Cross-platform advertising can be implemented, in other embodiments, using servers on the internet that are adapting and learning about the viewer's web behavior such as websites visited. For instance, this may be accomplished through the use of cookies residing in the browser's cookie cache to build a user or viewer or household's "internet profile" This user or viewer or household's "internet profile" is then used as input into advertising campaigns run on the receiver/STB. In some embodiments, no programs specifically associated with the computer, used by the user or viewer or members of the household, specifically for the purpose of communicating the "internet profile" is necessary. Instead servers, including but not limited to advertising network servers, on the Internet would monitor the user's or household's web behavior such as websites visited through the use of cookies residing in the browser's cookie cache. This manner of using third-party cookies to collect user information is commonly employed, for example, by advertising companies. Using the browser information and advertising information collected, such servers build a user or household "Internet profile" and this profile may be associated with the user's or household's profile on the receiver/STB. For example, the receiver/STB could host a web interface and push a cookie into the browser's cookie cache; or for example, a cookie could be placed in the browser cache when the viewer visits a web server on the Internet dedicated for monthly account and service maintenance. This association may then be used to push more relevant promotional content to the receiver/STB. For example, a user looking for a sports car may be shown promotional content concerning one or more different sport cars.

Alternatives

The disclosures in this patent application also relate to a system for and method of transmitting audio and visual programming content, comprising identifying an amount of broadcast transmission capacity available for transmitting the content to one or more users; separating the content into at least first and second portions, based on at least one of user demand for the content and the identified available broadcast transmission capacity; transmitting the first portion of the content, to a receiver associated with at least one of the users, using the at least a portion of the identified broadcast transmission capacity; and transmitting the second portion of the content to the receiver using transmission other than broadcast transmission.

At least a portion of the content can be nonlinear content. Also, the transmission other than broadcast transmission can include unicast transmission in response to at least one of a user request and an initiation by a server.

The system and method further include storing the received nonlinear content at the receiver for play back at a time different from the time of transmission. It extends to transmitting the nonlinear content as discrete files for storing at one or more of the receivers.

The system and method further comprise combining portions of the nonlinear content into an aggregate file; transmitting the aggregate file to at least one receiver using broadcast transmission; receiving the aggregate file at the receiver; and dividing the aggregate file into individual files of nonlinear content for non-real time play back.

In The system and method the content can include linear content. The linear content can be transmitted in a form of linear streaming to the receiver.

The system and method further comprise estimating the user demand based on at least one of (a) content selectively chosen for viewing by the one or more users, (b) ignored content that is browsed by, but not selected by, one or more users, and (c) a time of day and week when content is selectively chosen or browsed and ignored. The system and method still further comprise estimating the user demand based on at least one of (a) subscription for content by the one or more users; (b) content ratings submitted by the one or more users; (c) content specifically requested by the one or more users; and (d) content selectively captured by the receiver at the one or more of the users' command.

The system and method further comprise determining content preferences for at least one user, associated with a receiver, by using data acquired from a plurality of receivers associated with other receivers, the data representing at least one of (a) content selectively chosen for viewing by the one or more users, (b) ignored content that is browsed by, but not selected by, one or more users, and (c) a time of day and week when content is selectively chosen or browsed and ignored.

The system and method still further comprise determining content preferences for at least one user, associated with a receiver, by using data acquired from a plurality of receivers associated with other receivers, the data representing at least one of (a) subscription for content by the one or more users; (b) content ratings submitted by the one or more users; (c) content specifically requested by the one or more users; and (d) content selectively captured by the receiver at the one or more of the users' command.

The second portion of content can contain content specifically requested by one or more users.

The system and method can further make allocation for transmitting the first portion of content in accordance with transmission characteristics of a plurality of broadcast networks; and transmitting the first portion of content using the plurality of broadcast networks. The transmission characteristics can include at least one of available transmission capacity on a broadcast network, number of subscribers reachable by a broadcast network, and cost of transmission using a broadcast network. The system and method can further make allocation for transmission of the second portion of content in accordance with transmission characteristics of a plurality of unicast networks; and transmit the second portion of content using the plurality of unicast networks. The transmission characteristics can include at least one of available transmission capacity of a unicast network and cost of transmission using a unicast network.

The broadcast transmission can be over at least one of a wired network, a wireless network, and an IP multicast network. The broadcast transmission can utilize unutilized transmission capacity in a digital broadcast. The wireless network can be at least one of a satellite, terrestrial, digital TV, cellular, and WiMax network. The system and method also comprise sending a transmission schedule for the separated content to at least one the receiver to enable the receiver to capture the transmitted content.

This patent application still further relates to a system for and method of delivering audio and visual programming content, comprising determining user demand for at least a first and a second portion of the content; determining respective transmission capacities of at least one broadcast network and of at least one unicast network; determining a first transmission cost to transmit content using the at least one broadcast network and a second transmission cost to transmit content using the at least one unicast network; determining a delivery scheme for transmitting the at least first and second portions of the content based on the user demand, the transmission capacities and the transmissions costs; and transmitting at least the first and second portions of the content using at least one of the broadcast and unicast networks in accordance with the delivery scheme.

The nonlinear content can be transmitted at a transmission rate independent of a rate for real-time viewing of the nonlinear content by at least one user. The content can be transmitted using the unicast network can be transmitted upon explicit request by a user.

This also extends to a system for and method of delivering audio and visual programming content, comprising receiving content from a plurality of distribution networks by linear content transmission; dividing the received content into individual files, at least one of the files defining a nonlinear content; storing a plurality of the individuals files for a time-delayed distribution; transmitting to one or more receivers, at least a first of the individual files by broadcast transmission; transmitting to one or more of the receivers, at least a second of the individual files by unicast transmission; causing at least the first and second individual files to be recombined at least one of the receivers; and allowing a user associated with the at least one receiver to view content from the recombined files.

The wired network can be a cable network. The unicast transmission can be in response to at least one of a user request and an initiation by a server.

The system and method further comprise determining a mode of transmission of a plurality of individual files based an aggregated demand by a plurality of users for the individual files. The system and method further comprise extracting original promotions associated with content corresponding to each individual file; and storing the processing the individual files for a time-delayed broadcast or unicast transmission for non-real time distribution.

This also relates to a method for delivering audio and visual programming content, comprising obtaining nonlinear content from at least one source; receiving real-time content broadcasted via linear transmission; combining the real-time content with at least a first portion of the nonlinear content to form a combination of linear and nonlinear content; transmitting the combination of linear and nonlinear content to a plurality of receivers using available transmission capacity of a content broadcast network; and transmitting a second portion of the nonlinear content using unicast transmission.

The nonlinear content can be received from a plurality of distribution networks by linear content transmission and divided into individual files, at least one of which defines a nonlinear content. The nonlinear content can include content extracted from a physical media source.

Also, this document describes a system for and method of delivering audio and visual programming content, comprising receiving linear content from a plurality of distribution networks via a linear transmission; retrieving from a memory nonlinear content in form of discrete files; inserting at least one of a portion of the linear content and a portion of the nonlinear content as inserted content into an available bandwidth of an existing broadcast stream having a portion of its bandwidth occupied with television content transmitted at a transmission rate suitable for real time viewing; and transmitting the inserted content and the television content into the existing broadcast stream as a broadcast transmission to a plurality of receivers, wherein the portion of the nonlinear content, if present in the inserted content is transmitted at a rate independent of a rate of transmission suitable for real time viewing, and the portion of the linear content, if present in the inserted content is transmitted at a rate of transmission suitable for real time viewing.

The nonlinear content can be transmitted in an extra transmission capacity in a digital broadcast of broadcasting networks. The transmission capacity availability of the broadcast transmission can be variable and changes at different times. The broadcast transmission can be a terrestrial broadcast by a television network.

The system and method further comprise separating the nonlinear content into at least a first a second portion based on at least one of demand by users for the plurality of content and the amount of transmission capacity, wherein the first portion is for broadcast transmission and the second portion is for unicast transmission. The plurality of receivers can be connected to each other by a broadband network, to collectively form a peering network where portions of files containing nonlinear content can be sent directly from one receiver to another receiver. The linear content can be selectively transmitted by time of day according to user demand.

This also extends to a method for receiving audio and visual programming content, comprising at a client receiver: receiving a transmission schedule for a plurality of content; selectively capturing, in accordance with the transmission schedule and at least one preference of one or more users associated with the client receiver, a first portion of the plurality of content by broadcast transmission, wherein a first nonlinear content, if present, in the first portion of the plurality of content, is received at a transmission rate independent of a rate for real-time viewing of the first nonlinear content at the receiver; and receiving a second portion of the plurality of content, by unicast transmission.

The second portion of the plurality of content can be selectively received by the receiver according to at least one preference of a user associated with the receiver. The nonlinear content can be received as discrete files for storage and play back at one or more receivers. The nonlinear content can be received in a form of an aggregate file. The aggregate file can be decoded into individual discrete files for play back and storage at one or more receivers. A linear content can be received as a portion of the content received in the broadcast transmission at the one or more receivers for viewing in real-time.

The system and method further comprise receiving both the linear and nonlinear content by broadcast or unicast transmission, wherein a mode of transmission of the linear and nonlinear content is selected based on demand by one or more users associated with the receivers for the linear and nonlinear content. The system and method also can include receiving the second portion of the plurality of content by unicast in response to at least one of a user's request and an initiation by the server without a prior request by the user.

The receiver and other receivers can be connected to a broadband network, collectively forming a peering network where portions of files having nonlinear content can be sent directly from one receiver to another receiver.

The system and method further include estimating a demand by users associated with the receiver for the plurality of content based on at least one of (a) a first list of interaction events resulting from watched television content that is selectively chosen for viewing by the one or more users using a user interface; (b) a second list of interaction events resulting from ignored television content that is browsed but not selected in the user interface; and (c) a time of day and week wherein at least one of the first list of interaction events and the second list of interaction events occurred.

The system and method further comprise estimating a demand by users associated with the receiver for the plurality of content based on at least one of (a) a list of audio and visual programs marked for subscription by the one or more users; (b) ratings of television content submitted by the one or more users on the television content viewed; (c) television content specifically requested by the one or more users; and (d) television content selectively captured by the receiver at the one or more user's command.

This document also describes a system for and method of repairing corrupted audio and visual programming content, comprising at a receiver, receiving content on the receiver from a broadcast transmission; identifying, if present, corrupted portions of content; determining in a broadband network, other servers and receivers connected to the broadband network that have an uncorrupted version of the corrupted portion of the content; sending a request to at least one of the servers and receivers connected to the broadband network for the uncorrupted version of the corrupted portion of the content; and receiving the uncorrupted version of the corrupted portion of the content from the one of the servers and receivers.

This system and method further comprise replacing the corrupted portion of the content with the uncorrupted version of the corrupted portion of the content to form a repaired content; and storing the repaired content. The receiver and the other receivers can be configured to communicate with each other directly without going through a central server.

This also extends to a method for repairing corrupted audio and visual programming content, comprising at a receiver receiving content on the receiver from a broadcast transmission; storing the content in the form of files on the receiver; identifying, if present, one or more corrupted files representing corrupted content; determining in a broadband network, other servers and receivers connected to the broadband network that have an uncorrupted version of the one or more corrupted files; sending a request to at least one of the servers and receivers connected to the broadband network for the uncorrupted version of the one or more corrupted files; and receiving one or more uncorrupted files from one of the servers and receivers. The system and method further comprise replacing the one or more corrupted files with the one or more uncorrupted files; and storing the one or more uncorrupted files in the receiver.

In addition, this document relates to a system for and method of delivering audio and visual programming content, comprising at a server determining transmission capacity availability of various broadcast transmissions in different broadcast networks at different times; determining at least a first portion of a nonlinear content for broadcast transmission; determining at least a second portion of the nonlinear content for unicast transmission; allocating the first portion of nonlinear content to form a schedule for content transmission based on the transmission capacity availability in different broadcast networks at different times; allocating the second portion of nonlinear content for unicast distribution; and transmitting the first portion of the nonlinear content to a plurality of receivers according to the schedule.

The schedule can be designed to ensure that at least some of the nonlinear content is delivered not longer than a time period after a target time. The schedule can be transmitted to the plurality of receivers for the receivers to capture nonlinear content from broadcast transmissions.

The system and method extends to determining times of availability for receivers to receive content on each network; and allocating the nonlinear content to form a schedule for content transmission based on the times of availability for receivers to receive content on each network. It also extends to determining and scheduling a first portion of a linear content in form of streams for broadcast transmission. It further extends to determining times of availability for receivers to receive content on each network; and allocating the linear content and the nonlinear content to form a schedule for content transmission based on the times of availability for receivers to receive content on each network.

At least a portion of the nonlinear content can be transmitted at a rate independent of a rate of real-time viewing of the nonlinear content at the plurality of receivers receiving the nonlinear content. The schedule can be designed to account for availability of tuners at receivers in receiving nonlinear content from the different networks at the different times.

The system and method also include inserting at least a third portion of the nonlinear content and a second portion of the linear content into an opportunistic transmission capacity for broadcast transmission, the opportunistic transmission capacity being transmission capacity that became available in at least one of the different networks not anticipated by the scheduling.

This document further encompasses a method for presenting audio and visual programming content, comprising, at a receiver, determining one or more users' viewing preferences of content for the one or more users associated with the receiver based on at least one criterion; and displaying the nonlinear programming information about the content matching the one or more users' viewing preferences to the one or more users.

The system and method also include capturing nonlinear programming information associated with content matching the one or more users' viewing preferences; and storing the nonlinear programming information matching the one or more users' viewing preferences. Preferred nonlinear programming content can be selectively captured from a broadcast transmission matching the one or more users' viewing preferences; and the captured nonlinear programming content stored.

The preferred nonlinear content can be transmitted at a rate independent of a rate of real-time viewing of the preferred nonlinear content at the plurality of receivers receiving the preferred nonlinear content. At least a first portion of the preferred nonlinear programming content can be received at the receiver by a broadcast transmission and a second portion of the preferred nonlinear programming content can be received at the receiver by a unicast transmission in accordance with a schedule based on at least demand by users for the preferred nonlinear programming content. The nonlinear programming information and the corresponding preferred nonlinear programming content can be captured in accordance with a schedule.

At least one criteria can be selected from a group consisting of (a) a first list of interaction events resulting from watched television content that is selectively chosen for viewing by the one or more users using a user interface; (b) a second list of interaction events resulting from ignored television content that is browsed but not selected in the user interface; and (c) a time of day and week wherein at least one of the first list of interaction events and the second list of interaction events occurred.

At least one criteria could also be selected from a group consisting of (a) a list of audio and visual programs marked for subscription by the one or more users; (b) ratings of television content submitted by the one or more users; (c) television content specifically requested by the one or more users; and (d) television content selectively captured by the receiver at the one or more user's command.

Furthermore, this document extends to a method for selecting audio and visual programming content for capturing, comprising: at a receiver and for one or more users using the receiver, identifying a user using the receiver for viewing content; tracking interaction events by the user, the interaction events including watching a first content that is selectively chosen for viewing by the one or more users and ignoring a second content that is browsed but not selected; and generating a user profile for the user based on at least the interaction events by the user; adaptively and continuously modifying the user profile based on at least interaction events after formation of the user profile.

The system and method can track a time of day and time of week of the interaction events as part of the user profile. It further comprises (a) tracking subscriptions of audio and visual programs by the user; (b) tracking audio and visual programs that are rated favorably by the user; and (c) adaptively and continuously modifying the user profile based on the subscriptions.

The system and method extends to selectively capturing preferred content from a broadcast transmission based on the user profile; storing the captured content; and displaying the captured content.

It further comprises prioritizing the captured content in a display in accordance with a user preference and user routine.

The system and method for capturing audio and visual programming content, extend to, at a receiver, identifying one or more users based on a predetermined command received from an interaction device, interacting with the receiver, which is being operated by the one or more users; determining the one or more users' viewing preferences of programming content for the one or more users associated with the receiver based on at least one criterion; and displaying programming information matching the one or more users' viewing preferences to the one or more users in response to a user command by the one or more users received from the interaction device.

This description also includes capturing the programming content matching the one or more users' viewing preferences; and storing the captured programming content matching the one or more users' viewing preferences. It also includes capturing the programming information associated with content matching the one or more users' viewing preferences; and storing the captured programming information associated with the content matching the one or more users' viewing preferences. It can also be extended to prioritizing the programming information in a display in accordance with a user preference and user routine.

The system and method at least one criterion can be selected from a group consisting of (a) a first list of interaction events resulting from watched television content that is selectively chosen for viewing by the one or more users using a user interface; (b) a second list of interaction events resulting from ignored television content that is browsed but not selected in the user interface; and (c) a time of day and week wherein at least one of the first list of interaction events and the second list of interaction events occurred.

At least one criterion could also be selected from a group consisting of (a) a list of audio and visual programs marked for subscription by the user; (b) ratings of television content submitted by the one or more users on the television content viewed; (c) television content specifically requested by the one or more users; and (d) television content selectively captured by the receiver at the one or more user's command.

The system and method include a system for and method of displaying audio and visual programming captured content, comprising, at a receiver, receiving a user identification command from an interface device operated by a user associated with the receiver; identifying the user by the user identification command received from the interface device; retrieving, in response to the user identification command received from the interface device, a user profile of the user that is stored in the receiver; retrieving programming information, in accordance with the user profile from the receiver; and presenting the programming information to the user.

The system and method further comprise receiving a user activation command selecting an audio and visual program associated with the programming information; retrieving the audio and visual program stored in the receiver; and displaying the audio and visual program for viewing.

This document also encompasses a method for removing content, comprising at a server configured to transmit content by at least one of a broadcast transmission and a unicast transmission: receiving a plurality of content from a plurality of distribution networks in a form of a linear streams, wherein each of the plurality of content includes a corresponding original promotional content embedded within each of the plurality of content; removing selectively from the plurality of content, the corresponding embedded original promotional content; and storing each of the plurality of content without the corresponding embedded original promotional content as a single discrete file for time-delayed distribution and non-real time viewing.

At least a portion of the audio and programming content comprising nonlinear content and the nonlinear content can be transmitted at a transmission rate that is independent of a rate for real-time viewing of the nonlinear content at the receiver receiving the nonlinear content.

In addition, this description also includes a method for combining audio and visual programming content, comprising, at a server configured to transmit a plurality of content by at least a broadcast transmission, receiving a plurality of content from a plurality of distribution networks in a form of linear streams, wherein each of the plurality of content correspondingly includes an original promotional content embedded within each of the plurality of content; removing, from each of the plurality of content, the corresponding original promotional content embedded in each of the plurality of content; inserting into each of the plurality of the content at least a portion of a targeted promotional content associated with an advertising campaign for each of the plurality of the content; storing at least a portion of the plurality of content with the targeted promotional content as nonlinear content in form of discrete files for time-delayed distribution and non-real time viewing; and transmitting the nonlinear content at a rate that is independent of a real-time viewing rate of the nonlinear content at a receiver receiving the nonlinear content.

The plurality of content includes at least one of television programming content and movies.

Another system and method for extracting audio and visual programming content, comprise, at a receiver configured to receive content at least by broadcast transmission, receiving a plurality of content in a form of linear stream or discrete files, each of the plurality of content containing original advertising content; selectively extracting original advertising content, embedded within the plurality of audio and visual content, from each of the plurality of content; and storing each of the plurality of the content without the corresponding original advertising content as modified discrete files in the receiver.

The system and method further include receiving the nonlinear content at a transmission rate independent of a rate for real-time viewing of the nonlinear content at the receiver receiving the nonlinear content.

The system and method further include identifying which of the plurality of content is for which of the one or more users; retrieving promotion and advertisement content targeted for the identified one or more users in accordance with one or more advertising campaigns; inserting the targeted promotion and advertisement content into corresponding ones of the plurality of content in accordance with the one or more advertising campaigns; and displaying, in response to one or more users' user command, content with the targeted promotion and advertisement content, embedded within.

This also extends to a method for displaying advertising content, comprising, at a receiver configured to receive content at least by broadcast transmission, receiving a plurality of advertising promotion content; receiving a plurality of content; identifying which of the plurality of content is for which of the one or more users; inserting, correspondingly, at least a portion of the plurality of advertising promotion content targeting the one or more users in accordance with an advertising campaign into each of the content identified for each of the one or more users; and displaying each of the plurality of content with the targeted advertising promotion upon request by the one or more users using the receiver.

The system and method include storing each of the plurality of content after the plurality of audio and programming content is received and before any advertising promotion content is inserted. Each of the plurality of content can be stored after corresponding advertising promotion content has been inserted into each of the plurality of content.

The system and method further comprise displaying at least another portion of the plurality of advertising promotion content when an action including at least one of fast forwarding, rewinding, slow motion, pause, forward skip and backward skip, is performed on the content. It still further comprises displaying at least another portion of the plurality of advertising promotion content prior to and after the displaying of the plurality of content.

The plurality of content can be received by unicast transmission. The nonlinear content can be received at a transmission rate that is independent of a rate for real-time viewing of the nonlinear content at the receiver receiving the nonlinear content.

The system and method further extends to identifying one or more users based on a user identification command received from an interaction device operated by the one or more users for interacting with the receiver. It further comprises personalizing the portion of the plurality of advertising promotional content targeted for each of the one or more users as the targeted advertising promotional content is displayed. Inserting of the plurality of advertising promotional content can occur before displaying of the content or at the time of displaying of the content.

This description also includes a method for extracting and inserting content, comprising, at a receiver configured to receive content by at least a broadcast transmission, receiving a plurality of content for one or more users using the receiver, each of the plurality of content containing original advertising content; selectively removing the original advertising content embedded within each of the plurality of content; inserting at least a portion of advertising content having promotional material targeted for the one or more users, in accordance with one or more advertising campaigns, into each of the plurality of content for the one or more users; and displaying the content with the targeted advertising content, to the one or more users upon request.

The system and method further include displaying at least another portion of the targeted advertising content when an action is performed on the content such as fast forwarding, forwarding, rewinding, slow motion, or pause. At least another portion of the customized advertising content can be displayed prior to and after the displaying of the plurality of content.

The first portion of the targeted advertising content can be inserted in place of the original advertising content. The system and method further extends to requesting for a plurality of different customized advertising content in accordance with one or more advertising campaigns. It further comprises receiving the plurality of content by unicast transmission and/or storing each of the plurality of content after the plurality of audio and programming content is received and before any advertising promotion content is inserted. It also comprises storing each of the plurality of content after corresponding advertising promotion content has been inserted into each of the plurality of content. The nonlinear content can be received at a transmission rate independent of a rate for real-time viewing of the nonlinear content at the receiver receiving the nonlinear content.

The system and method also extends to identifying one or more users based on a predetermined profile received from an interaction device operated by the one or more users for interacting with the receiver. It also extends to personalizing the portion of the plurality of advertising promotional content targeted for each of the one or more users as the targeted advertising promotional content is displayed. The inserting of the plurality of advertising promotional content can occur before displaying of the content or at the time of displaying of the content.

The foregoing description, for purpose of explanation, has been described with reference to specific embodiments. However, the illustrative discussions above are not intended to be exhaustive or to limit the invention(s) to the precise forms disclosed. Many modifications and variations are possible in view of the above teachings. The embodiments were chosen and described in order to best explain the principles of the invention(s) and its/their practical applications, to thereby enable others skilled in the art to best utilize the invention(s) and various embodiments with various modifications as are suited to the particular use contemplated.

We claim:

1. A method for receiving audio and visual programming content, comprising at a client receiver:

receiving a transmission schedule for a plurality of content, wherein the plurality of content is comprised of both a plurality of channels of linear content and a plurality of nonlinear content, the transmission schedule indicating transmission methods selected from the set broadcast and unicast of content in the plurality of content, wherein the transmission schedule is based on one or more of (i) at least one preference of one or more users associated with the client receiver;

(ii) a cost of broadcast transmission versus unicast transmission of content;

(iii) an identified available broadcast transmission capacity; and (iv) a demand for the plurality of channels of linear content and the plurality of nonlinear content; and selectively capturing, in accordance with the transmission schedule and the at least one preference of one or more users associated with the client receiver, a first content and a second content from the plurality of content, wherein the first content is received via a broadcast transmission, and the second content is received by a unicast transmission, wherein the first content and the second content correspond to different programs;

wherein the transmission schedule is created using a cost function represented by $$\text{Cost(Schedule } S) = \sum_{i \in Broadcast(s)} B(i) * D(i) * \left[ e^{\frac{t(i, S) - tU(i))}{tau(i)} i} \right] + \sum_{i \in Unicast(s)} U(i) \times D(i)$$

wherein

S represents a schedule,

Cost(Schedule S) represents the cost assigned to the schedule, $$\sum_{i \in Broadcast(s)}$$

covers a plurality of audiovisual contents scheduled for broadcast transmission in schedule S, $$\sum_{i \in Unicast(s)}$$

covers a plurality of audiovisual contents scheduled only for unicast transmission, "i" represents an asset, D(i) represents the fractional demand for an audiovisual content, B(i) represents the cost of broadcast of the audiovisual content, U(i) represents the cost of unicast distribution of the audiovisual content, t(i,S) represents the time that the audiovisual content is scheduled for broadcast transmission by the schedule, tU(i) represents the target time at which the audiovisual content should be broadcasted, and tau(i) represents a time constant.

2. The method of claim 1, wherein the demand is based on at least one of: subscription for content, content ratings submitted by users, and content specifically requested by users.

3. The method of claim 1, wherein the at least one preference of one or more users associated with the client receiver comprises at least one of content selectively chosen for viewing by the one or more users, ignored content that is browsed by, but not selected by, the one or more users, and a time of day and week when content is selectively chosen or browsed and ignored.

4. The method of claim 1 wherein the first content comprises audiovisual content and is received via broadcast transmission over unutilized transmission capacity in a broadcast of existing network content, wherein the unutilized transmission capacity comprises a portion of a bandwidth of the broadcast of existing network content.

5. The method of claim 1 wherein the second content comprises nonlinear content and the nonlinear content is transmitted at a rate independent of a real-time viewing rate for the second content.

6. The method of claim 1 wherein the first content includes at least one original promotion, the method further comprising:

modifying the first content by replacing the at least one original promotion with at least a portion of advertising content having promotion material targeted for the one or more users associated with the client receiver.

7. The method according to claim 1 further comprising displaying at least one of the first content and the second content in response to receipt of a request from the one or more users associated with the client receiver.

8. The method according to claim 1 further comprising:

identifying, if present, a corrupted portion of the first content and repairing the corrupted portion via unicast transmissions using a peer-to-peer network comprised of other client receivers.

9. A system for receiving audio and visual programming content, the system comprising:

a storage;

a receiver interface, a network interface; and a computer system, the computer system coupled in communication with the network interface, the receiver interface and the storage, the computer system including a controller for receiving a transmission schedule for a plurality of content over one of the receiver interface and the network interface, wherein the plurality of content is comprised of both a plurality of channels of linear content and a plurality of nonlinear content, the transmission schedule indicating a transmission method selected from the set broadcast and unicast of content in the plurality of content and based on one or more of (i) the at least one preference of one or more users associated with the client receiver (ii) a cost of broadcast transmission versus unicast transmission of content (iii) an identified available broadcast transmission capacity and (iv) a demand for the plurality of channels of linear content and the plurality of nonlinear content;

wherein the storage is adapted to selectively store, in accordance with the transmission schedule and the at least one preference of one or more users associated with the client receiver, a first content and a second content from the plurality of content, wherein the first content is received via a broadcast transmission on the receiver interface and the second content is received by a unicast transmission on the network interface, wherein the first content and the second content correspond to different programs, and a means for determining the transmission schedule using a cost function represented by Cost(Schedule $S$) =

$$\sum_{i \in Broadcast(s)} B(i) * D(i) * \left[ e^{\frac{t(i,S) - tU(i)}{tau(i)} i} \right] + \sum_{i \in Unicast(s)} U(i) \times D(i)$$

wherein

S represents a schedule,

Cost(Schedule S) represents the cost assigned to the schedule, $$\sum_{i \in Broadcast(s)}$$

covers a plurality of audiovisual contents scheduled for broadcast transmission in schedule S, $$\sum_{i \in Unicast(s)}$$

covers a plurality of audiovisual contents scheduled only for unicast transmission, "i" represents an asset, D(i) represents the fractional demand for an audiovisual content, B(i) represents the cost of broadcast of the audiovisual content, U(i) represents the cost of unicast distribution of the audiovisual content, t(i,S) represents the time that the audiovisual content is scheduled for broadcast transmission by the schedule, tU(i) represents the target time at which the audiovisual content should be broadcasted, and tau(i) represents a time constant.

10. The system of claim 9, wherein the receiver interface comprises an interface to at least one of a wired network, a wireless network, and an IP multicast network.

11. The system of claim 10, wherein the wireless network comprises at least one of a satellite, terrestrial digital TV, cellular and WiMax network.

12. The system of claim 9 wherein the first content includes at least one original promotion and the controller is adapted to further:
- receive over at least one of the receiver interface and the network interface at least a portion of advertising content having promotion material; and
- modify the first content by replacing the at least one original promotion with at least a portion of advertising content having promotion material targeted for the one or more users associated with the client receiver.

13. The system of claim 9 wherein the system further comprises:
- an audiovideo output for providing audiovideo information to a playback device; and
- the controller being further adapted to output at least one of the first content and the second content over the audiovideo output responsive to receipt of a request from the one or more users associated with the client receiver.

14. A method for transmitting audio and visual programming content to at least one client receiver, comprising:
- separating a plurality of content into a first content group and a second content group in accordance with a transmission schedule, wherein
- the plurality of content is comprised of both a plurality of channels of linear content and a plurality of nonlinear content,
- the first content group and the second content group are different,
- the separating is based on at least one of
  - (i) at least one preference of one or more users of the at least one client receiver
  - (ii) a cost of broadcast transmission versus unicast transmission of content
  - (iii) an identified available broadcast transmission capacity and
  - (iv) a demand for the plurality of channels of linear content and the plurality of nonlinear content; and
- transmitting content in the first content group to a plurality of receivers using at least a portion of the identified broadcast transmission capacity, and transmitting content in the second content group to at least one receiver using a transmission other than broadcast transmission, in accordance with a transmission schedule,
- wherein the transmission schedule is created using a cost function represented by $$\text{Cost(Schedule } S) = \sum_{i \in Broadcast(s)} B(i) * D(i) * \left[ e^{\frac{t(i,S) - tU(i)}{tau(i)}} i \right] + \sum_{i \in Unicast(s)} U(i) \times D(i)$$

wherein
S represents a schedule,
Cost(Schedule S) represents the cost assigned to the schedule, $$\sum_{i \in Broadcast(s)}$$

covers a plurality of audiovisual contents scheduled for broadcast transmission in schedule S, $$\sum_{i \in Unicast(s)}$$

covers a plurality of audiovisual contents scheduled only for unicast transmission, "i" represents an asset, D(i) represents the fractional demand for an audiovisual content, B(i) represents the cost of broadcast of the audiovisual content, U(i) represents the cost of unicast distribution of the audiovisual content, t(i,S) represents the time that the audiovisual content is scheduled for broadcast transmission by the schedule, tU(i) represents the target time at which the audiovisual content should be broadcasted, and tau(i) represents a time constant.

15. The method of claim 14, further comprising:
- identifying at least a first program in at least the first content group and the second group, the first program including at least an one original promotion;
- modifying the first program by replacing at least one original promotion with at least a portion of advertising content having promotion material targeted for the one or more users associated with the client receiver; and
- transmitting the modified first program to one or more client receivers.

16. The method of claim 14, wherein the demand based on at least one of:
subscription for content, content ratings submitted by users, and content specifically requested by users.

17. The method of claim 14, wherein the at least one preference of one or more users associated with the client receiver comprises at least one of
- content selectively chosen for viewing by the one or more users,
- ignored content that is browsed by, but not selected by, the one or more users, and
- a time of day and week when content is selectively chosen or browsed and ignored.

18. A method for receiving audio and visual programming content comprising:
- receiving a transmission schedule for a plurality of content at a client receiver, wherein the plurality of content is comprised of both a plurality of channels of linear content and a plurality of nonlinear content,
- the transmission schedule providing transmission methods and based on one or more of
  - (i) at least one of user preferences associated with the client receiver;
  - (ii) at least one of user preferences associated with a plurality of non-client receivers;

(iii) the cost for a first transmission form and the cost for a second transmission form;
(iv) an identified available broadcast transmission capacity; and
(v) a demand for the plurality of channels of linear content and the plurality of nonlinear content; and capturing, in accordance with the transmission schedule and the at least one of user preferences associated with the client receiver a first content and a second content from the plurality of content, wherein the first content is received via a broadcast transmission, and the second content is received by a unicast transmission, wherein the first content and the second content correspond to different programs, wherein the transmission schedule is created using a cost function represented by Cost(Schedule $S$) =
$$\sum_{i \in Broadcast(s)} B(i) * D(i) * \left[e^{\frac{t(i, S) - tU(i)}{tau(i)}} i\right] + \sum_{i \in Unicast(s)} U(i) \times D(i)$$

wherein
S represents a schedule,
Cost(Schedule S) represents the cost assigned to the schedule, $$\sum_{i \in Broadcast(s)}$$

covers a plurality of audiovisual contents scheduled for broadcast transmission in schedule S, $$\sum_{i \in Unicast(s)}$$

covers a plurality of audiovisual contents scheduled only for unicast transmission,
"i" represents an asset,
D(i) represents the fractional demand for an audiovisual content,
B(i) represents the cost of broadcast of the audiovisual content,
U(i) represents the cost of unicast distribution of the audiovisual content,
t(i,S) represents the time that the audiovisual content is scheduled for broadcast transmission by the schedule,
tU(i) represents the target time at which the audiovisual content should be broadcasted, and
tau(i) represents a time constant.

19. A method for receiving audio and visual programming content according to claim 18 wherein the plurality of content is transmitted in an available bandwidth of an existing broadcast stream.

20. A method for receiving audio and visual programming content according to claim 18 wherein the nonlinear content is transmitted at a rate independent of a rate of transmission suitable for real time viewing, and the linear content is transmitted at a rate of transmission suitable for real time viewing.

21. A method for receiving audio and visual programming content according to claim 18 further comprising:
identifying a user using the receiver for viewing content;
tracking interaction events by the user;
generating a user profile for the user based on at least the interaction events by the user; and
modifying the user profile based on at least interaction events after formation of the user profile.

22. A method for receiving audio and visual programming content according to claim 18 wherein the user preferences associated with the client receiver are generated from a plurality of interaction events stored in the client receiver, wherein the interaction events comprise watched content that is selected for viewing, ignored content that is browsed but not selected for viewing, timing information associated with when the watched content is selected for viewing and timing information associated with when the ignored content is browsed but not selected for viewing.

23. A method for receiving audio and visual programming content according to claim 18 wherein the transmission of the nonlinear content occurs after a set period from a first transmission date of the nonlinear content.

24. A method for receiving audio and visual programming content according to claim 18 further comprising identifying a user associated with one of the user preferences, wherein the client receiver stores user profiles comprising user preferences for a plurality of users.

25. A method for receiving audio and visual programming content according to claim 18 wherein the client receiver comprises any one of a cellular telephone, a mobile electronic device, a television set-up box and a digital video recorder.

26. A method for receiving audio and visual programming content according to claim 18 wherein the first content includes at least one original promotion, the method further comprising:
modifying the first content by replacing the at least one original promotion with at least a portion of advertising content having promotion material targeted for the one or more users associated with the client receiver.

27. A method for receiving audio and visual programming content according to claim 18 further comprising displaying at least one of the first content and the second content in response to receipt of a request from the one or more users associated with the client receiver.

28. A method for receiving audio and visual programming content according to claim 18 further comprising:
identifying, if present, a corrupted portion of the first content and
repairing the corrupted portion via unicast transmissions using a peer-to-peer network comprised of other client receivers.

* * * * *